US006630885B2

(12) United States Patent
Hardman et al.

(10) Patent No.: US 6,630,885 B2
(45) Date of Patent: Oct. 7, 2003

(54) ELECTRONIC TIRE MANAGEMENT SYSTEM

(75) Inventors: Gordon E. Hardman, Boulder, CO (US); John W. Pyne, Erie, CO (US); Molly A. Hardman, Boulder, CO (US); Paul B. Wilson, Tallmadge, OH (US); David M. Coombs, Tucson, AZ (US); Brett W. Floyd, Longmont, CO (US)

(73) Assignee: Bridgestone/Firestone North American Tire, LLC, Nashville, TN (US)

( * ) Notice: Subject to any disclaimer, the term of this patent is extended or adjusted under 35 U.S.C. 154(b) by 0 days.

(21) Appl. No.: 09/915,858

(22) Filed: Jul. 26, 2001

(65) Prior Publication Data

US 2002/0126005 A1 Sep. 12, 2002

Related U.S. Application Data

(60) Provisional application No. 60/220,896, filed on Jul. 26, 2000.

(51) Int. Cl.$^7$ ................................................ G08B 26/00
(52) U.S. Cl. ..................... 340/505; 340/442; 340/444; 340/447; 73/146.5; 156/64; 156/123
(58) Field of Search ................................. 340/442, 443, 340/444, 445, 447, 505; 73/146.5; 156/64, 123

(56) References Cited

U.S. PATENT DOCUMENTS

| 4,283,707 A | 8/1981 | Church |
| 4,525,766 A | 6/1985 | Petersen |
| 4,543,457 A | 9/1985 | Petersen et al. |
| 4,588,978 A | 5/1986 | Allen |
| 4,695,823 A | 9/1987 | Vernon |
| 4,730,188 A | 3/1988 | Milheiser |
| 4,737,660 A | 4/1988 | Allen et al. |
| 4,845,649 A | 7/1989 | Eckardt et al. |
| 4,978,941 A | 12/1990 | Brown |
| 5,054,315 A | 10/1991 | Dosjoub |
| 5,061,917 A | 10/1991 | Higgs et al. |
| 5,083,457 A | 1/1992 | Schultz |

(List continued on next page.)

FOREIGN PATENT DOCUMENTS

| CA | 2311162 | 12/2000 |
| CA | 2278252 | 1/2001 |
| EP | 0982159 | 3/2000 |
| EP | 0989001 | 3/2000 |
| EP | 1026015 | 8/2000 |

(List continued on next page.)

*Primary Examiner*—Daryl Pope
(74) *Attorney, Agent, or Firm*—Michael R. Huber; Ronald A. Sandler

(57) ABSTRACT

An electronic tire maintenance system is provided for measuring a parameter of a device at a first location. The system includes a sensor for measuring the device parameter and generating a data signal representing the measured parameter. The system also includes a microprocessor coupled to the sensor for activating the sensor on a first periodic basis to measure the device parameter. The microprocessor includes a memory for storing the generated data signal representing the measured parameter. A transmitter and a receiver are coupled to the microprocessor. The microprocessor periodically partially awakens to determine, on a second periodic basis, if a received transmission is a valid interrogation signal and, if so, fully awakens and responds to the valid interrogation signal, via the transmitter, by at least transmitting the last stored measured parameter. In one embodiment, the device is a tire tag mounted inside a tire that measures tire data and transmits that data to a remote source in response to an interrogation request, an alert condition, or automatically on a periodic basis.

101 Claims, 34 Drawing Sheets

U.S. PATENT DOCUMENTS

| | | |
|---|---|---|
| 5,109,213 A | 4/1992 | Williams |
| 5,181,423 A | 1/1993 | Philipps et al. |
| 5,231,872 A | 8/1993 | Bowler et al. |
| 5,301,553 A | 4/1994 | Schultz et al. |
| 5,335,540 A | 8/1994 | Bowler et al. |
| 5,400,649 A | 3/1995 | Bartscher et al. |
| 5,444,448 A | 8/1995 | Schuermann et al. |
| 5,448,242 A | 9/1995 | Sharpe et al. |
| 5,463,374 A | 10/1995 | Mendez et al. |
| 5,471,212 A | 11/1995 | Sharpe et al. |
| 5,473,938 A | 12/1995 | Handfield et al. |
| 5,483,826 A | 1/1996 | Schultz et al. |
| 5,483,827 A | 1/1996 | Kulka et al. |
| 5,517,853 A | 5/1996 | Chamussy |
| 5,521,846 A | 5/1996 | Lang et al. |
| 5,552,789 A | 9/1996 | Schuermann |
| 5,559,484 A | 9/1996 | Nowicki et al. |
| 5,562,787 A * | 10/1996 | Koch et al. .................. 156/64 |
| 5,586,130 A | 12/1996 | Doyle |
| 5,600,301 A | 2/1997 | Robinson, III et al. |
| 5,612,671 A | 3/1997 | Mendez et al. |
| 5,656,993 A | 8/1997 | Coulthard |
| 5,661,651 A | 8/1997 | Geschke et al. |
| 5,673,037 A | 9/1997 | Cesar et al. |
| 5,710,539 A | 1/1998 | Iida |
| 5,717,376 A | 2/1998 | Wilson |
| 5,728,933 A | 3/1998 | Schultz et al. |
| 5,731,754 A | 3/1998 | Lee, Jr. et al. |
| 5,741,966 A | 4/1998 | Handfield et al. |
| 5,774,047 A | 6/1998 | Hensel, IV |
| 5,780,733 A | 7/1998 | Meunier |
| 5,783,992 A | 7/1998 | Eberwine et al. |
| 5,825,286 A | 10/1998 | Coulthard |
| 5,827,957 A | 10/1998 | Wehinger |
| 5,895,846 A | 4/1999 | Chamussy et al. |
| 5,913,241 A | 6/1999 | Ohashi et al. |
| 5,929,801 A | 7/1999 | Aslanidis et al. |
| 5,939,977 A | 8/1999 | Monson |
| 5,945,908 A | 8/1999 | Nowicki et al. |
| 5,945,938 A | 8/1999 | Chia et al. |
| 5,955,949 A | 9/1999 | Cocita |
| 5,963,128 A | 10/1999 | McClelland |
| 5,965,808 A | 10/1999 | Normann et al. |
| 5,974,368 A | 10/1999 | Schepps et al. |
| 6,016,102 A | 1/2000 | Fortune et al. |
| 6,018,993 A | 2/2000 | Normann et al. |
| 6,025,777 A | 2/2000 | Fuller et al. |
| 6,025,780 A | 2/2000 | Bowers et al. |
| 6,034,597 A | 3/2000 | Normann et al. |
| 6,043,737 A | 3/2000 | Shehan et al. |
| 6,043,738 A | 3/2000 | Stewart et al. |
| 6,061,614 A | 5/2000 | Carrender et al. |
| 6,062,072 A | 5/2000 | Mock et al. |
| 6,084,530 A | 7/2000 | Pidwerbetsky et al. |
| 6,087,930 A | 7/2000 | Kulka et al. |
| 6,107,917 A | 8/2000 | Carrender et al. |
| 6,112,165 A | 8/2000 | Uhl et al. |
| 6,112,585 A | 9/2000 | Schrottle et al. |
| 6,124,786 A | 9/2000 | Normann et al. |
| 6,124,787 A | 9/2000 | Isakov et al. |
| 6,147,659 A | 11/2000 | Takahashi et al. |
| 6,148,888 A | 11/2000 | Fermin Benimeli |
| 6,175,301 B1 | 1/2001 | Piesinger |
| 6,175,787 B1 | 1/2001 | Breed |
| 6,181,241 B1 | 1/2001 | Normann et al. |
| 6,194,999 B1 | 2/2001 | Normann et al. |
| 6,198,392 B1 | 3/2001 | Hahn et al. |
| 6,217,683 B1 | 4/2001 | Balzer et al. |
| 6,218,936 B1 | 4/2001 | Imao |
| 6,228,929 B1 | 5/2001 | Larson et al. |
| 6,239,737 B1 | 5/2001 | Black |
| 6,243,007 B1 | 6/2001 | McLaughlin et al. |
| 6,246,317 B1 | 6/2001 | Pickornik et al. |
| 6,255,940 B1 | 7/2001 | Phelan et al. |
| 6,271,748 B1 | 8/2001 | Derbyshire et al. |
| 6,369,712 B2 | 4/2002 | Letkomiller et al. |
| 2001/0000430 A1 | 4/2001 | Smith et al. |
| 2001/0001553 A1 | 5/2001 | Hahn et al. |
| 2001/0004236 A1 | 6/2001 | Letkomiller et al. |
| 2001/0054959 A1 | 12/2001 | VanHorn et al. |
| 2002/0044050 A1 | 4/2002 | Derbyshire et al. |
| 2002/0140546 A1 | 10/2002 | Tuttle |
| 2002/0143668 A1 | 10/2002 | Goodwin, III |
| 2002/0149468 A1 | 10/2002 | Carrender et al. |
| 2002/0149480 A1 | 10/2002 | Shanks et al. |
| 2002/0149481 A1 | 10/2002 | Shanks et al. |
| 2002/0149482 A1 | 10/2002 | Shanks et al. |
| 2002/0149483 A1 | 10/2002 | Shanks et al. |

FOREIGN PATENT DOCUMENTS

| | | |
|---|---|---|
| EP | 1026016 | 8/2000 |
| EP | 1070580 | 1/2001 |
| WO | WO 97/18961 | 5/1997 |
| WO | WO 97/18962 | 5/1997 |
| WO | WO 97/21557 | 6/1997 |
| WO | WO 98/34799 | 8/1998 |
| WO | WO 99/29523 | 6/1999 |
| WO | WO 99/29524 | 6/1999 |
| WO | WO 99/41093 | 8/1999 |
| WO | WO 99/52722 | 10/1999 |
| WO | WO 99/52723 | 10/1999 |
| WO | WO 99/52724 | 10/1999 |
| WO | WO 99/53279 | 10/1999 |
| WO | WO 99/53740 | 10/1999 |
| WO | WO 99/61265 | 12/1999 |
| WO | WO 00/07834 | 2/2000 |
| WO | WO 00/34063 | 6/2000 |
| WO | WO 00/34062 | 7/2000 |
| WO | WO 00/47429 | 8/2000 |
| WO | WO 00/47430 | 8/2000 |
| WO | WO 00/69663 | 11/2000 |
| WO | WO 01/25033 | 4/2001 |

\* cited by examiner

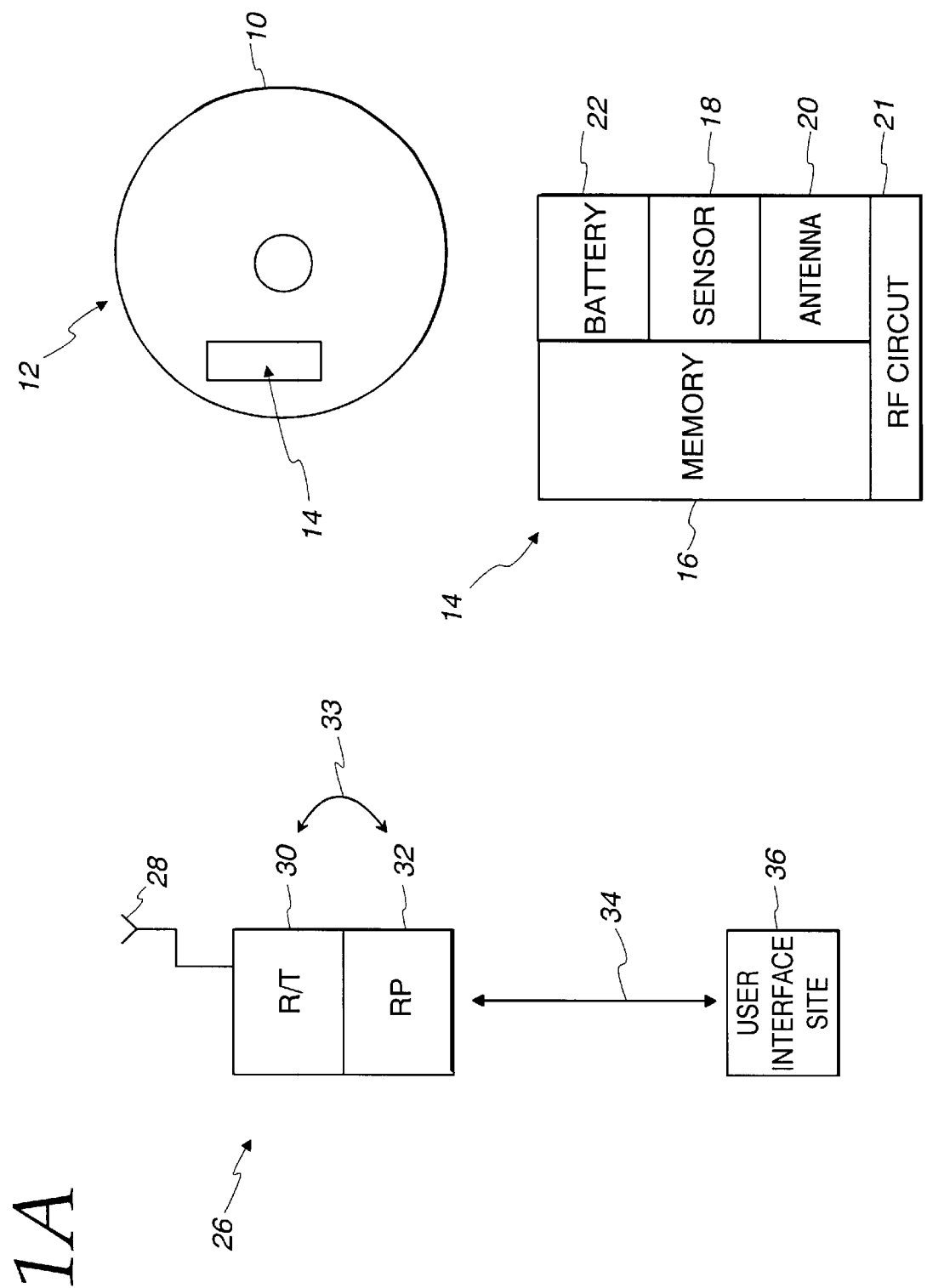

Fig 1B
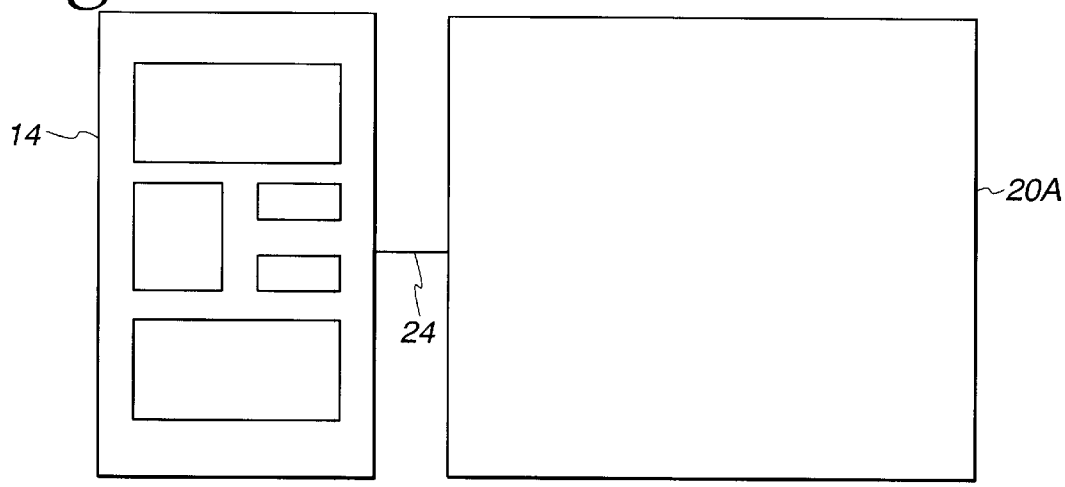
Fig 1C
Fig 1D
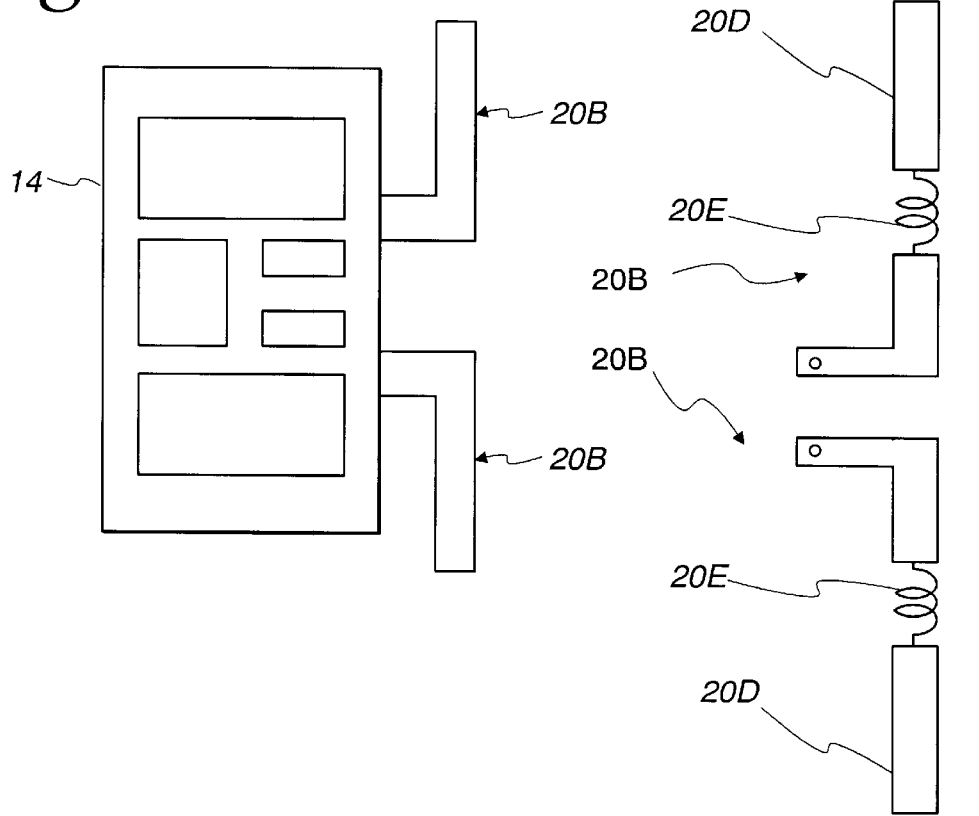

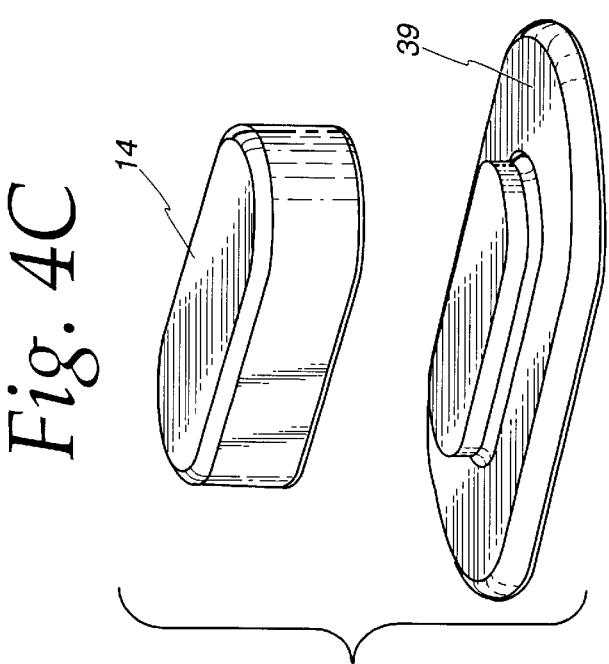
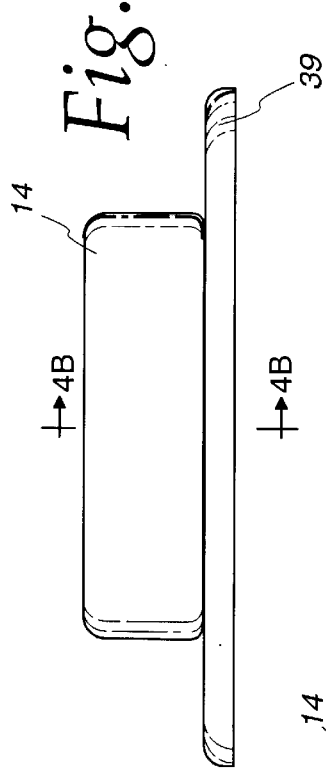
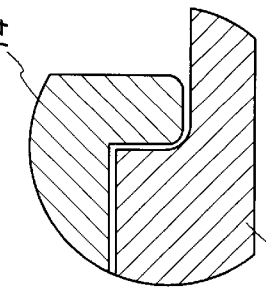
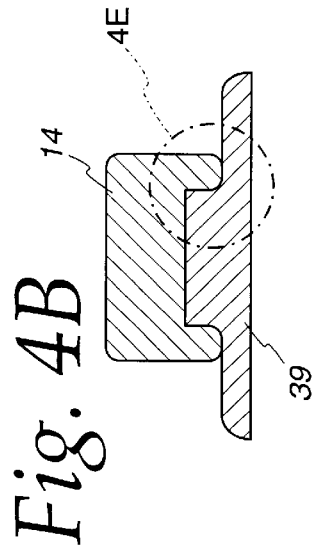
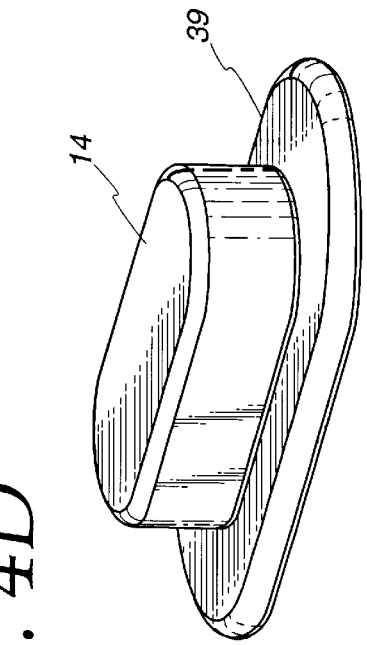

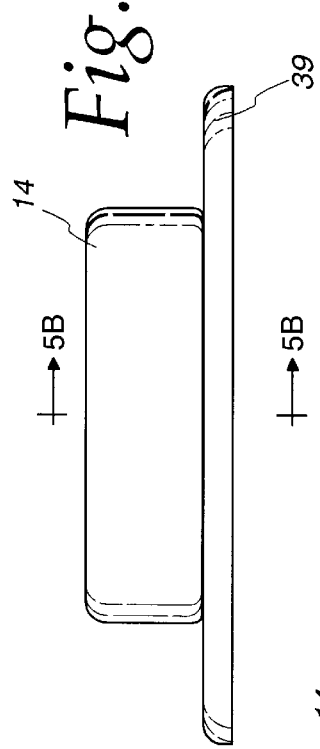
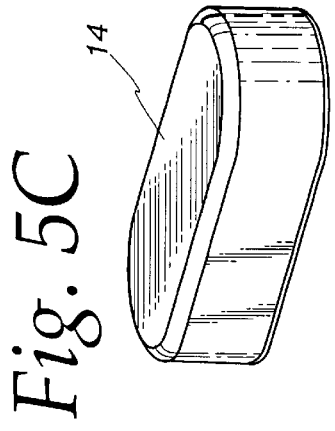
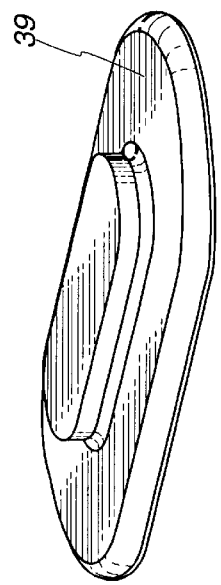
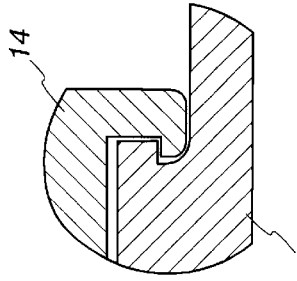
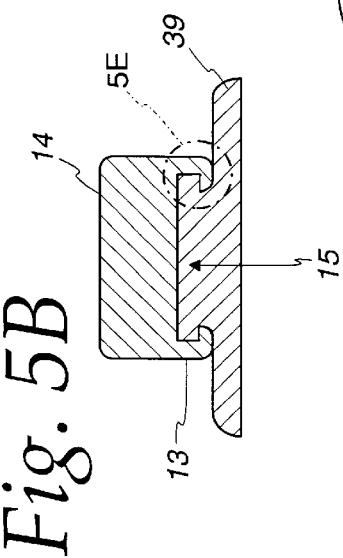
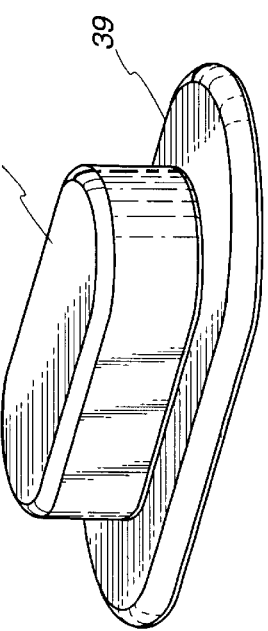
Fig. 5A Fig. 5B Fig. 5C Fig. 5D Fig. 5E

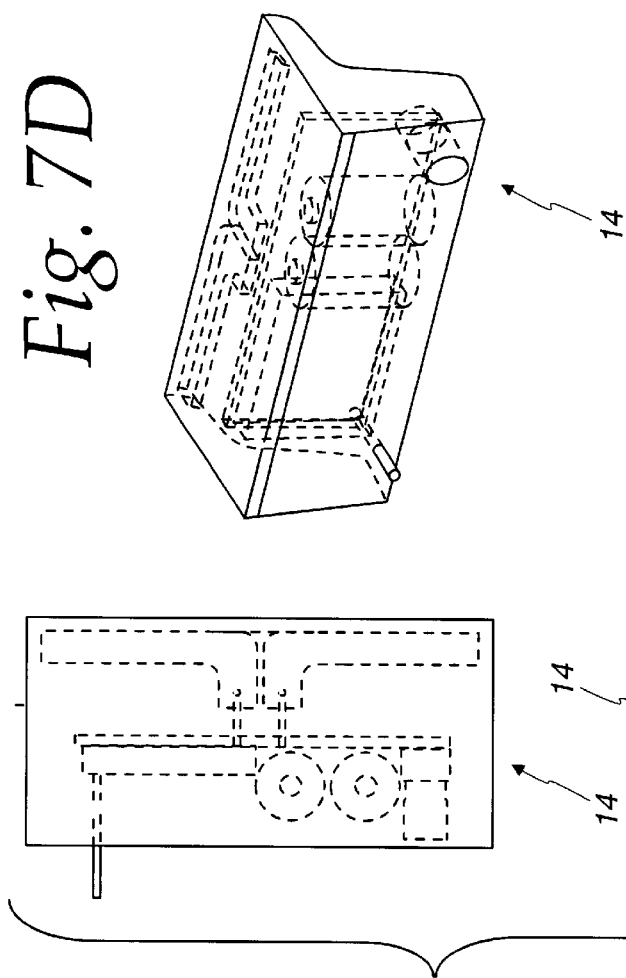
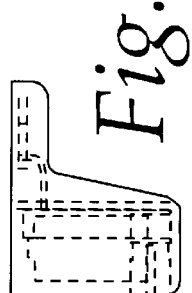
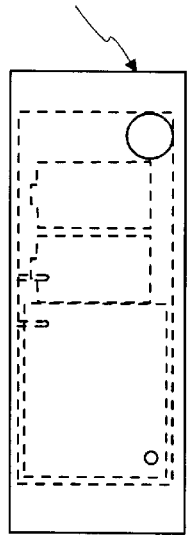
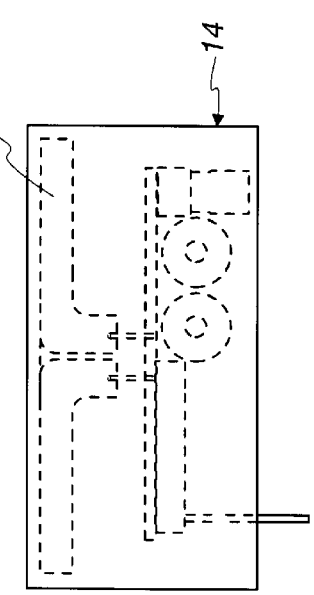
TAG NORMAL TO ANTENNA WITH REV C BOARD

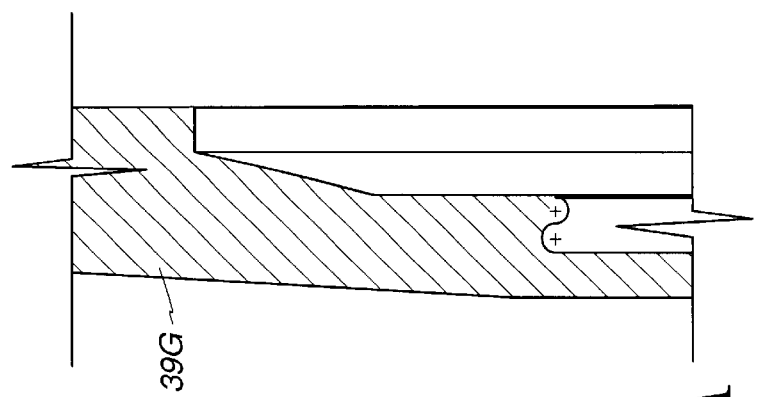
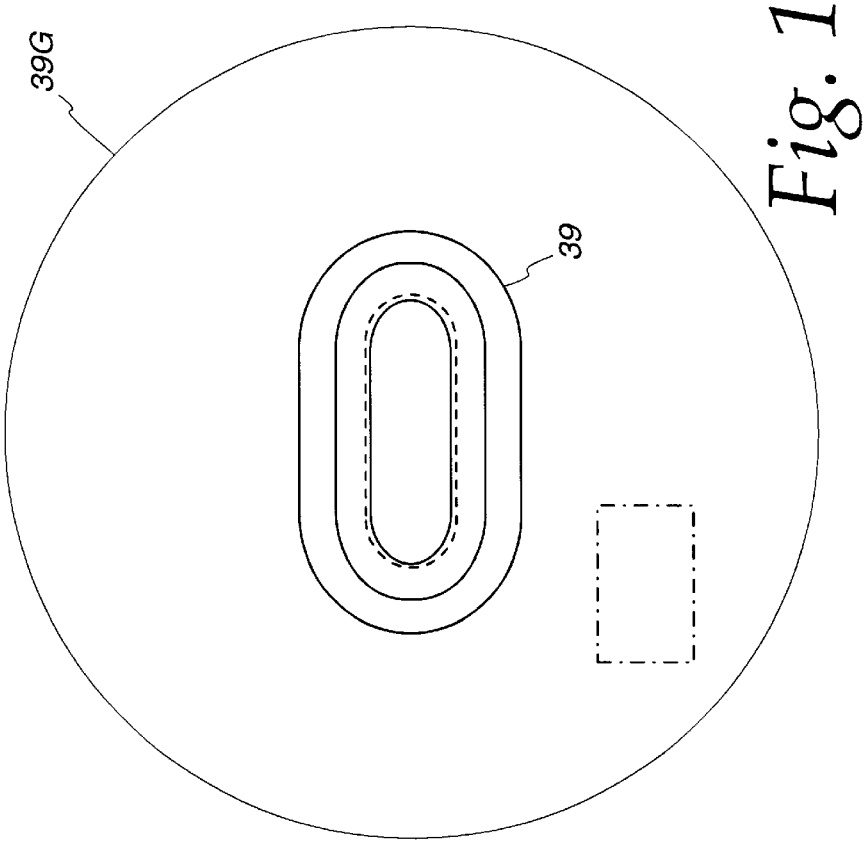
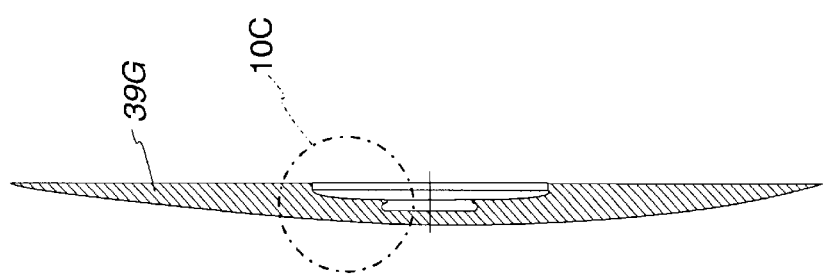

PACKET TIMING

Fig. 30 MAIN LOOP LAYER

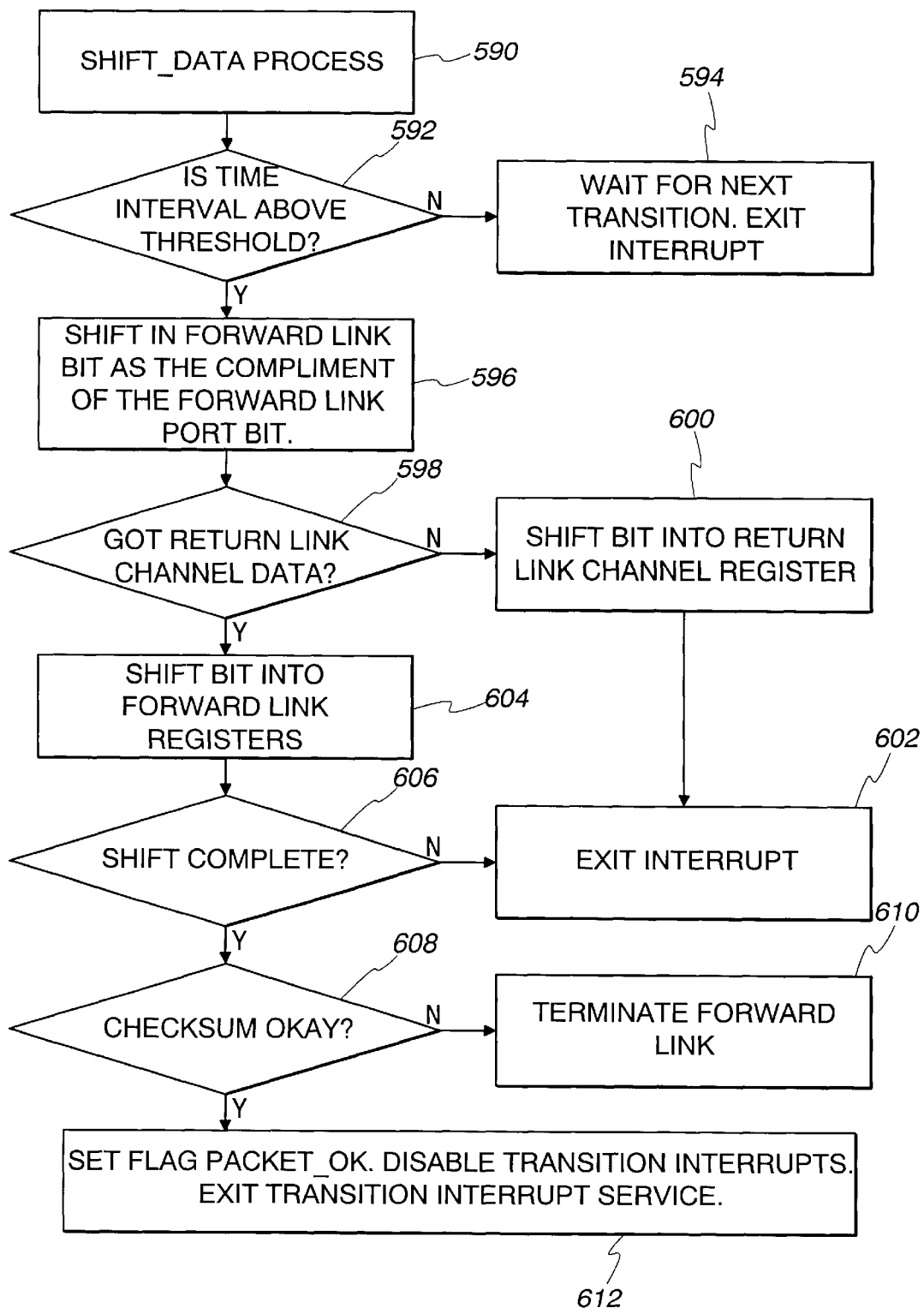

ELECTRONIC TIRE MANAGEMENT SYSTEM

CROSS-REFERENCE TO RELATED APPLICATION

This application claims the benefit of U.S. Provisional Application Ser. No. 60/220,896, filed on Jul. 26, 2000, which is assigned to the assignee of the present application. The applicants are claiming priority to this provisional application, making the effective filing date of this application Jul. 26, 2000.

FIELD OF THE INVENTION

The present invention relates in general to tire parameter monitoring systems and in particular to an electronic tire management system that has an electronic circuit in each tag that can conserve power by "sleeping" and that "wakes up" periodically to measure and store tire parameters such as temperature and pressure and then, when partially awake, looks for interrogation signals from a remote unit. The tag responds to that interrogation, if it is valid, by transmitting tire parameter information to the remote unit. The tag may also be programmed to wake up periodically, and transmit the last stored parameters on an autonomous basis, without interrogation. The tag also may be programmed to provide an "alert" transmission if more immediate attention is required.

BACKGROUND OF THE INVENTION

It is desirable to monitor tires for parameters such as temperature and pressure. It is particularly advantageous to monitor large tires for off-the-road (OTR) vehicles since these tires are very expensive and must be regularly maintained to maximize vehicle and tire efficiency.

In the past, tire monitoring devices have ranged from systems that monitor tire pressure by connections to the valve stem (U.S. Pat. No. 4,734,674), to systems that use magnetic coupling to receive the signals external of the tire (U.S. Pat. No. 4,588,978), to sophisticated systems that measure rate of change of pressure in the tire and then change the rate of transmission of the data depending upon the rate of change of pressure (U.S. Pat. No. 5,656,992). Other systems are activated by a radio frequency transmission that energizes the tire tag circuit by inductive coupling devices. See U.S. Pat. No. 5,166,676.

Passive devices that rely on inductive magnetic coupling or capacitive coupling generally have the disadvantage of requiring lengthy coil windings, thus requiring major modifications in the tire construction and assembly process. Another serious disadvantage with such passive devices is that the interrogator must be positioned in very close proximity to the tire, usually within a few inches of the tire, in order to allow communication between the tire and the device. Because of the proximity requirements, continuous monitoring is impractical since it would essentially require that an interrogator be mounted at each wheel of the vehicle. Manual acquisition of the data from the passive devices embedded in each of the tires is also cumbersome and time-consuming because of the proximity requirements.

Other prior art devices used for monitoring tire conditions are comprised of self-powered circuits that are positioned external of the tire, such as at the valve stem. Externally mounted devices have the disadvantage of being exposed to damage such as from weather and vandalism. Additionally, externally installed devices can easily become disassociated from a particular tire that is being monitored.

Another disadvantage with known tire monitoring and identification devices is that communication transmissions are achieved using conventional radio frequencies that generally require a relatively large antenna which must be mounted externally or secured to the tire in such a manner that relatively major modifications are required in the tire construction or assembly process.

Various ones of these problems have been addressed by the devices shown and described in U.S. Pat. Nos. 5,500,065; 5,562,787; 5,573,610; and 5,573,611. However, these devices are contained within the tire wheel chamber and have difficulty transmitting data through the tire to external receivers. Also some additional devices are contained within valve stems that do not attached directly to the tire so they do not provide a permanent record of the tire since a different tire could be removed and replaced with another tire on the same rim containing the device. Also, these prior art devices either attach to the tire, to the wheel, or to the valve stem exclusively and do not provide design flexibility which is desired in many applications.

Also, when using RF frequency communication, difficulties are encountered in transmitting the signals to a remote location due to the signals being required to pass through the tire sidewall(s), which, due to tire thickness at this location, materially reduces the transmission efficiency thereof. It has been observed that the amount of carbon content in the tire affects transmissibility of RF signals thus posing problems for antenna designs. Further, problems occur with prior art antennae etched into or placed on a substrate or printed circuit board. Good transmissions from such construction may occur in one direction only through the tire sidewalls. A tire may be "reverse" mounted with the tag on an inside wall. Such mounting may increase the difficulty of transmitting through the tire sidewalls in the desired direction. It would be desirable to have an antenna structure that can transmit in at least two directions through both sidewalls.

Although the tire monitoring devices disclosed in the above-mentioned documents provide limited advantages, a tire monitoring system is needed that provides versatility and flexibility by permitting separation of system functions into discrete components capable of improving external RF communication reception in terms of signal/noise ratio, reproducibility and distance. Separate components are used, but combined into a single device structure, including a measuring device attached directly to the tire inner liner to sense temperature, pressure, and other tire parameters, and a transponder which is associated with the tire for transmitting data from the tire/wheel to a separate external receiver. In addition, advantages in programming the transponder enable enhanced battery life, thus extending the useful life of the transponder.

It also may be desirable to "read" the tire data as a vehicle passes a standing interrogator. Therefore, a quick and positive identification system for each active tag is highly desirable.

The present invention provides improved cycling arrangements for battery conservation, novel tag identification techniques, and flexibility in the transponder's transmission performance.

SUMMARY OF THE INVENTION

The present invention overcomes the disadvantages of the prior art by providing an electronic tire tag management system in which the device generally deep sleeps to conserve power, periodically partially awakens to a first level and measures a tire parameter or parameters such as pressure and temperature, stores that data in memory, and goes back to a deep sleep. During those periods when the device partially awakens to a first level to measure the tire parameters, or at other programmed times, it may check for interrogation signals from a remote source. If it detects no such signals, it goes back to sleep. If, however, it does detect what appears to be a signal, it awakens to a second level and examines the transmission more thoroughly. If, in fact, it is a transmission, the device awakens completely and then responds to the transmission. If, however, the transmission is not valid, the device again goes back to sleep. Further, if the signals are not clear or if more than one tire tag appears to respond simultaneously, the remote unit will utilize a novel successive approximation routine (SAR) to identify the tire, give the device a temporary identification number, and communicate with it.

The novel system can also perform autonomous transmission when a specific condition, such as out of preset limits, occurs for a tire parameter.

The device also may be programmed to provide autonomous transmission in certain instances such as when alarm conditions exist, or at regular programmed intervals.

The device conserves energy with its "sleep/wake-up" routine.

It is also programmable to perform any number of desired functions. For example, the system provides a short way of identifying a tag as one out of many transmissions.

Thus, it is an object of the present invention to provide an electronic tire management system that conserves energy.

It is a further object of the present invention to provide an electronic tire management system that is programmable to allow a number of functions to be performed.

It is yet another object of the present invention to provide a way to identify a particular tire out of many tires as well as to identify a particular tire when multiple transmissions are being simultaneously received.

It is also an object of the present invention to provide an electronic tire management system that utilizes autonomous transmission which interrupts its sleep cycle when a particular program condition occurs, such as an alarm condition or for a periodic transmission, or both.

Further, it is an object of the present invention to provide a tire tag that has a parameter measuring function that is totally independent of the data transmission and reception function.

It is still another object of the present invention to provide autonomous or unsolicited transmission under preprogrammed conditions.

BRIEF DESCRIPTION OF THE DRAWINGS

These and other features of the present invention will be more fully disclosed when taken in conjunction with the following Detailed Description of the Invention in which like numerals represent like elements and in which:

FIG. 1A represents one general overview of the components comprising the electronic tire management system (ETMS) according to the teachings of the present invention wherein a single tire tag is being monitored;

FIGS. 1B–1D detail alternative antenna configurations which may be used in conjunction with the tire tag;

FIGS. 4A, 4B, 4C, 4D and 4E are a side view, a cross-sectional view, a perspective view of the disassembled potted tire tag assembly and the tire patch on which it is to be mounted, a perspective view of the potted tire tag assembly mounted on the tire patch, and a cross-sectional view of a portion of the tire tag and patch shown in FIG. 4B;

FIGS. 5A, 5B, 5C, 5D and 5E are a side view, a cross-sectional view, a perspective view of a disassemble potted tire tag assembly and a tire patch, a perspective view of the assemble tire tag and tire patch, and an exploded cross-sectional view of a corner of FIG. 5B illustrating how the tire tag is mated to the tire patch;

FIGS. 7A, 7B, 7C and 7D are a back view, a top view, end and back views, and a perspective view of another embodiment of a potted tire tag assembly with the antenna normal to the printed circuit board and having a rectangular base rather than an oval base;

FIGS. 10A, 10B and 10C are a plan view, cross-sectional view, and a cross-sectional view of a portion of the patch mold shown in FIG. 10B, illustrating the T-shaped plateau of the upper half mold used to fabricate tire patches according to one embodiment of the invention;

FIG. 34 is a flow chart illustrating the shift data process.

DETAILED DESCRIPTION OF THE INVENTION

Figure 2C:
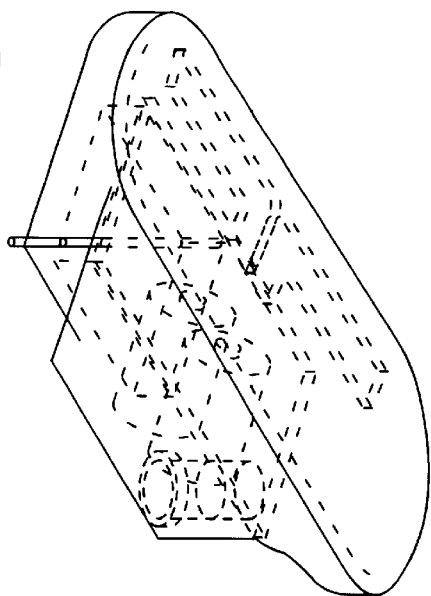
FIGS. 2A, 2B, 2C and 2D are side, top, perspective, and end views, respectively, of a potted tire tag assembly with the antenna parallel to and spaced from the printed circuit board.

Illustrated in FIG. 1A of the drawings in diagrammatic block form is a communication subcomponent of an electronic tire management system (ETMS) in its most basic form. Particularly, located within tire 10 is a tire tag 14. Various methods of attaching the tire tag 14 to the interior of the tire have been described in various patents and related applications, including U.S. Pat. No. 5,500,065 entitled "Method for Embedding a Monitoring Device Within a Tire During Manufacture"; U.S. Pat. No. 5,562,787 entitled "Method of Monitoring Conditions of Vehicle Tires"; U.S. Pat. No. 5,573,610 entitled "Tires Containing a Monitoring Device for Monitoring an Engineering Condition Therein"; U.S. Pat. No. 5,573,611 entitled "Method of Monitoring Conditions of Vehicle Tires and Tires Containing a Monitoring Device Therein"; and U.S. Pat. U.S. Pat. No. 5,971,046, filed Sep. 17, 1997, and entitled "Method and Apparatus for Bonding an Active Tag to a Patch and a Tire"; all commonly assigned to the assignee of the present invention and all of which are incorporated herein by reference in their entirety.

Tire tag 14 includes a memory device 16, a monitoring device (sensor) 18, and a tire tag antenna 20. Signals are emitted from and received by tire tag 14 through tag antenna 20. A power source such as a battery 22 is provided for energizing tire tag 14. An RF circuit 21 is also provided on tag 14 for receiving signals from and transmitting signals to a remote reader/transceiver 30 or interrogator 26. An associated vehicle 12 will preferably have a tire tag 14 for each individual tire 10.

Also shown in FIG. 1A is one form of an external data system 26 (remote interrogator) designed to operate interactively with tag 14. It is to be appreciated that external data system 26 may include a variety of components dependent upon the particular implementation, and the design of the components themselves may be configurable to specific implementations. For example, the interrogation device may be fixedly mounted for drive-by interrogation, hand-held, or located on the vehicle near the vehicle operator.

On a general level, external data system or interrogator 26 includes an antenna 28, a reader/transceiver (RT) unit 30, and a reader processor (RP) unit 32. Antenna 28 is configured to receive signals from tag antenna 20 and also to transmit data from external data system 26 to tag 14 (or other tag units). RT unit 30 illustrates one system for receiving and transmitting signals to and from tag 14. RP unit 32 interacts with RT unit 30 to both receive and interpret data and to provide signals which are transmitted by the RT unit 30 via a communication channel 33 of some type.

A communication channel 34 may be provided from RP unit 32 to a user interface site 36. The user interface site 36 may be a field support computer, an unintelligent or intelligent terminal, or other device that allows a user to either view and/or interact with data processed by external data system 26. Communication channels 33 and 34 can be provided in any one of a number of embodiments such as wire line, wireless cable, microwave, satellite, or other communication path. Further, user interface 36, while shown separately from the external system 26, may be incorporated therein.

Alternatively, the reader processor (RP) unit 32 and receiver/transmitter (RT) unit 30 can be separate units where RP unit 32 is part of the user interface 36 and is itself remote from the RT unit 30. RT unit 30, while shown as a single unit, may in some embodiments be multiple RT units. As an example, in some situations, it may be advantageous to provide individual RT units physically located on opposite sides of a vehicle with each unit reading tags from the side of the vehicle on which it is located. The data obtained from individual tires may thus be downloaded to a "tire" database forming part of a tire management system.

In FIG. 1A, tire tag antenna 20 is illustrated simply as a block. However, the inventors have found that to assist in transmission of tire tag signals through either or both of the tire walls and for durability, unique antenna designs for particular implementations are useful. In preferred embodiments shown in FIGS. 1C and 1D, the tag antenna will be a dipole antenna that may be potted and mounted within a rubber patch that is permanently bonded to the inner liner of a cured tire. The antenna will have suitable functional connections that can be made to the tag electronics.

Other antenna configurations that may be possible are illustrated in FIG. 1B as a hinged antenna design where one or more plate-like projections 20A are interconnected via connecting elements 24 to the operating electronics of tire tag 14. Of course, FIGS. 1C and 1D illustrate the preferred embodiments where the antenna elements 20B are two strips operating in dipole fashion and connected to the operating elements of the tire tag 14 with the antenna being attached to a rubber patch permanently affixed to the inside of the rubber tire. In order to assure a good connection in use, the tag components and the antenna may first be encapsulated in an epoxy such as Stycast®, and then affixed to the rubber patch attached to the inside of the tire 10.

It may be preferable to encapsulate the electronic printed circuit board and separate antenna in the epoxy so that both will be encapsulated in one block. The encapsulated block may be bonded to the patch which in turn may be bonded to the inner lining of the tire. The advantages of this approach are several. First, it provides improved mechanical integrity. The antenna is encapsulated with the electronic printed circuit board and therefore not subjected to the mechanical stresses associated with the patch. Secondly, by providing a separate antenna, the antenna can be located further away from the ground plane on the electronic circuit board thus providing a stronger signal. Third, the preferred antenna type is a dipole which radiates signals off both sides of the tag and provides an advantage over single directional antennas such as a patch antenna. Fourth, better matching of components is provided when the antenna is capsulated in the potting material which, when properly matched, provides consistent matching and loading of the antenna. Fifth, there is lower cost in the manufacture because there does not have to be a tight control of the impedance of the microstrip circuitry and the use of expensive circuit board materials and the step of building the antenna within the rubber patch is eliminated.

Figure 2D:
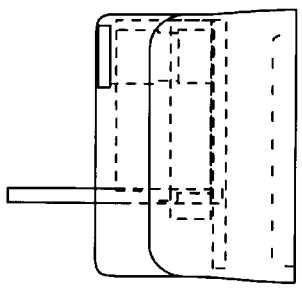
Figure 2A:
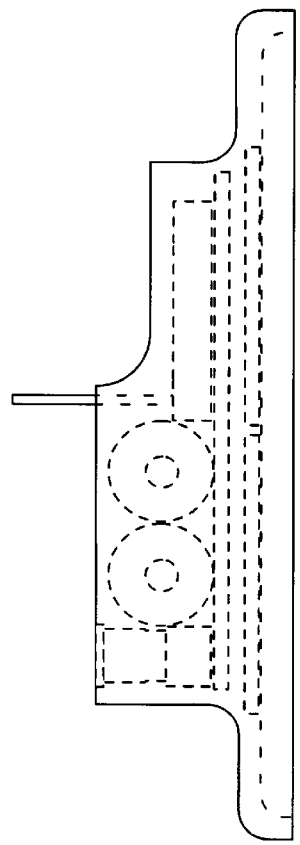
Figure 2B:
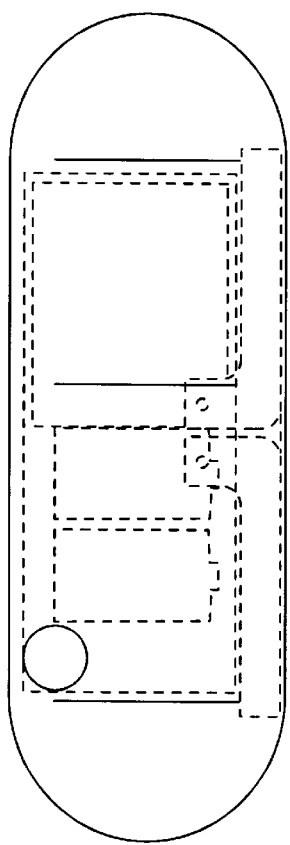
Figure 3C:
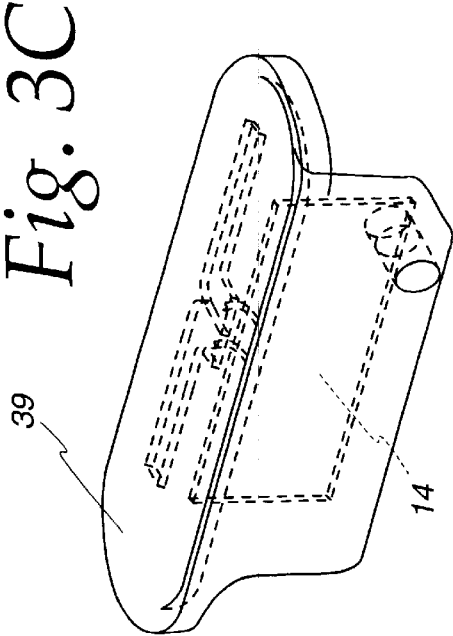
FIGS. 3A, 3B, 3C and 3D are side, plan, perspective, and end views of a preferred potted tire tag assembly with the antenna normal to the printed circuit board.
Figure 3D:
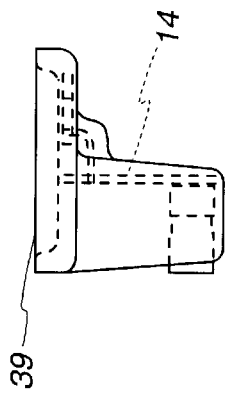
Figure 3B:
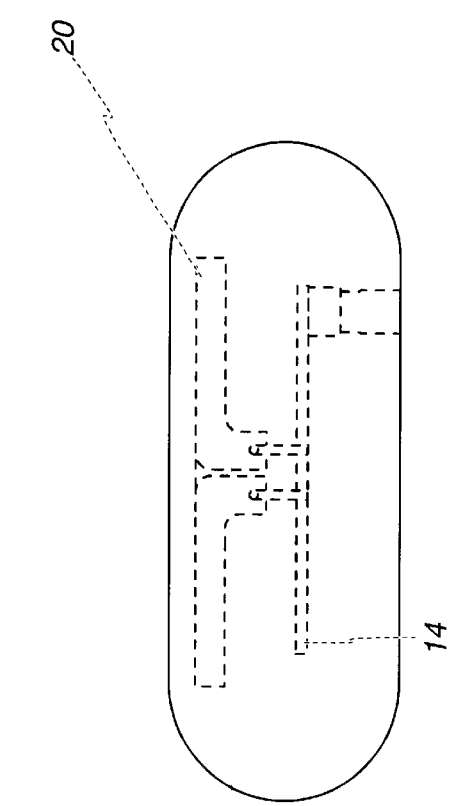
Figure 3A:
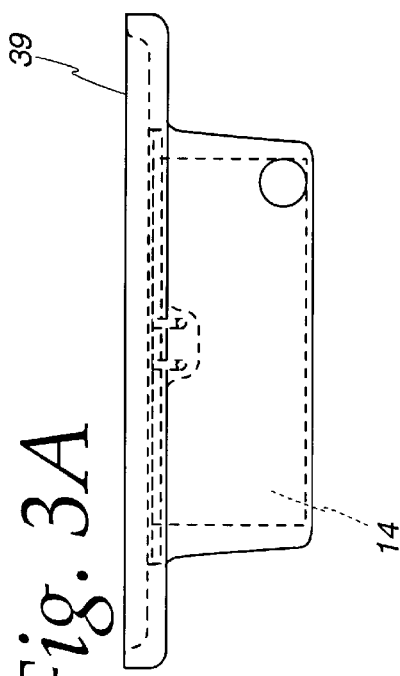
Figure 6C:
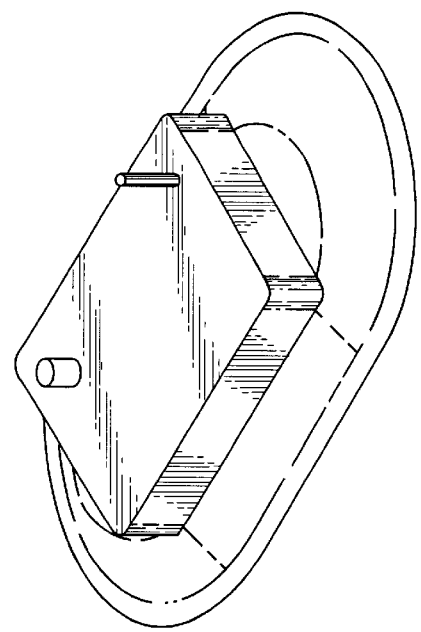
FIGS. 6A, 6B, 6C and 6D are a plan view, side view, perspective view, and end view of another embodiment of a potted tire tag assembly mounted to a tire patch.
Figure 6D:
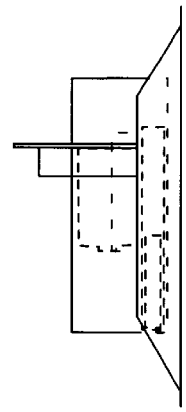
Figure 6A:
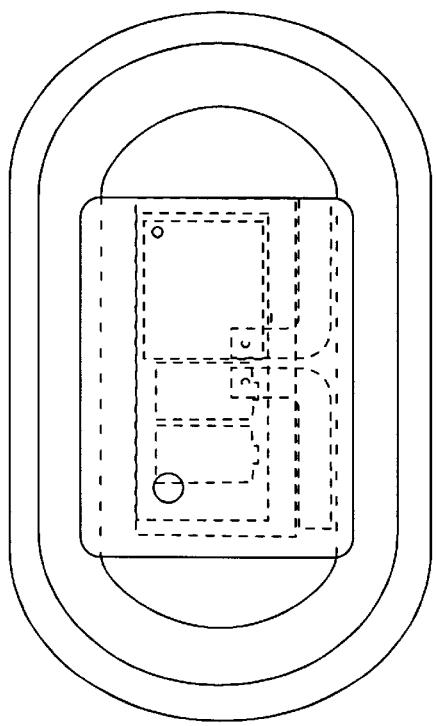
Figure 6B:
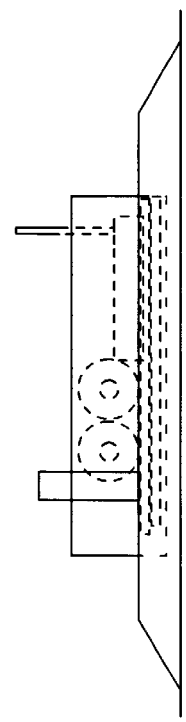

As shown in FIG. 1D, inductors 20E may be placed in series with the dipole antenna elements 20D to enable shorter dipole elements 20D to be used. Thus, in FIG. 2 there is disclosed one preferred embodiment of the tire tag that is potted or encapsulated in the material such as Stycast® or other normally used potting materials. FIG. 2A is a side view illustrating the printed circuit board having the antenna attached thereto in a plane parallel to the printed circuit board. FIG. 2B is a plan view of the novel potted tire tag while FIG. 2C is a perspective view and FIG. 2D is an end view. Note that the base of the tire tag is oval in shape and has a recess therein for mounting on the tire patch as will be disclosed hereafter.

FIG. 3 is another preferred concept of the tire tag which is potted and which has the antenna normal to the printed circuit board of the tag instead of parallel. FIG. 3A is a side view, FIG. 3B is a plan view, FIG. 3C is a perspective view and FIG. 3D is an end view. Again, the base is of an oval shape with a recessed area therein to enable it to be mounted on a tire patch as will be illustrated hereafter.

FIG. 4 illustrates one method of mounting a potted tire tag to a molded tire patch. FIG. 4A is a side view of the potted tire tag mounted on the tire patch. FIG. 4B is a cross-sectional view of FIG. 4A taken along lines A—A and illustrates the recess under the base of the potted tire tag for mounting on a mesa or plateau area formed on the tire patch. FIG. 4C is an exploded perspective view illustrating the potted tire tag unit and the tire patch having the mesa or plateau formed thereon for receiving the tire tag.

FIG. 4D is a perspective view of the unit when the tire tag is assembled to the tire patch. FIG. 4E is a cross-sectional view of one corner of FIG. 4B illustrating how the recessed base of the potted tire tag is placed on the mesa or plateau of the tire patch. The patch may be bonded to the tire tag in any well-known manner.

FIGS. 5A–5E represent another preferred embodiment illustrating a different method of attaching the tire tag to the tire patch. As can be seen in FIGS. 5B and 5E, the tire patch has a T-shaped mesa and the recessed bottom portion of the patch has a matching recess to receive the T-portions of the tire patch thus locking the tire patch to the tire tag as shown.

FIGS. 6A–6D illustrate still another embodiment of a tire tag and tire patch system in which a potted tire tag, rectangular in shape, is placed in a recess in a tire patch and attached thereto so that the entire unit can be bonded to the tire.

FIGS. 7A–7D are similar to the embodiment shown in FIG. 3 with the exception that the base of the tire tag is rectangular instead of oval. The unit is again potted with the antenna normal to the tire tag printed circuit board.

Figure 8:
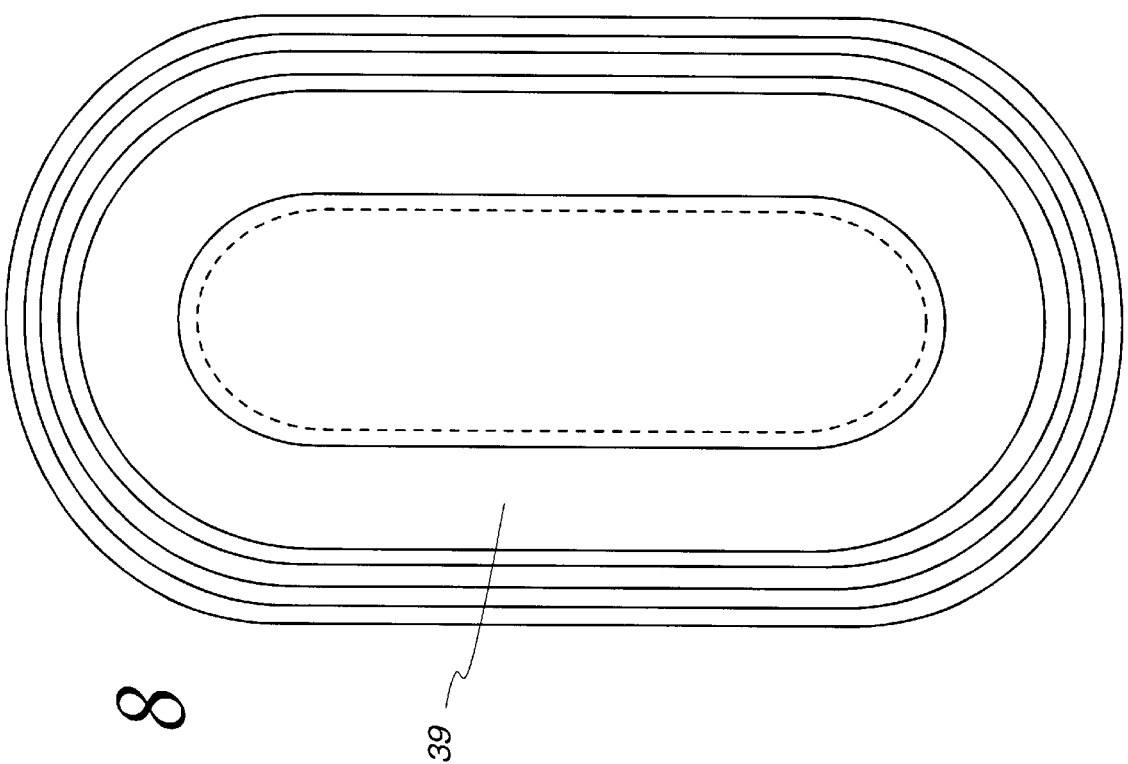
FIG. 8 is a full-scale top view of a layered patch showing the layers used to fabricate a patch having a T-shaped raised portion.

FIG. 8 is a plan view of the tire patch with the raised oval T-shaped pedestal in the center for receiving the embodiment of the tire tag illustrated in FIG. 5.

Figure 9:
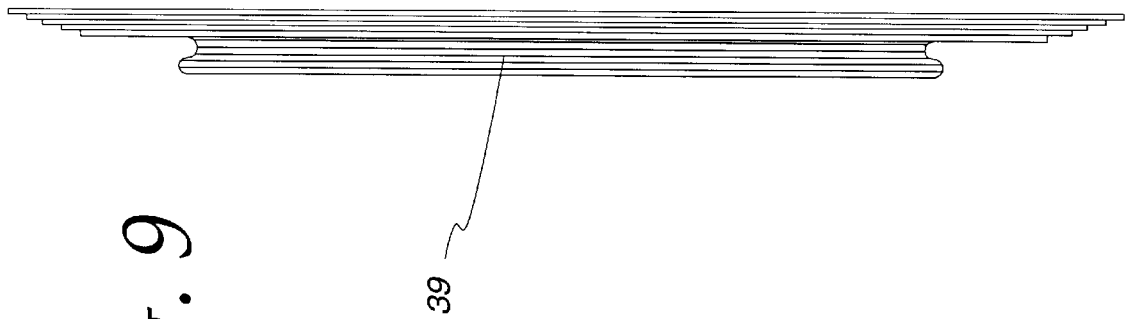
FIG. 9 is a side view of the patch shown in FIG. 8.

FIG. 9 is a side view of the tire patch illustrating the various layers that are used to form it and to create the T-shaped pedestal on which the tire tag is mounted as shown in FIG. 8 and FIG. 5.

FIGS. 10A–10C illustrate the mold for making the tire patch having the T-shaped plateau to which the tire tag can be mounted.

Figure 11A:
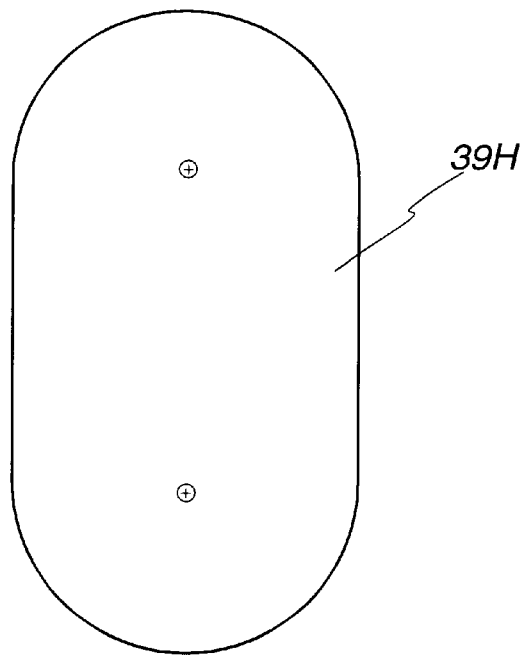
FIG. 11A and FIG. 11B are a plan view and side view, respectively, of the lower half of the mold illustrated in FIGS. 10A–10C.
Figure 11B:
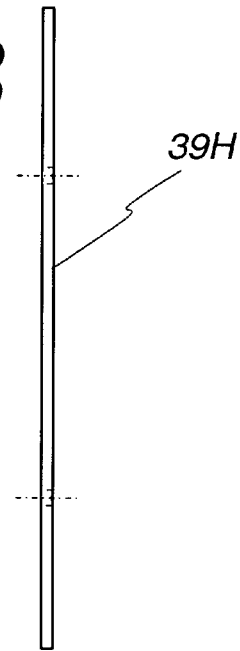

FIGS. 11A and 11B illustrate the lower half of the mold for FIG. 10.

Figure 12:
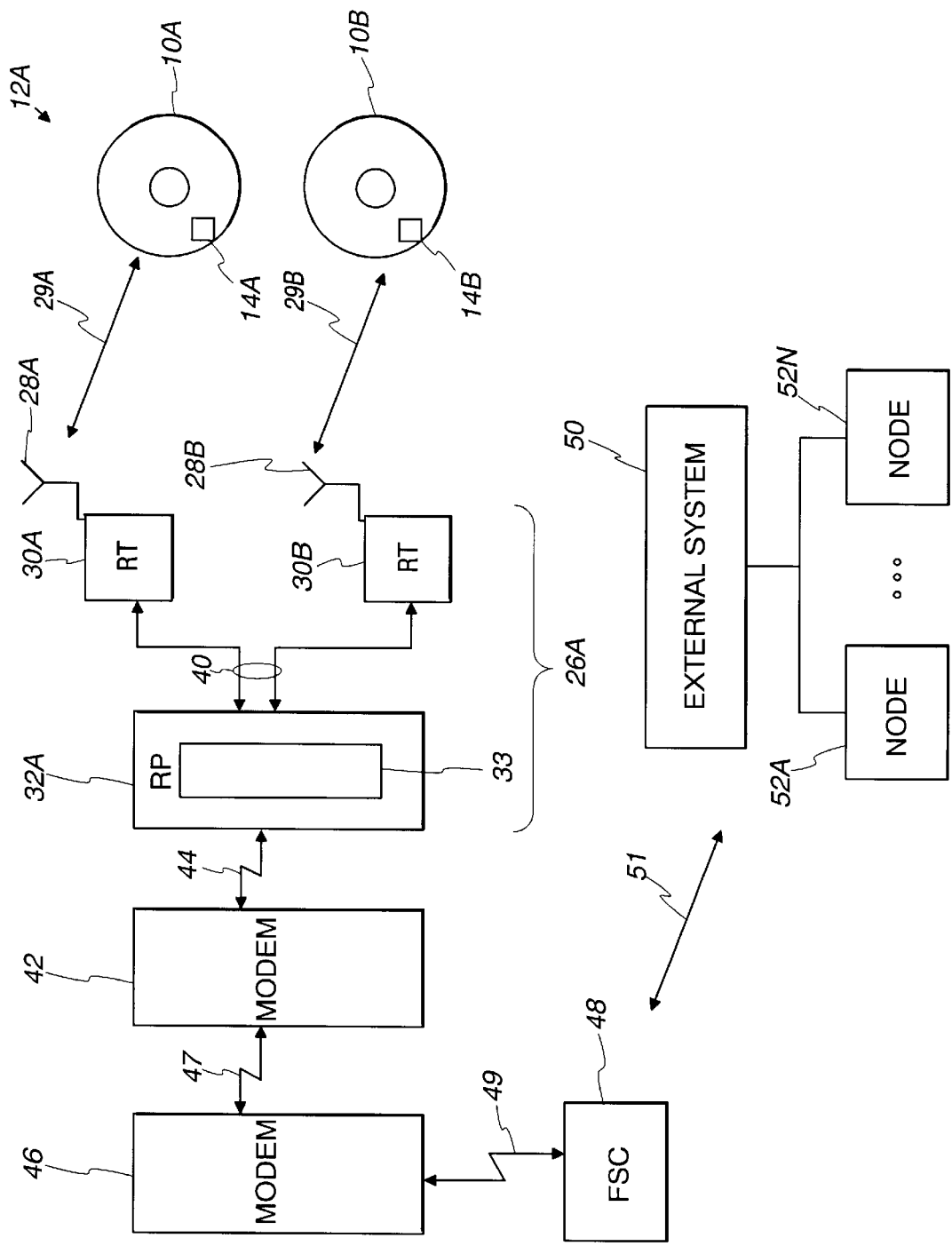
FIG. 12 illustrates another embodiment of the ETMS of the present invention wherein multiple tire tags and multiple receiver/transmitter units are utilized.

FIG. 12 illustrates an alternate configuration of the concepts described and set forth in FIG. 1. In this embodiment, vehicle 12A is shown with two tires, 10A and 10B, each having respective tire tags 14A and 14B attached on the inner surface thereof. These tire tags 14A and 14B are self-powered units that may be contained within a hard epoxy (or similar) housing or coating or any other protective housing termed "potting". These potted tags may be affixed within the tire in a rubber patch that is permanently bonded to the inner liner of the cured tire such as disclosed in commonly assigned U.S. Pat. No. 6,030,478 incorporated herein by reference in its entirety. The tag antenna is dispersed within the rubber structure of the patch in the preferred embodiment and suitable functional connections made for connection to the tag electronics. The tag and patch assembly is attached to the tire as a single unit.

Also depicted in FIG. 12 is external data system 26A that may be of different types such as a fixed gate reader system or portable reader system. The fixed gate reader system is designed for installation at locations such as fuel islands. Besides reading the most recent tag sensor information from memory, downloads of tag history data may also take place through this system during the periods when vehicles are stationary. Communications to these readers may be through hardwired phone lines, RF modem lines, or local area network (LAN) lines.

As stated earlier, the external data system 26A may be a portable reader system. This system may be used for initial programming or reprogramming of tags as tires are mounted and unmounted on vehicles, for reading the most recently stored sensor data from tags, and for downloading tag history information from the tag. This device is battery powered, contains a keypad/keyboard or touch screen entry for user control, possesses an LCD display for control and data display, has sufficient memory to retain tag data from multiple tags for a lengthy period between data retrieval and offload to a computer or to an on-board reader system, and possesses an interface to a computer system that allows offload of (tags) stored data to the computer database. The interface may be an RS-232 serial port, an Ethernet connection, or one of several other possible configurations that are known to those skilled in the art.

As shown in FIG. 12, this embodiment of the external data system 26A includes a first receiver/transmitter (RT) unit 30A and a second receiver/transmitter (RT) unit 30B. Each unit has associated with it an antenna 28A and 28B, respectively. Reader processor (RP) 32A is a separate component in communication with RT units 30A and 30B through communication channel 40. Reader processor 32A may be connected to a first data transmission device 42 through communication channel 44. It is to be noted that the RT power supply may be located in the RP unit. First data transmission device 42 is configured to communicate, as needed, with second transmission device 46 either through a wire line, wireless, satellite, optical, or other communication channel 47. In one embodiment, data transmission devices 42 and 46 may be modems. The second data transmission device 46 is designed to communicate with user interface 48, which may be a field support computer 48 through a communication channel 49 that could be an RS-232 serial port, an Ethernet connection, or one of several other possible configurations.

As previously discussed, various configurations of the present invention can be employed. One such configuration, shown in FIG. 12, has data from the user interface 48 remotely transferred to an external system 50 whereby, for example, the information from user interface 48 is transmitted across a communication channel 51, such as an internet connection, to a variety of nodes 52A–52N. The external system 50 may be a PC system with appropriate software to run and maintain a database and archive of tag data.

The user interface 48 may be a reader system that resides on the vehicle having tires in which the tags are mounted.

The system is powered from the vehicle and has the ability to store tag data until it is routed to the external system 50 via an RF or other desired link.

The system illustrated in FIG. 12 may also be used for installation at various locations around a particular site, such as a mine site to provide early warning of low inflation/high temperature alert conditions for users who do not have an on-vehicle reader system. These surveillance readers are primarily listen-only readers. They may be installed at locations such as major intersections, vehicle-ready lines, shovels, crushers, dump sites, loaders, maintenance yards, tire shops and the like. The purpose is to provide a lower cost system for low pressure warning than would be achieved by outfitting each piece of equipment with an on-vehicle reader. A fixed gate reader or portable reader provides tire pressure maintenance support for such an installation. That is, it provides assured reads of the most recently stored sensor data on demand regardless of the work status. The surveillance reader must be tied to either a dispatch system or hardwired phone line or RF modem or similar communications line to provide data to a central location 50 in the event of receiving low pressure alerts from installed tags. User interface 48 between the readers and the dispatch system transfers the tire tag data gathered by the various reader systems to the dispatch system. The dispatch system provides the medium for transmitting this data from the reader location to the central electronic tire management system data storage location 50. The specific locations vary from customer-to-customer depending upon need.

In the preferred embodiments shown in FIGS. 1A and 12, data is obtained by the external data systems 26, 26A from the tire tags 14, 14A, 14B over a wireless RF link operating in the 902–928 MHz range (known as the Industrial, Scientific, and Medical (ISM) frequency band). Other apparent frequency ranges can be utilized without departing from the invention. This band is primarily intended for use for unlicensed transmitters which have been certified under Part 15 of the Federal Communications Commission Code (47 C.R.F. §15). Many devices such as cordless phones and wireless LANs share the 902–928 MHz band and the electronic tire management system is designed to coexist and operate robustly among these other devices.

To minimize signal interference, the forward link (i.e., reader-to-tag) accomplishes this by hopping among several RF channels in a pseudo-random manner. Each forward command is originated on a different frequency from the previous command and therefore avoid continuous interference from another device operating in this bandwidth. Hopping the forward link in this manner also allows the system to transmit the maximum signal radiation (+36 dBM) under FCC Part 15. The 902–928 MHz band were selected in part because this bandwidth was determined to be efficient in radiating signals through the tire wall as stated previously. A specific frequency in the preferred embodiment is 915 MHz for radiating data through the tire wall. While lower frequencies may be used, they provide narrower bandwidth.

Tire tags 14A, 14B installed in tires 10A include sensors (shown in FIG. 13) to sense the tire air pressure and temperature. These tire tags provide the user with (1) a unique tire identifier that can be used for tire record-keeping purposes; (2) the most recently stored sensor data of tire pressure and temperature or other tire parameters when queried; (3) the ability to report tire pressure and temperature and other tire parameters, autonomously depending upon reader type used such as on-board or surveillance readers; (4) a readout of all the tire parameters including pressures and temperatures, a determination if the tire is out of program limits, the wheel position, the tire identification, and the vehicle number at a local and/or remote location where local refers to the specific site (i.e., at the fuel island, on-board, or hand-held) and remote refers to the data transferred to another location (i.e., the tire shop or dispatch); (5) the ability to autonomously and periodically transmit an alert when out-of-tolerance pressure/temperature conditions exist with tire condition being sampled periodically to determine if an alert is required and having programmable reference conditions that are used by the tag to determine if an alert condition is present; (6) a history of the temperature and pressures and other tire parameters experienced by the tire over a specified interval selected by the user; and (7) the ability to enter alert set points and wake-up time intervals.

Figure 13:
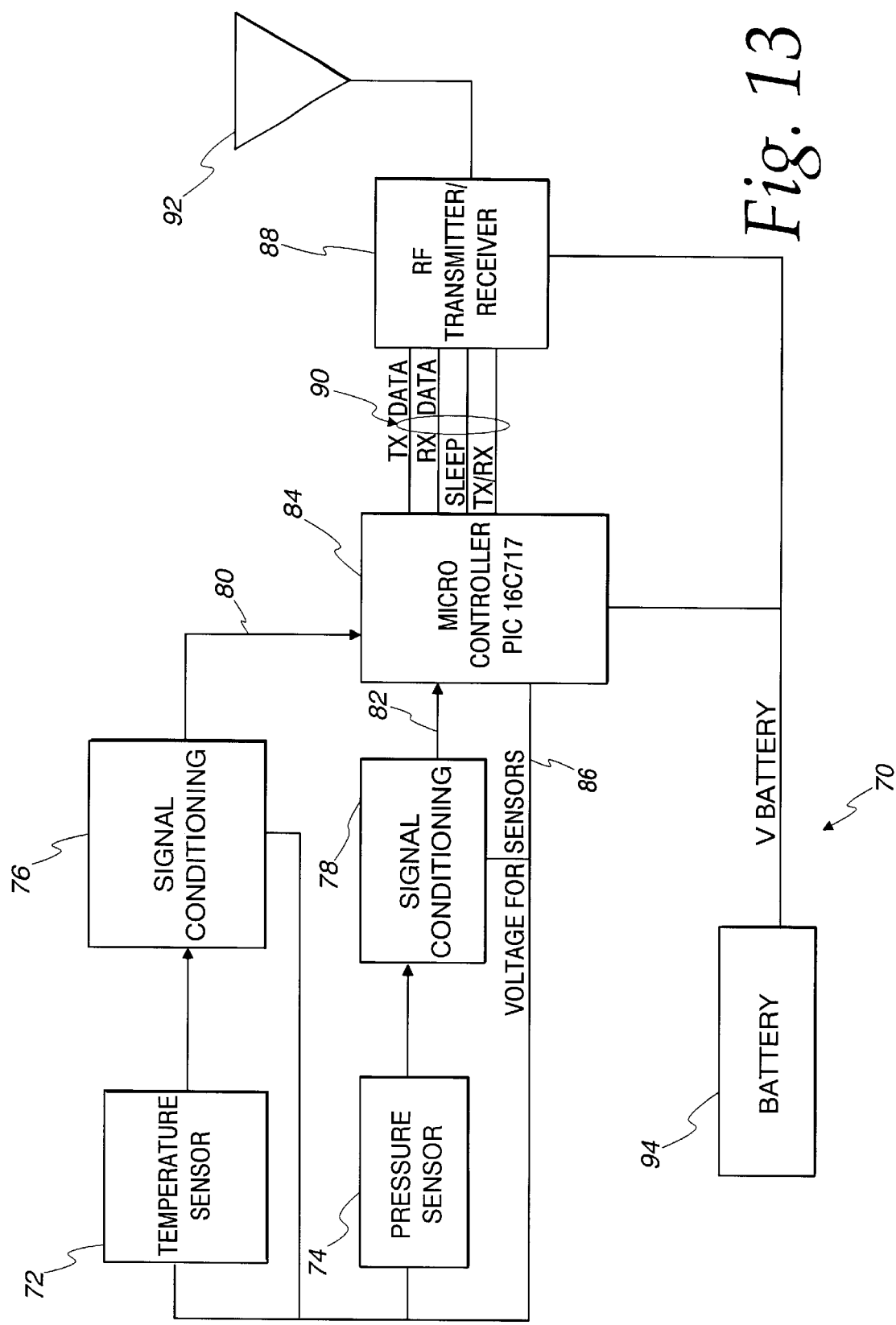
FIG. 13 is a more detailed block diagram of a functional tire tag in accordance with the present invention.

Tire tag 70, shown in FIG. 13, includes temperature sensor 72 and pressure sensor 74. It could, of course, include other sensors for determining other tire parameters such as number of tire rotations. A purpose of temperature sensor 72 is to enable the data from pressure sensor 74 to be corrected to sea level pressure at 20° C. (71.0° F.). Temperature sensor 72 may be of the type manufactured by National Semiconductor, Model No. LM60CIM. The pressure sensor 74 is also used to sense dramatic changes in pressure as well as sense pressure for long term tracking and recording purposes. One satisfactory pressure sensor is that provided by Sensym PIN SCC 100AHO-GF. In addition to the temperature sensor 72 and pressure sensor 74, tire tag 70 also includes a temperature signal conditioner 76 that receives analog signals from temperature sensor 72 and a pressure signal conditioner 78 that receives analog signals from pressure sensor 74. Signal conditioners 76 and 78 respectively convert the analog temperature and pressure signals to amplified signals 80 and 82, both of which are supplied to and stored in microcontroller 84. Microcontroller 84 also supplies voltage 86 to the sensors 72 and 74.

Microcontroller 84 communicates with RF transmitter 88 through signal lines 90. RF transmitter 88 is in communication with tire patch antenna 92 (which corresponds with tire patch antenna 20 of FIG. 1A). Tire tag 70 is supplied by a power source 94 such as, but not limited to, batteries, including lithium batteries but other acceptable versions can be used. One presently acceptable battery is a Lithium 1.2 Amp Hour (AH) battery.

Tire tag 70 has several modes of operation, the typical being the periodic deep sleep mode. In this mode, the tag spends most of the idle time in a low-power condition. The tag awakens briefly at programmed intervals (lucid sleep mode) to take a pressure and temperature sample. During this partially awake period, the tag also looks for a forward transmit signal from a reader such as RT unit 30 of FIG. 1A (hereafter also called a reader or interrogator). If tag 70 detects an RT signal, it will awaken to a new level (search mode) and will determine whether or not to respond. When tag 70 determines it is to respond, it completely awakens (interrogation mode) and transmits an appropriate reply in a controlled time slot on a controlled assigned frequency. The timing of such forward and return link transactions between tire tag 70 and external data system 26 (of FIG. 1A) is described in greater detail hereafter.

Reader 30 (FIG. 1A) is a transceiver that, in one mode of operation, initiates RF communication with the tire tags 70 (or any other of the tags disclosed herein such as 14, 14A, and 14B). One form of reader is a gate reader which is at a fixed location. The gate reader will communicate with the tire tags and gather the tire pressure, temperature, status, vehicle ID, tire ID, and capture the history by downloading the information. This history information is sent to a tire database by LAN line, RF link, or any other appropriate connection such as through a satellite. Other forms of reader 30 include portable or hand-held readers. These readers communicate with the tire tags and gather temperature, pressure, ID information, and history and are also able to download the data into the tire remote database.

The hand-held readers may be used at locations that do not have fuel islands/docks and may be used to communicate with tire tags at various locations and times such as on the ready line, at the tire shop, during non-vehicle use periods, during yard checks, at dump sites, or during fueling done by the fuel truck. Thus, the hand-held readers 30 provide an "on-site read" and consist of reading the most recently stored tag sensor data representing parameters such as tire temperature, pressure, and tire ID as well as download of tire history data. Further, readers 30 can be on-board readers, i.e., readers attached to the vehicle. They also are able to retrieve the tire pressure, temperature, status, vehicle ID, and tire ID from the tag and transfer that data to the host computer.

Surveillance readers may be strategically stationed on specific roads at points past which the vehicles must pass. These readers, again, will read the tire identification, pressure, and temperature or alarm transmissions from the tags of the vehicles traveling by them (history data will not be collected from the tag at this point) and this information may be communicated by satellite, RF, or LAN line link back to the host computer. It may also be communicated to a vehicle monitoring system. In the case of surveillance readers, the tag may simply be generating data bursts on an autonomous basis, rather than in response to an interrogator forward link signal.

If the tag is so programmed, the on-board readers also may sense any alert transmitted from a tag and the alert will be periodically signaled by a tag when a tire exceeds programmable temperature or pressure set points. The on-board reader also will specify the position of the problem tire. The on-board reader may also transmit at regular frequent intervals to the host computer via its own RF link, satellite, or other direct-communication link. The tire tag is programmed with the extreme limits of temperature and pressure that are unacceptable for continuing operation. The on-board reader may acknowledge the alert and the tire tag may be programmed to cease transmitting the alert. Alternatively, the alarm mode may be programmed to stop, after transmitting for a predetermined number of cycles, in order to conserve the battery. In this event, when tag data is later downloaded, out-of-range conditions will be noted and an alarm condition will be recognized by the reader. The alarm may take one of various modes, e.g. just an alert or the out-of-range condition (temperature or pressure) or the actual values. An on-board reader may simply need to see an "alarm" and the time, while the ETMS may need the extended temperature and pressure data for time management purposes. The surveillance readers will also pick up tags with pressure/temperature alerts and relay that information to the host computer.

All tire tags and/or readers may be programmed to include the following features:

Read the tire psi—the internal air pressure in the tire/wheel cavity. Readers have the capability to read tire pressure and calculate the equivalent cold pressure (20° C./71° F.).

Read the tag temperature—the temperature of the tag may not be due to only air temperature because of factors such as the mounting location.

Report a unique tag identification number—which will be installed by the tag manufacturer.

Tire identification number—specifically identifies that particular tire and will be programmed in the tag by the tag installer. Once set, however, the tire ID can be changed.

Tire history memory—the tag provides a history memory that records temperature and pressure (hot) with sufficient information for the system to generate a time stamp. It may be downloaded into the user's software. This memory may have the preferred following record storage options: once-a-day for 30 days (30 records) or every 5 minutes for 48 hours (576 records) as well as an in between number of record storage options (user selectable).

Write-in capability—the tag allows users to write wheel position, vehicle number, desired air pressure, and other user defined data in the tag memory and thus may be password protected.

Automatic data collection—the tag is able to self-awaken at preset intervals, take readings, commit to memory storage and go to sleep without external activation. The user can select the wake-up interval but the tag is programmed from the factory with a default interval (5 minutes).

Autonomous transmit—the tag may be programmed to self-awaken at preset intervals, take readings, transmit the tire condition data, and go to sleep without external activation. The user can select the wake-up interval but the tag is programmed from the factory with a default interval (5 minutes). There is the capability to enable and disable the default. The transmission interval may be programmed for a different number of cycles than the wake-up intervals. The transmission will thus always be the last read/stored pressure and temperature.

Alert transmit—the tag may be programmed to self-awaken at preset intervals, examine the most recently stored sensor data, determine if an alert state exists (sensor data values exceed stored temperature and/or pressure limits), transmit an alert (if enabled and required), and go to sleep without external activation. The user can select the wake-up interval but the tag is programmed from the factory with a default interval (5 minutes). There will be provided the ability to enable and disable this default feature. If the tire pressure falls below the operational range, the tag will cease transmitting the alert after some period, such as 12 hours, if not acknowledged. The tag still operates even though the alert is timed out. The feature enables the reader to terminate the alert. Return to a non-alert state rearms the alert feature if enabled.

Security—there are two levels of password protection. The first is the manufacturer and the second is that of the fleet operator (all programmable data).

History download—the tag has a function to transfer only history data (e.g., temperature and pressure) that has not been previously sent to a reader. Additionally, there is the capability to transmit a portion (including all) of the current history data. If the new history data exceeds the storage limit, the oldest stored data is overwritten.

Kill tag—the kill tag command erases all data on the tag (including the unique tag ID) and returns it to the initial condition when the tag was first manufactured, prior to any data being written to the tag. The tag at that point will not longer respond to any external commands. This feature is controlled by the fleet level password. The battery is consumed as a part of this function. The function is intended to be used when the tire is scrapped.

Erase user data—this function erases all user level data (i.e., fleet name, set points, wheel position, and so forth) and returns the tag to the manufacturing level defaults. This is intended to be used when the tire changes owner.

Radio frequency—the system preferably will operate in the unlicensed 902–928 MHz ISM band.

Communications—the tag is able to operate with a fixed gate reader, a hand-held reader, a surveillance reader, and an on-board vehicle reader.

Data display—tag data is displayed in standard units of measurement (psi) for pressure and degrees C and/or degrees F for temperature).

Power—the tag is powered by a battery or other power source as part of the tag construction. This power source is not replaceable (a maintenance item).

Tag life—given current battery capabilities, total tag life is for at least a maximum of 5 years of tag operation or 45,000 tag reads, either successful on-site tire condition and history or at least 1-per-hour every hour for 5 years, whichever occurs first. Tags used with on-board or surveillance readers have a projected life of at least 5 years or 525 reads in the autonomous or alert tire condition transmission (read every 5 minutes for 5 years), whichever occurs first. Thus, the minimum tag sampling rate for alert is once every 5 minutes and the alert transmit rate is every 30 seconds. The tag provides a read/transmit counter.

Turn-OFF function—the tag is able to recognize when tire pressure falls below 40 psi or other selected pressures and ceases reporting and storing this information. This prevents it from operating when the tire is unmounted or while the tag is on the shelf before it is installed in the tire. However, it is able to monitor pressure so that it can turn itself ON to function completely when the tire pressure rises above 40 psi or another selected pressure.

Reader range—for a fixed gate reader, while the vehicle is moving up to 20 kilometers per hour, the read range is up to and including at least 10 meters from the tag at any wheel position on the same side of the vehicle as the antenna. For a hand-held reader, with a stationary target, the read range is up to at least and including 5 meters from the tag at any wheel position at the same side of the vehicle as the reader. For an on-board reader, the reader must be able to receive from all tires mounted on the vehicle with the vehicle moving up to at least 90 kilometers per hour. With a surveillance reader, and the vehicle moving up to 73 kilometers per hour, all tires up to and including at least 50 meters from the antenna can be monitored.

Definitions

On demand (or on-site)—round-trip communication where the reader initiates communications, and the tag responds with the most recently stored tag sensor data representing temperature, pressure, tire ID, and/or other tire parameter information.

Alert—one-way communication wherein the tag transmits either the most recently stored tag sensor data representing temperature, pressure, and ID to any reader listening when these temperature and pressure values exceed preprogrammed set points, or may transmit some other alarm type signal.

Autonomous communication—this is one-way communication wherein the tag transmits the most recently stored tag sensor data representing temperature, pressure, and ID at regular time intervals to anyone listening.

History download—round-trip communication wherein the reader initiates communication and the tag responds with unread history of temperature and pressure, and other stored data.

Except for the surveillance reader, each of the readers will periodically transmit an RF message to the tire tags. This reader/transmit portion of the system protocol is defined as a forward link. Forward link commands are either searching for or directly communicating with tags. A tag transmitting a response back to the reader is defined as a return link. Both forward and return link timing and other characteristics are described hereinafter.

Turning to acquisition of tire data, in the interrogation mode, a reader 30 (FIG. 1A) can acquire sensor and other data from the tire tag 70 only when the tire tag is being specifically addressed. Initially the three modes to which the tire tag can be addressed are named. First, a long ID; second, a short ID; and third, an assumed presence ID. Additional details are presented hereafter.

If the tire temperature and pressure are desired, the reader 30 requests data from specific memory locations of the tire tag 70 (in FIG. 13). In those memory locations are stored the temperature and sensor information to be transmitted during the return link. The reader 30 can also request calibration coefficients for the sensors to be transmitted. Other information stored in tag memories can include tire type, tire position on the vehicle, and vehicle and/or tire ID which may also be requested. Once the requested information has been retrieved, reader 30 instructs tag 70 to go into a sleep mode for a programmable period of time. This completes the reader/tag session and a new one can begin.

Tire tag 70 must be cost effective, use low power, and also comply with FCC Part 15. Therefore, the maximum allowable power (in free space) without spectrum spreading is −1 dBM. The return link (i.e., tag to reader) has the capability of transmitting on any one of several available radio frequency channels. This provides tag 70 with means of avoiding signals from interfering devices. The reader monitors and commands the channel on which tag 14 is to transmit. For autonomous transmission, the tag has the option of transmitting over the return link on any one of the available channels as will be explained in more detail hereafter.

While the reader unit is channel monitoring, the reader software periodically searches the possible tag transmit channels available and determines which channel has the lowest signal strength. The reader 30 generates a received signal strength (RS S) indicator signal that is sampled by an A/D converter in the microcontroller 82. After determining the channel with the lowest RSS, the reader sends two bits in the forward command link that correspond to that channel and instructs the tire tag on which channel it is to transmit.

The duration of interfering signals can be expected to be on the order of several seconds. Therefore, the reader 30 checks for clear channels every several seconds. The reader 30 tunes to receive the channel to be checked and transmits a null command. The null command is used to prevent any tag from responding while the reader 30 monitors the RSS level. This becomes the channel to which the tags will be commanded to respond until another channel has been determined to have the lowest RSS.

In the forward link, the modulation design uses amplitude shift keying (ASK). There are 50 channels scattered between the 902–928 MHz frequencies. The maximum allowable power that is radiated from the antenna is +36 dBM and its data rate is 15 K-bits-per-second (Kbps).

The return link, which again has up to four channels of possible communication, implements a frequency shift key (FSK) design. These channels are somewhat evenly spaced between 902–928 MHz.

It is to be noted that the +36 dBM of allowed radiated power is in free space measured at the tire wall. In the present embodiment, data transmission through the tire wall, the output would be −15 dBM from this maximum +36 dBM. In addition to attenuation resulting from transmission through the tire wall, additional attenuation may occur in view of interference from other tires and parts of the vehicle.

Also, the system will be transmitting far less data/instructions to the tag than vice versa. The data rate of the forward link is 15 Kbps and the data rate of the return link is 60 Kbps. The reason for this asymmetric data design is that the complexity of the system is located on the reader rather than at the tag 70. This allows much less complex circuitry and less power requirements for the tag to read slow information at 15 Kbps. Usually, the reader 30 has sufficient sophistication to read the 60 Kbps data being returned by the tag. Additionally, since the tire tag 70 delivers data at a faster rate, it will be ON for a shorter of time. This is an important concept since the battery life of the tire tag is an issue to the overall usefulness of the system.

When no tags are within range of the reader, there will obviously be no response from the reader interrogation. When a tag does come into view, however, one means of detecting and identifying it is achieved by using a unique successive approximation routine (SAR) algorithm to read each tag's serial number. Another means is by functional ID (FID).

Thus, there are two ways to identify a tag, either by its factory encoded long serial number, or by functionality. The SAR process is used to identify a tag by the long serial number. The functional ID is a short code that identifies the tire location on the vehicle. The long serial number format may take longer to acquire but is more versatile than the functional identification means. Using a 24-bit long serial number, millions of unique tags can be identified.

Figure 14:
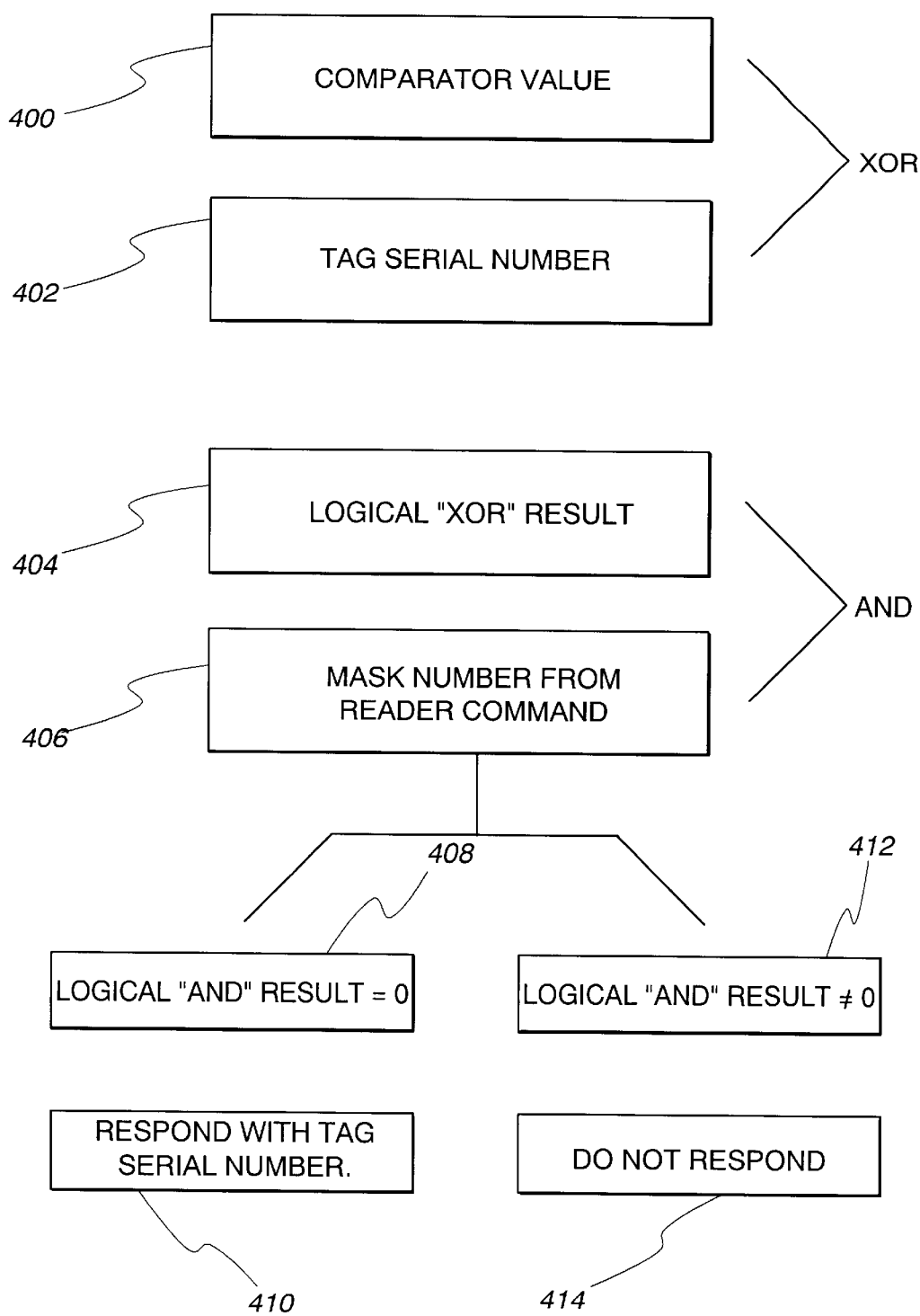
FIG. 14 illustrates a generalized successive approximation routine (SAR) command process flow diagram for identifying a particular tire tag transmission.
Figure 15:
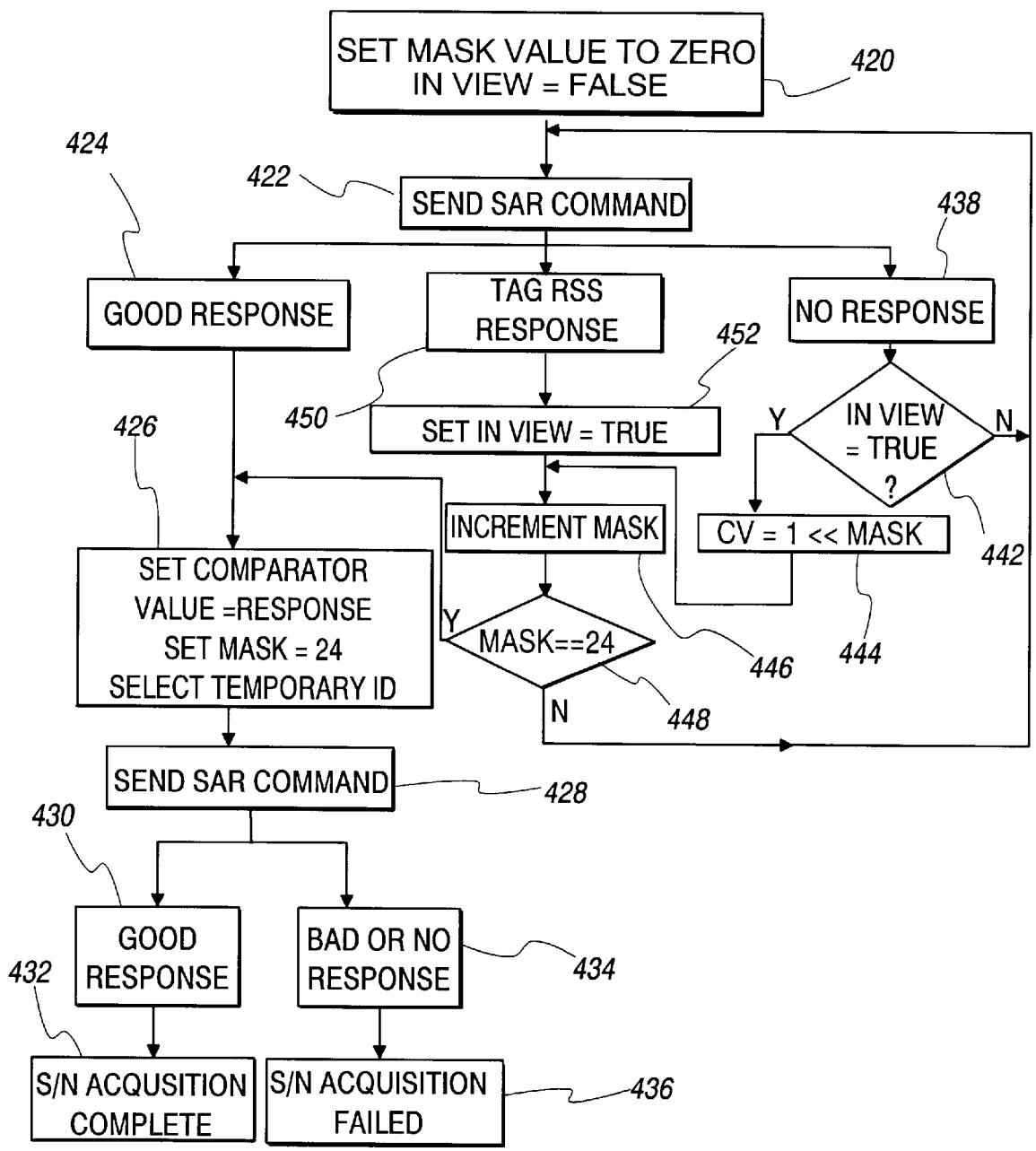
FIG. 15 is a flow chart depicting a reader/transceiver SAR acquisition flow diagram.

The reader units 30 run the unique successive approximation routine (SAR), such as illustrated in the flow charts shown in FIGS. 14 and 15, looking for tags from the tire and tag moving into view of the beamwidth of the RT antenna 28. This shortens the time for tag identification and speeds up the communication window enabling faster tag drive-by of readings and/or conserving energy.

Identification by functional ID should be used in instances where fast acquisition is required and there is no need for information beyond standard tire location and simple tire parameter readings such as pressure and temperature.

Each tag is identified by a 3-byte (24 bit) factory constant that allows over 16 million unique serial numbers. These numbers are read using a command and response algorithm that interrogates each bit of all viewable tags in a manner that allows the reader to zero in on a unique tag serial number within 24 command cycles. This is known as the successive approximation routine (SAR) mentioned earlier. The technique can be used to read an unknown number (amongst many) by comparing it to a known number and increasing the resolution until a unique number is found. In this context, the known number is created from a 3-byte integer referred to as a comparator value and the resolution is generated from a 5-bit mask value.

The general functional diagram is illustrated in FIG. 14. The reader comparator value and the tag serial number are XOR(d) together and the logical XOR result is AND'd with a mask number derived from the reader command. If the logical AND result is zero, the tag responds with its serial number. If the logical AND result is not equal to zero, there is no response.

FIG. 15 is a more detailed flow diagram of the SAR acquisition process. Initially, all of the mask bits are set to a logic zero. The SAR command is then sent. If a GOOD RESPONSE is received, the comparator value can immediately be set to equal the response data and the full mask value. The serial number is successfully acquired if another response is received from sending another SAR command. If there is no response or a bad response, of course, the serial number acquisition fails.

In another situation, as shown in FIG. 15, there may be NO RESPONSE at all. This may be because in fact there is no tag in view of the reader in which case the reader again sends another SAR command. If, however, there is a tag in view, it may be that no response is received because there are no serial numbers that meet the mask/comparator value test. In this case, the comparator value can then be modified at the current mask value. When the command is attempted again without changing the mask value, at least one tag will respond. The process can then jump directly to the acquisition verification where the comparator value is set to equal the response and the full mask value.

Under other conditions, if a TAG RESPONDS, the mask is incremented by one and the process is repeated until the mask register is full or has 24 bits and, then, the system jumps directly to the acquisition verification as explained previously.

Communication occurs in forward link packets from the reader 30 (in FIG. 1A) to the tag 70 (in FIG. 13—tag 14 in FIG. 1A) and return link packets from the tag 70 to the reader 30. The readers 30 have a received signal strength (RSS) indicator which tells them that a tag 70 is attempting to respond. The reader investigates the signal strength on its incoming lines and will use it as an indication that a tag is attempting to signal the reader. Particularly, the reader 30, in a forward link packet, has instructed the tag to respond on a particular channel and the reader is then monitoring that channel. The received information is then communicated to the reader processor unit 32 or RP unit 32A (such as shown in FIG. 12).

Referring again to FIG. 12, the RP 32A gathers information received from the readers 30A and 30B and runs a scheduler 33 for issuing commands to the RTs 30A and 30B. The scheduler 33 creates a schedule of actions that are to be transmitted by one of the RTs. For example, instructions to assign a temporary ID number to the tire tag 70 once communication has been verified with a particular tire tag 70. Such decisions are made in the RP 32A. This data is transmitted over a communication link such as, but not limited to, a wireless modem 42 which, in one embodiment, is a 2.45 GHz spread-spectrum system to a complement modem 46 associated with a field support computer (FSC) 48. A temporary ID is assigned to a tag so that the tag can discriminate reader commands transmitted among groups of selected tags. Once the temporary ID has been assigned, the tag will respond only to commands that specifically identify it as a unique tag within a group of tags. Once a tag has been assigned a temporary ID, it will not respond to an SAR command with less than a full mask field. The tag will remain in this acquired state for a predetermined period of time.

At the field support computer 48 there is a keyboard and display which provides a visual indication to a user that tires have been detected and information communicated to the system. The information included could include the pressure of the tires, the temperature readings, calibration coefficients, pressure and temperature history, tag identification, and tire location among other possible forms of data. This data can then be logged and archived into field support computer 48. Periodically, a new file can be created.

Once a tag has been sorted, identified, and given a temporary ID, an inquiry is then made to the tag to forward the contents of selected memory locations. These memory locations hold the latest pressure sample, and the latest temperature sample and other data, and may include calibration software for solving the equation y=mx+b, where m=gain and b=offset value. Thus, calibration data can be quickly computed. This information is received by RT 30 and transferred to the RP 32A and supplied to the field support computer 48.

Once the RT 30 has successfully obtained the tag information discussed above, it issues a signal placing the tag into a sleep state. In one embodiment, the sleep state is designed to last for 30 seconds. The reason for this embodiment is to enable the tire to be out of view of the reader when its tag reawakens, thus avoiding an erroneous double read of the tire. It is to be appreciated, however, in various environments, a longer or shorter sleep state may be desirable. Once the initial tire tag 70 is placed into a sleep state, the system will then be used to read the next tire tag which may be a tire on the same vehicle.

When the tire tag 70 is reawakened, it will begin looking for any forward link packet. In the preferred embodiment, it activates itself and looks for the forward link packet for a programmable period of time such as approximately 10 milliseconds where it is looking for a preamble-type signal. If this preamble-type signal is not received, the tag enters a semi-sleep mode for 200 milliseconds, then reawakens for 10 milliseconds looking again for the preamble. The sequence may be programmed to be repeated in a continuous-type pattern. The preamble is a specific data format located at the front of the forward link packet. The wake-up period and the time the tag is to go to sleep, the intervals, the time it looks for the preamble packet, are all programmable by the user.

Figure 21:
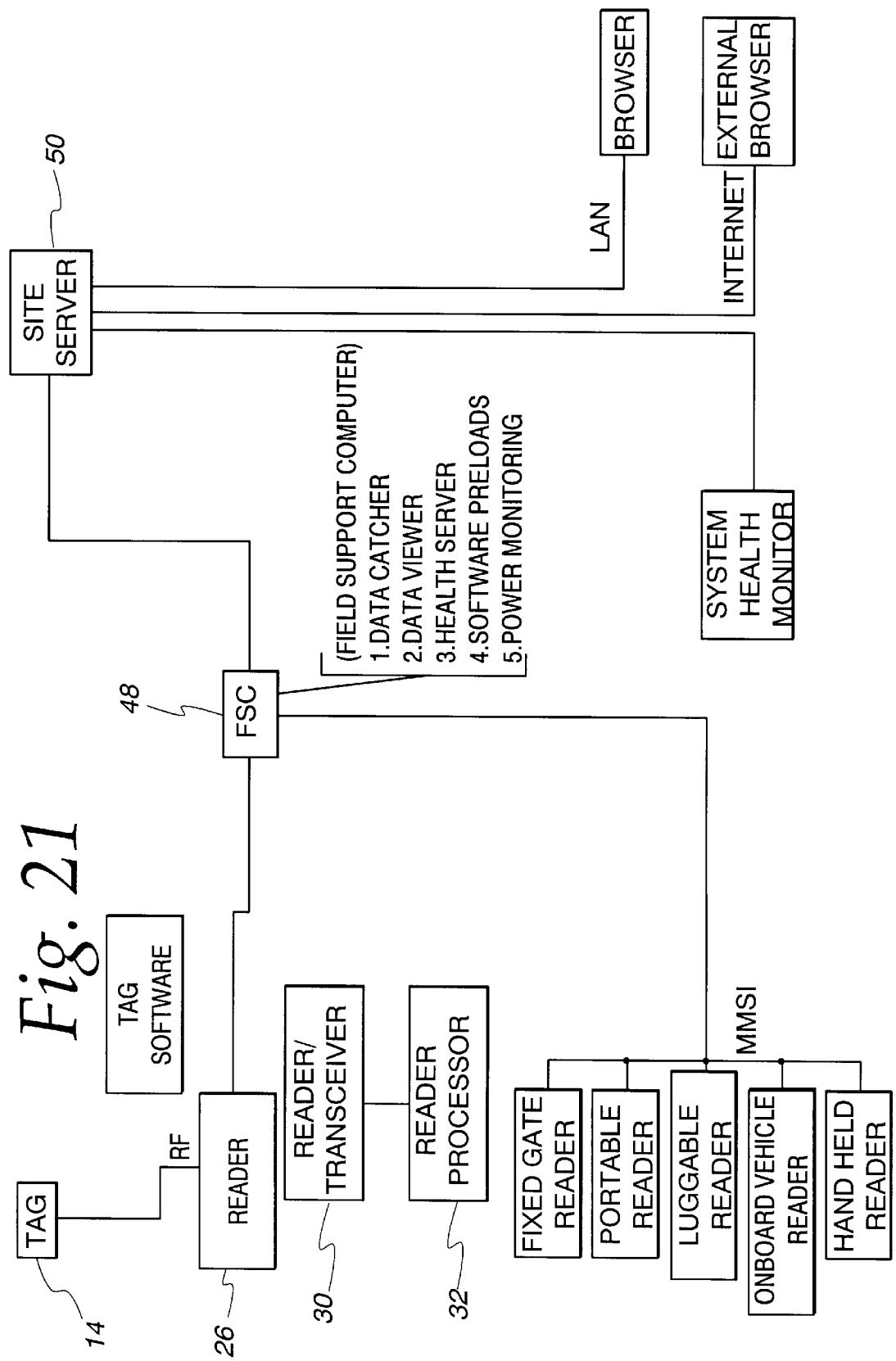
FIG. 21 is another general block diagram overview of the novel ETMS showing possible permutations and component combinations thereof.

It is also noted that although in FIG. 12 the field support computer 48 is located in communication with the reader processor via modems, the components may be in a single unit or alternatively separated by a large distance. The arrangement is driven by the implementation in which these units will be used rather than by any requirements of the system. Various options can be provided, as indicated by FIG. 21, which is another overview of various components useable with the ETMS system.

Figure 16:
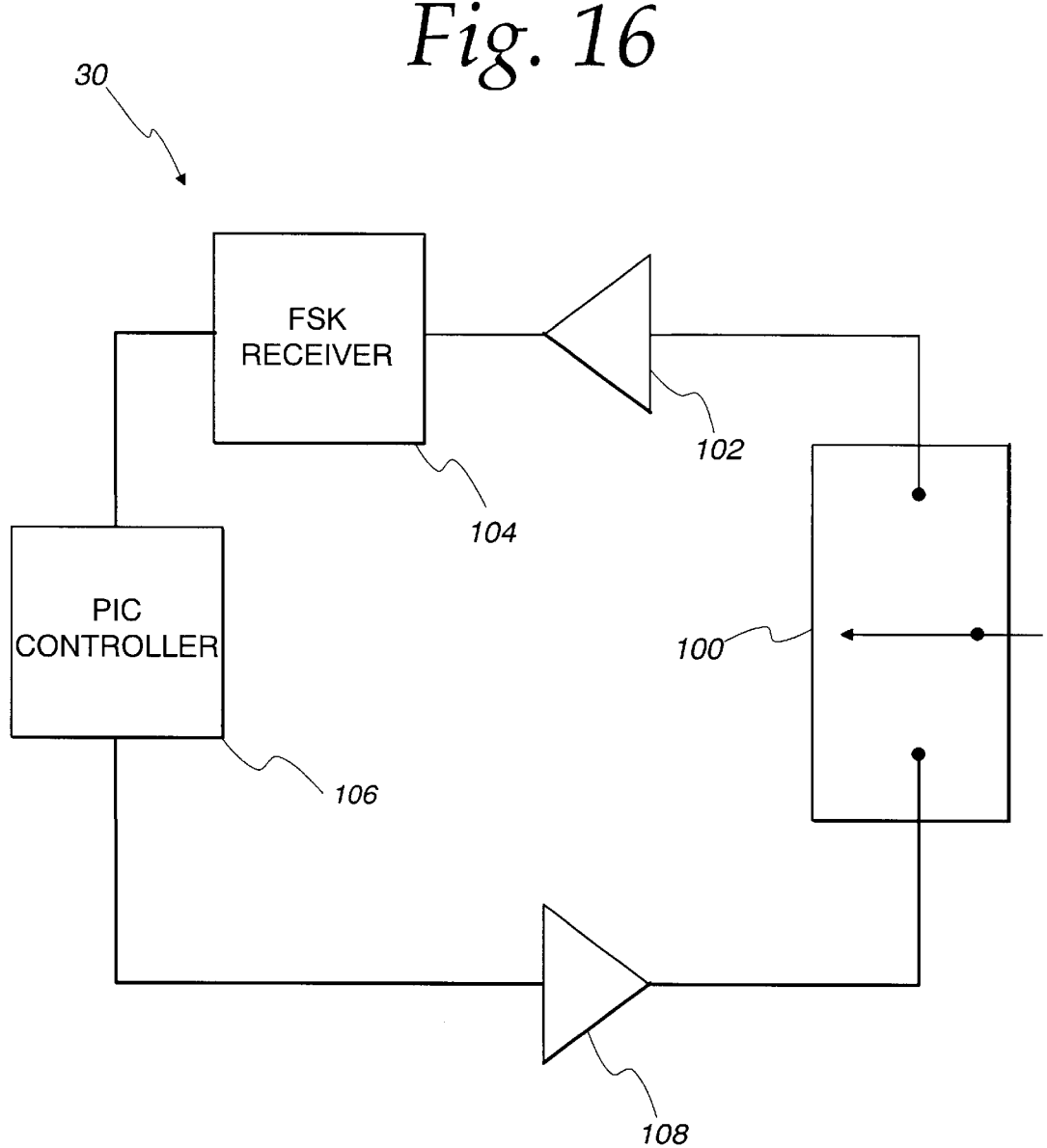
FIG. 16 is a general block diagram of a reader/transceiver (RT) unit.

Turning to FIG. 16, there is shown in basic detail the components of RT 30. A transmit/receive (TR) switch 100 is provided. This design is used since the protocol is half duplexed, either operating for transmitting or receiving data. This embodiment is not a multiplex system and therefore the RT antenna is used in both the transmitting and receiving operations. It is to be appreciated that the RT 30 includes additional components such as filters and the like; however, for convenience, these circuits, well known in the art, are not shown. In the receiving path, a low-noise amplifier 102 is on the front end of an FSK receiver 104. This data is to be transmitted to a controller 106. The data received by controller 106 is investigated to determine if a valid packet is received. When a packet is to be transmitted, the data is supplied through a high-power amplifier 108 through the other side of the TR switch 100 and to the antenna for transmission to tag 70.

While 50 channels were selected in part due to the FCC rule as it being a minimum for the Part 15 FCC Rules, it is apparent that more than 50 channels could also be used in a spread-spectrum system. Similarly, 4 channels for sending data from the tag may also be varied to a different number.

For situations including multi-tire vehicles such as large truck environments, synchronization of operation is anticipated. Particularly, in using two RT readers (FIG. 12), a first reader may, for example, be designated for one side of the vehicle and the second reader may be designated for the other side of the vehicle. Signals from the RT on the one side instructs the tire tag receiving its message to use only specific channels, for example only, 1 and 3, whereas the RT on the other side instructs any tire tag receiving its signals to transmit only on channels 2 and 4, for example only. This scheme is implemented to reduce the chance of misreads on tires or dual reads on the same tires. In situations were two RTs read the same tag, either or both the RP or the FSK receiver are configured to recognize the duplicate data and eliminate one set of unnecessary data.

In other situations, it is possible that two tags awaken at the same time and are within the beam of an RT antenna. Interference may exist since both tags may be responding to the same message on the same channel. To filter out an undesirable tag message, the SAR algorithms are used, as explained earlier, and, as an option, error correction bits and parity bits. Interleaving of the words to ensure that only one of the tags communicates with the reader at a given time also may be used. The process for the SAR has been described previously.

Figure 17:
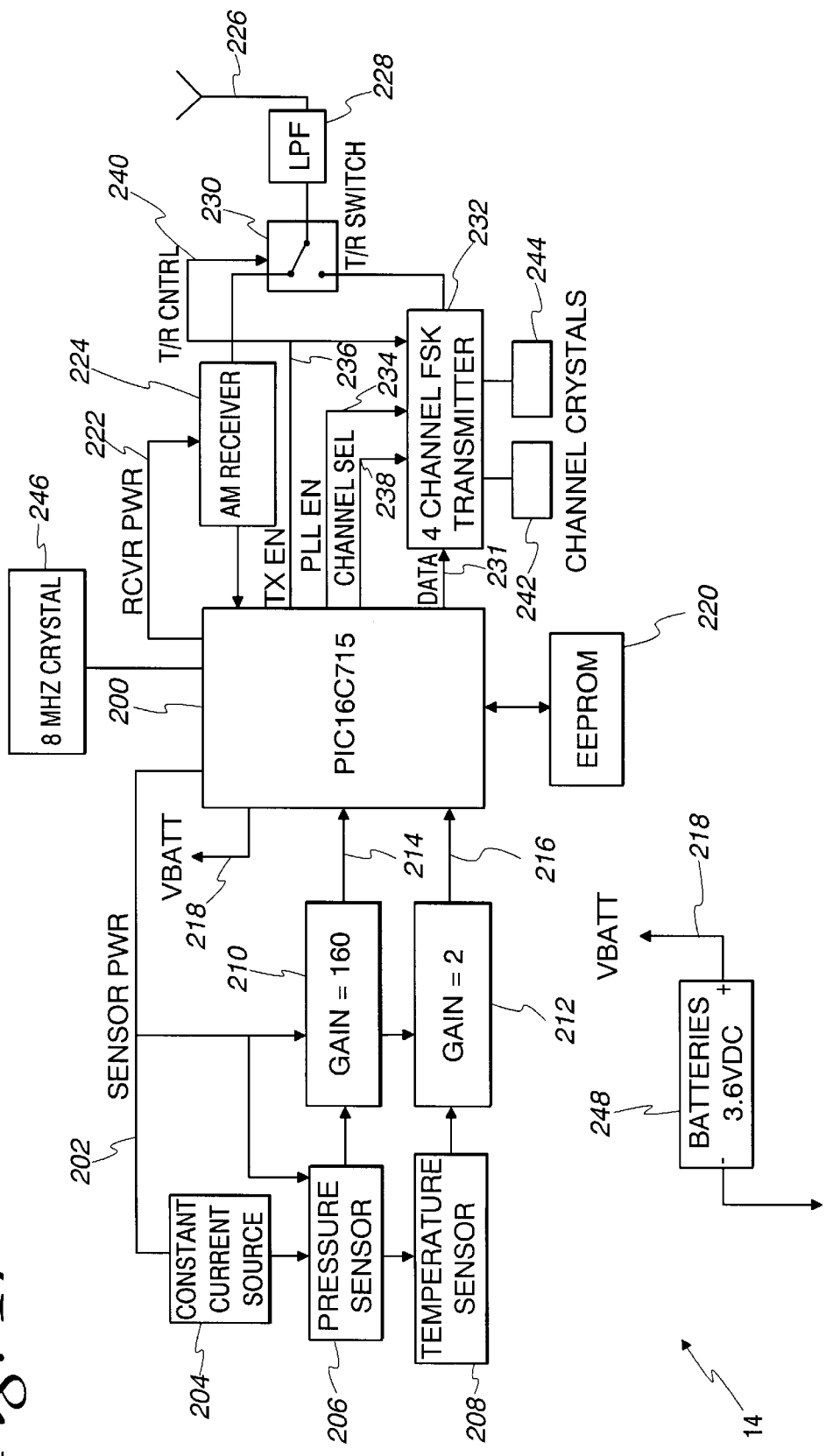
FIG. 17 illustrates a more detailed block diagram of a tire tag according to the present invention.

FIG. 17 is a more detailed block diagram of the tire tag illustrated in FIG. 13. A PIC 16715 controller 200 receives and transmits various signals for operation of the tire tag 70. The controller 200 may be one manufactured by Microchip, Inc., Model PIC16C715, and has internal RAM, internal ROM, internal A/D converters, and other standard structures. It is to be appreciated that this is one of many microcontrollers which might be used in the present system. The tire tag 70 shown in FIG. 17 has two unique functions that are separate and independent from each other. First, the microcontroller 200 controls the measuring of tire parameters such as by pressure sensor 206 and temperature sensor 208. The microcontroller 200 is programmed to awaken at predetermined intervals and cause the sensors to measure the parameters and those parameters are then stored in the RAM of the microcontroller 200. This happens on a cyclic, periodic basis independent of any other operation of the tire tag 70 shown in FIG. 17. The other operation, which occurs independently of the parameter measuring portion, checks for signals from a reader/transceiver and returns signals to it. When the reader/transceiver requires a transmission of a tire parameter that is stored, the microcontroller 200 simply goes to its RAM and sends the latest data that is stored therein to the reader. Again, the parameter measuring function is entirely separate from the signal receiving and transmission function of the tire tag. This is a unique function that provides advantages over the prior art. First, the microcontroller 200 does not have to power the sensor in response to an interrogation command. This allows the system to operate faster than the prior art systems. Second, the microcontroller 200 has to deal with only one function, independent of the other, at any given time. They either measure the parameter and/or receive and transmit data independently of the operation of the other. The measurement function is not performing in response to any external interrogation command. Thus, the two functions are entirely independent of each other.

Therefore, when microcontroller 200 performs its measuring function, it awakens from its deep-sleep state to a lucid sleep mode and issues a signal on sensor power line 202 to activate constant current source 204 which, in turn, activates pressure sensor 206 and temperature sensor 208. Also turned ON via sensor power line 202 is signal-conditioning circuit 210 and signal-conditioning circuit 212. A short time delay is provided so that the just turned-ON components 204–212 ignore transients and assume a normal steady state operation. Thereafter tag 70 performs an A/D conversion of signals on input lines 214 and 216 to the microcontroller. Signal line 214 carries signal-conditioned pressure sensor data that will be stored in the microcontroller 200. Similarly, signal line 216 carries signal-conditioned temperature sensor data that is also stored in the RAM of microcontroller 200. Once this data has been received, microcontroller 200 places itself into the deep sleep state, thus turning OFF power to sensor power line 202 and thereby placing elements 204–212 in a non-active mode. The performance of its first function is completed. Power is supplied to the microcontroller 200 through an input from battery 218.

A serial EEPROM 220 is used for its data logging function to log min/max values, consecutive samples, and the like. The storage can occur using variable time bases and is non-volatile. Since it is non-volatile, it does not need a battery system to maintain its information.

When microcontroller 200 performs its second function, it exits the lucid sleep mode and enters the search mode where it functions to determine whether it is within the range of a RT. As an initial step, receiver power is supplied to the ASK receiver 224 on line 222. In one embodiment, the receiver circuit is constructed as a diode detector with gain-enhancement transistors, and a comparator circuit is provided in order to transmit digital data to microcontroller 200. The data received and provided to controller 200 is initially received by dipole tag antenna 226. The signals are supplied through low-pass filter 228 and TR switch 230 which is set in a receiving mode during this time period. It is to be noted that the obtaining and storing of pressure and temperature sensor information is a separate function (as stated earlier) that is not tied to the exiting of the deep sleep mode and lucid sleep mode and searching for the forward link data from a RT. The controller is looking for a specific packet data from the RT which will cause a tire tag 14 to supply the desired sensor information. In the search mode, if it appears that a valid packet is being received, the tag fully awakens from the search mode and transitions to the interrogation mode.

When microcontroller 200 receives acceptable data from ASK receiver 224, the controller moves to a response condition. As a first step, the controller acts to turn ON the four channel FSK transmitter 232 by activating phase lock loop enable line 234 and the transmit enable line 236, which enables the high-powered amplifier stage of transmitter 232. The phase lock loop enable is activated first as it requires a longer sampling period. Once transmitter 232 is activated, the data being requested by the RT, which may include the previously stored values regarding the pressure sensor data and temperature sensor data, is provided to the transmitter 232 on line 231. In order to transmit the data, the TR switch 230 is provided with a signal to move from a receive state to a transmit state. The data then passes through the low-pass filter 228 and is transmitted via antenna 226. Thus, the second independent function is performed.

The transmitter 232 is presently designed to transmit on four distinct channels. Two-channel select line 238 is provided to transmitter 232 in order to allow selection of a particular one of the four channels available via transmitter 232. It is noted that only one of the four transmission lines are normally used during any individual transmission of data.

Thus, in performing the second function operation, microcontroller 200 transitions from the lucid sleep mode to the search mode and investigates whether an interrogation signal has been issued by any one of an RT-type reader. When an interrogation signal is received, stored data will be supplied to the interrogating device when all proper transmission safeguards and protocols have been properly sequenced. If once it exits the lucid sleep mode to the search mode and it does not receive any interrogation signal, it will again enter the deep sleep mode for a predetermined time period. This functioning of sleeping, awaking, searching, and either transmitting of data or again entering a sleep mode is a continuous ongoing function of tag 14.

More particularly, if the tag is in the lucid sleep mode, it maintains itself in that mode for approximately 200 ms, as an example only. It then further awakens to the search mode and looks for a reader/transceiver (RT) signal for a time period such as 10 ms (i.e., it looks for the preamble of the forward link signal). If such a signal is not found, it simply goes back to the deep sleep mode for a period of time such as 200 ms, reawakens and attempts to receive any such signal. Once it awakens and receives the RT forward link signal, it fully awakens to the interrogation mode and acts to respond to the signal and transmit stored data regarding the temperature and tire pressure to the RT. It is to be noted that these time parameters are adjustable. The time of acquisition of pressure and temperature sensor data is also programmable. Therefore, between the periods of time looking for acquisition of data, the measuring and storing of tire parameter data such as temperature and pressure occurs at predetermined times such as, for example only, every 30 seconds. Therefore, there may be many occurrences of the tag attempting to communicate with the RT between measurement and storage of parameter data. It is noted in FIG. 17 that the transmit/receive control signal on line 240 is controlled by the transmit enable signal on line 236.

Crystals 242 and 244 in FIG. 17 control the frequency of the channels of transmitter 232. The combination of channel crystals 242 and 244 along with the phase lock loop provides four channel possibilities.

The channel that is to be used for transmission by the tag 14 may be determined in a number of ways. One manner would be to have the RT send a "NULL" command and the strength of each individual channel response signal would then be determined. Thereafter the RT would instruct the tag to send its response back to the lowest-powered channel. The lowest-powered channel is selected because it indicates that it is an open channel not having interference from other transmissions.

A crystal 246, such as a 4 MHz or 8 MHZ crystal, is used for the timing of microcontroller 200. Power supply to tag 70 is supplied via batteries such as 3.6-volt DC battery 248. One suitable battery is a 1.2 AH Lithium battery.

The tag and reader must perform its receive/transmit function according to a strictly controlled command/response protocol. The basic tool for communicating between a reader and a tag consists of reading and/or writing to and from the tag memory. A predefined data structure dictates strategic locations within the tag memory for access to specific information such as temperature, pressure, calibration coefficients, and a byte code language space that defines functional operation of the tag.

Figure 18:
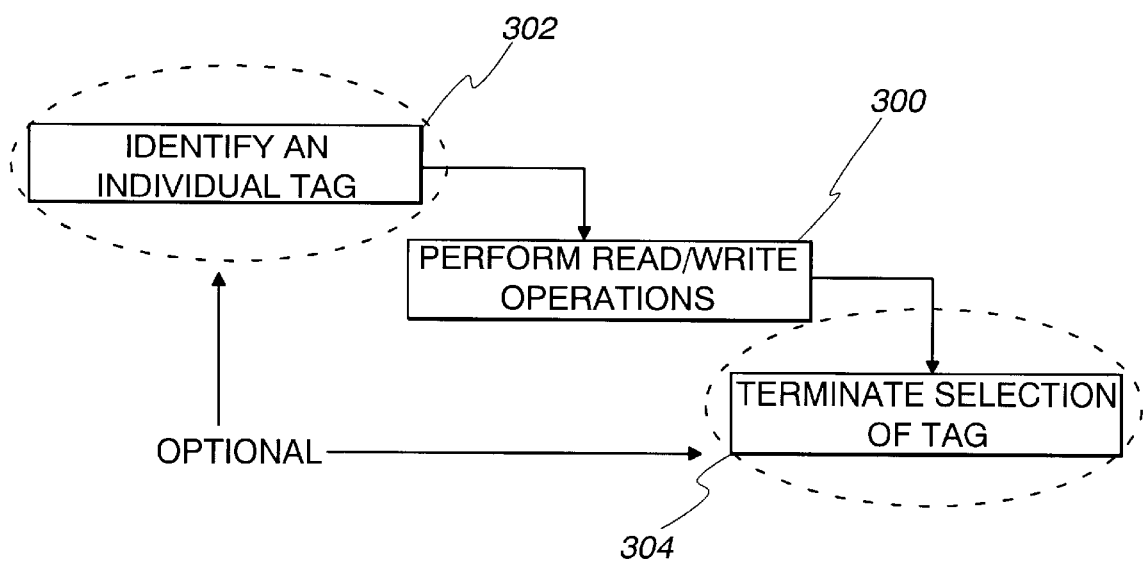
FIG. 18 is flow chart depicting a protocol overview in accordance with the teachings of the present invention.

FIG. 18 illustrates an overview of the protocol of the receive/transmit function of the present embodiment. The most basic function is to perform read/write operations 300. Optional capabilities include identifying an individual tag 302 and terminating a tag selection at step 304.

Figure 19:
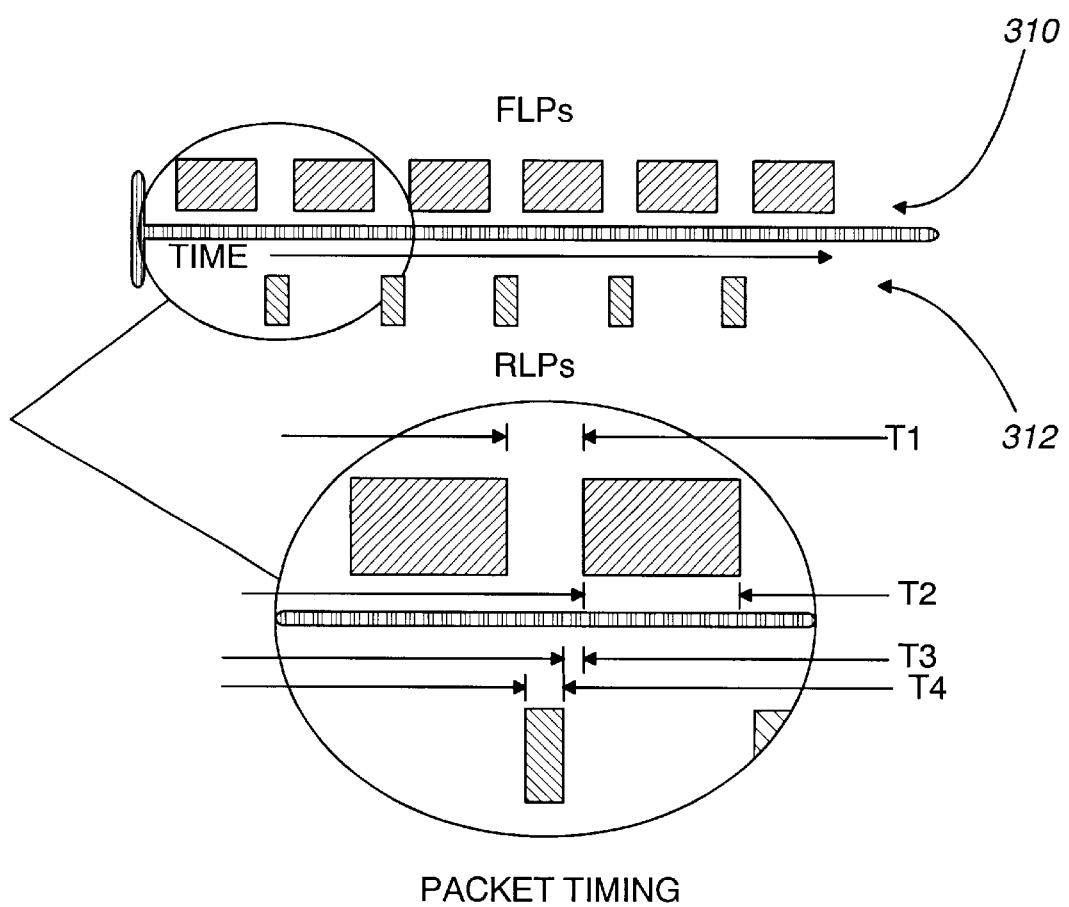
FIG. 19 is a diagram illustrating packet interleaving between reader transmissions and tag response transmissions.

As illustrated in FIG. 19, data transmission direction may be interleaved in a half-duplex fashion such that the reader transmits a 4-byte word 310 and quietly waits for a response 312 for a defined time duration longer than the time required to transmit a 1-byte word response. The reader will continuously transmit and listen in this fashion. The reason for the possible use of the interleaved format is to make the wake-up and discrimination process possible for the tag without burning excess power looking for a signal when there may not be any for long periods of time. Word interleaved timing refers to the time between reader word transmissions and tag responses. As shown in FIG. 19, there are four time specifications: T1 and T2, T3, and T4.

Time T1 represents forward link quiet time when the reader is not transmitting. During this time the reader may be awaiting tag responses or simply in an idle mode. This time is periodic, repeatable, and controllable.

Time T2 represents transmit time duration of a reader transmission. This period is strictly controlled by the reader and encompasses 69-bit times at 15 Kbps baud rate in the preferred embodiment. Other bit times and bit rates could also be used.

Time T3 represents time delay from the end of the tag response to the start of the next reader transmission. This timing is also controllable.

Time T4 represents transmit time duration of a tag response. This period is also strictly controlled by the tag and encompasses 69-bit times and a baud rate of 60 Kbps.

Figure 20:
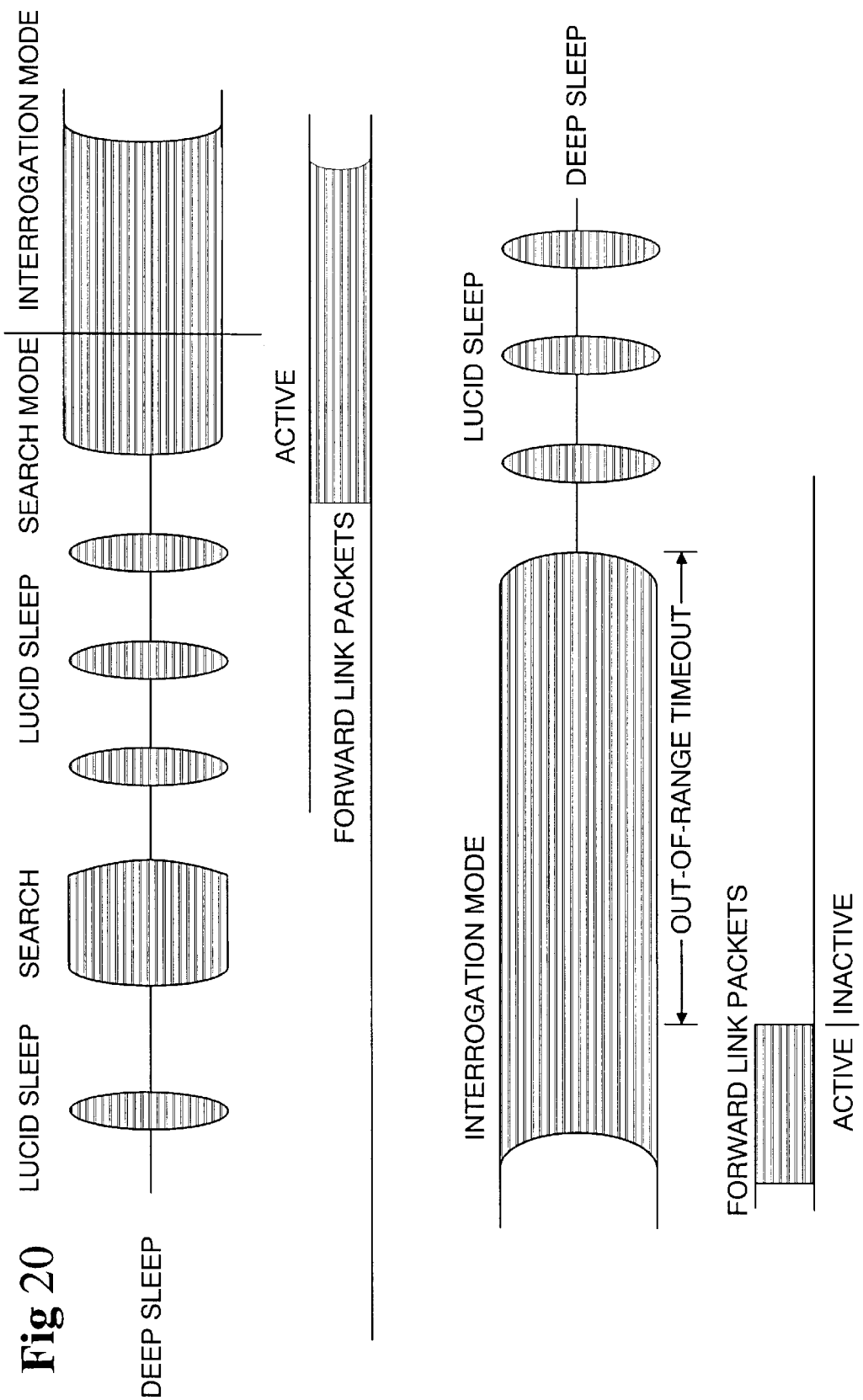
FIG. 20 illustrates the transition between the deep sleep mode, the lucid sleep mode, the search mode, and the interrogation mode of the tag according to the present system.

FIG. 20 illustrates the different modes of the tire tag. These modes include the sleep modes where the tag will spend most of its time. While in the deep sleep mode, the tag utilizes very little power in an effort to conserve battery life. There are various sleep modes the tag can assume as illustrated in FIG. 20. The common sleep condition is Recursive Evaluation Mode (REM) in which the tag periodically awakens (search mode) only long enough to test for the presence of forward link packets and then goes back to sleep if none are present. The REM process is comprised of a deep-sleep state and three stages of awakening including lucid sleep, search mode, and a transition to the interrogation mode.

When the tag is in a static dormant state with its clock oscillator shut down, it is in a deep-sleep state. In this state, the tag processor cannot execute any program segments or control any external IO pins. It sleeps in this manner most of its life in an effort to conserve battery power. During deep-sleep conditions, the clock oscillator is OFF and an internal sleep register is incremented at approximately 18 ms rate from an internal R/C oscillator.

When the register overflows, the tag transitions to lucid sleep mode. The lucid sleep mode is a condition whereby the tag is waking up sufficiently to decrement and sample an internal wake-up register for a NULL value. Lucid sleep requires a minimal amount of processing before reverting back to deep-sleep mode. The conditions of lucid sleep include turning ON the clock oscillator, decrementing a wake-up register, entering the search mode if the wake-up register equals zero, turning OFF the clock oscillator and entering the deep-sleep mode.

In the search mode, the tag leaves the high-speed clock ON while it executes an abridged reset process that prepares it for a forward link preamble search. While in search mode, the tag searches for a forward link preamble and, if found, the entire forward link packet succeeding the preamble will be read and tested for proper framing, number of bytes, and error correction and control words. If all is well, then REM sleep mode will be terminated and the tag will transition to the interrogation mode of operation.

The duration of the search mode is a programmable feature of the tag and can also cause the tag to become non-functional if it is set too short to capture and process at least a single forward link packet. Because of the critical nature of the minimum search mode duration, the tag checks the reload time as a continuous foreground task, and corrects the value if it is set too low. The search mode process is executed as follows:

Perform abridged reset process by clearing internal flags, initializing internal registers, and initializing external hardware functions to their OFF state; turn ON the receiver; enable preamble search and subsequent forward link processing as a background task. It looks for the preamble stream and, if a preamble is found, checks the framing bits. If the framing bits are ok, it then processes the forward link packet. Otherwise it repeats a continuous preamble search. If forward link packets are successfully read, then the interrogation mode is entered. Otherwise the preamble search is continued. The search mode transitions back to a deep sleep mode if a time out occurs while looking for forward link packets or it transitions to the interrogation mode if the forward link packet is successfully read. When it is continuously reading packets, it is in the interrogation mode.

The two signal conditioners 210 and 212 implemented in the tag firmware and shown in FIG. 17 are provided as a means of smoothing dynamic physical effects that influence sensor data. Without these filters, sensor data, particularly pressure, can be somewhat erratic as the tire moves and flexes as a function of angular position, terrain, and the like.

Alarm conditions are provided to allow a surveillance reader to hear a tag that has detected anomalies. When enabled, alarm conditions will initiate autonomous transmission (AT) frames and will override any transmission configuration that might be currently in process. Alarm conditions can be defined as over-temperature or over/under-pressure states as measured by the tag sensors. Since the alarm conditions can be set, both maximum and minimum set points may be programmed for both temperature and pressure. Once the tag detects that the compensated temperature exceeds the value stored in its memory or the pressure is either below or above the preset limits, the tag will initiate an alarm.

As tires are run in service, they do work. This work consists, at least in part, of supporting load as a vehicle moves from one location to another, absorbing bumps and shocks, and providing cornering and traction forces to enable movement of the vehicle. This work results in the generation of heat within the tire structure. Ultimately, this heat is dissipated by the tire through such means as conduction to the rim and vehicle suspension parts, through radiation, through convection to the surrounding atmosphere, and through conduction to the ground or roadway with which the tire is in contact.

In general, the temperature increase that a tire experiences in service is determined by the loads that the tire supports, the speed at which the vehicle travels and the maneuvering that the vehicle undergoes as it travels. The more extreme these factors are, the more heat generation occurs. An additional factor to the heat generation of the tire itself is the inflation pressure that the tire possesses. A tire that is under-inflated will work harder under a given operating condition than one that is properly inflated. The harder working tire will generate more heat. Further, the presence of other heat generating components on the vehicle, such as brake drums or drive motors may contribute heat to the tire.

Each tire produced by a tire manufacturer is designed for a specific inflation pressure and a certain load bearing capacity at that inflation pressure. Rather than specifying a particular inflation pressure for a particular operating temperature, tire manufactures have agreed upon a convention whereby a Target Cold Fill Inflation Pressure is specified for the tire. Tires which are properly inflated to the specified Target Cold Fill Inflation Pressure at the ambient (or Cold) temperature will, in genera, function satisfactorily within the specified load carrying capacity, subject to other use conditions that a particular manufacturer may specify such as speed, etc. In certain operating circumstances, such as mining operations in particular, the tires may spend a considerable amount of time operating at or near the design load capacities. In these circumstances, the tires are stressed as fully as possible in order to maximize equipment utilization in the production process, and as a result they generate heat. The size and mass of the tires in these types of operations are large and provide an enormous amount of thermal mass, which makes cooling through the means described earlier a slow process. Tires in such an environment seldom experience sufficient downtime to allow for the tire to cool to the same temperature as the ambient air, so that measurements of the Cold Fill Inflation Pressure at Cold fill temperatures is infrequent. Consequently, most inflation pressure measurements after a tire has gone into service are done at temperatures other than the Cold fill temperature the tire was at when initially inflated. These measurements are termed Hot Inflation Pressure measurements.

Because the air volume contained within the tire and rim structure is a closed system, with no significant addition or loss of air other than through intentional actions by a tire mechanic or inadvertent means through injuries to the tire structure, the system is governed by the ideal gas law, represented by:

$$PV = nRT$$

where,
P=pressure exerted by the gas
V=volume of the chamber containing the gas
n=number of moles of gas contained within the system
R=a constant specific to the gas within the system
T=temperature of the gas;
with all units being expressed in SI (System International) convention. The value of R is fixed and dependent upon the specific mixture of gas within the tire: generally compressed air or, in some instances, nitrogen. Assuming no addition or loss of air, the value of n is also a constant. Because the tire structure, although deformable, is essentially inextensible owing to the presence of body cords in the form of textiles or steel, the value of V (the volume of the chamber defined by the tire and rim structure) is a constant, at least as a first approximation. The only variables in this equation then become the temperature and the pressure of the gas. Hence, $$PV = nRT \quad k = T/P$$

where,
k=V/nR (a constant).

As a tire undergoes work as described earlier, and heats up during the course of that work, the tire will exhibit a corresponding increase in inflation pressure as governed by the simplified equation above. If the air chamber temperature and inflation pressure of a tire was measured at two different points in time, t1 and t2, the corresponding values of temperatures and pressures should be related by the equation:

$$k_1 = k_2 = T_1/P_1 = T_2/P_2 \quad T_1/P_1 = T_2/P_2$$

where,
P1=pressure at time t1
P2=pressure at time t2
T1=temperature at time t1
T2=temperature at time t2.

Further, if the temperature and inflation pressure was measured at time t2, and if the temperature at time t1 was known, the pressure at time t1 could be easily calculated. To go one step further, if time t1 is the time at which the tire in question was initially inflated and was at an ambient temperature, which, for explanation purposes is assumed to be 20° Celsius, and if the temperature and pressure at time t2 represent the operating condition of the tire after having been in service for some arbitrary period of time, then the Equivalent Cold Fill Inflation Pressure (P1 in this instance) can be calculated from the previous equation. This value can then be compared to the Target Cold Fill Inflation Pressure as specified by the tire manufacturer for that tire to determine if the tire is properly inflated.

In practice, today, one may easily measure the Hot Inflation Pressure of a tire in service using a handheld pressure gage. Without also knowing the temperature of that tire's internal air chamber, however, one can only guess as to the Equivalent Cold Fill Inflation Pressure of that tire. Various means maybe employed to also measure the air chamber temperature, such as inserting a thermocouple probe through the valve stem into the tire chamber. However, such measurements take time and manpower and detract from the service time of the vehicle since it must be at rest in a safe location to make such measurements.

In most instances today, only Hot Inflation Pressure measurements are taken and certain assumptions or comparisons are made to determine if a particular tire needs service. The data thus obtained, however, can be misleading in making assumptions about the Equivalent Cold Fill Inflation Pressure, as the following example can illustrate.

Consider two tires operating on the same vehicle that are both inflated initially to 100 psi Target Cold Fill Inflation Pressure and that these measurements are done at 20° Celsius using the same calibrated pressure gage. Place the vehicle into service and after some considerable period of time (perhaps 3 days) measure the Hot Inflation Pressure with the same calibrated pressure gage. A typical result may be that both tires indicated Hot Inflation Pressures of 117 psi. Since both tires indicate the same Hot Inflation Pressure and no tire temperature information is known, it might be assumed that:
  both tires have risen to the same temperature,
  the temperature rise has created a pressure response in accordance with the equations presented above, and
  the Equivalent Cold Fill Inflation Pressure for both tires is still 100 psi.

This would be a reasonable assumption since it would be unlikely for both tires to have experienced identical changes in Equivalent Cold Fill Inflation Pressure due to air loss and they are in similar service owing to the fact that they are on the same vehicle. One would likely leave these tires in service without further attention.

In fact, the situation may be very grave. It may be that the first tire matches the above assumption, and has an Equivalent Cold Fill Inflation Pressure of 100 psi and a corresponding tire chamber temperature of about 65° Celsius, a perfectly normal condition for the operation circumstances described. Tire number two, however, may actually have a puncture that has allowed the tire to bleed some air. Because it has lost air, it is under-inflated and it is now doing more work and has heated up the air chamber to a temperature of about 97° Celsius. That higher temperature causes a higher pressure (per the equation above) and so the Hot Inflation Pressure reading is truly 117 psi. However, the combination of 97° Celsius and a Hot Inflation Pressure of 117 psi yields an Equivalent Cold Fill Inflation Pressure of no greater than 90 psi.

This tire is now at least 10 psi under-inflated, and may be so hot because of this actual under-inflation that the rubber is cooking and the tire is close to failure. However, without knowing the tire air chamber temperature, this information cannot be derived and the tire may be allowed to remain in service without receiving any attention.

By knowing the actual Hot Inflation Pressure and actual tire chamber temperature, the Equivalent Cold Fill Inflation Pressure can be readily calculated and tires that are in need of service, such as being under-inflated, can be attended to immediately. The other tires that require not service can then be given no attention other than a routine visual inspection. In this way tire servicing can be directed to only problem tires and efficiency in servicing can be achieved. In addition, early identification of problems such as leaks can lead to immediate service which can potentially eliminate further damage to the tire and associated costs such as new tire, servicing time, equipment damage, lost equipment utilization, potential collateral damages or personal injuries. All of these benefits can be provided by the ETMS (Tire Tag System) which reports Hot Inflation Pressure and actual tire chamber temperature. These reports will be provided automatically without any operator intervention and the calculation of Equivalent Cold Fill Inflation Pressure will be available for evaluation. The ETMS system will also be capable of instantaneously comparing the calculated Equivalent Cold Fill Inflation Pressure to the known Target Cold Fill Inflation Pressure and automatically alert personnel to the need for attention or service to a particular tire.

Figure 22:
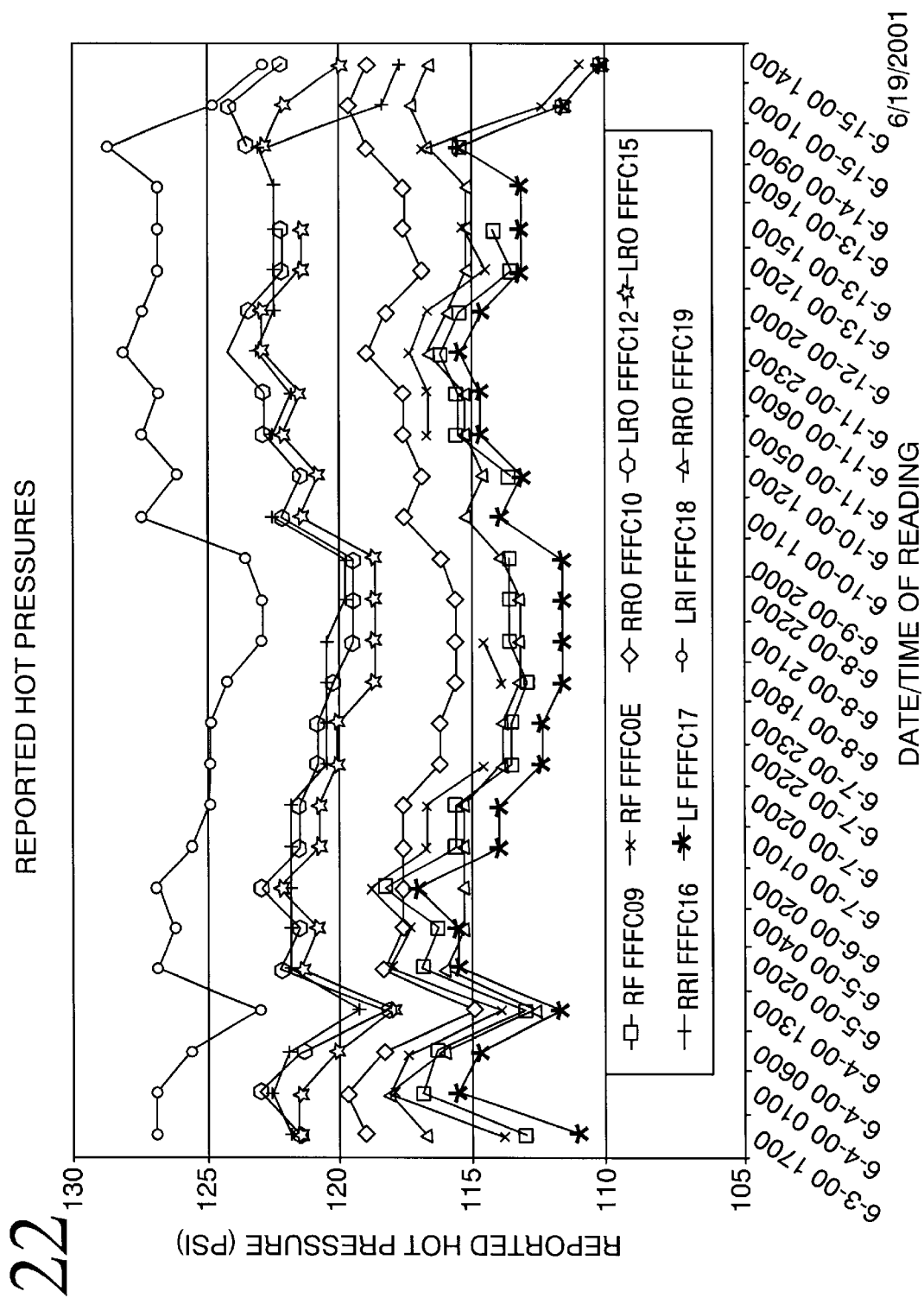
FIG. 22 is a graph of the reported hot pressures for a number of tires in different locations on a vehicle taken at given times over a number of days.
Figure 23:
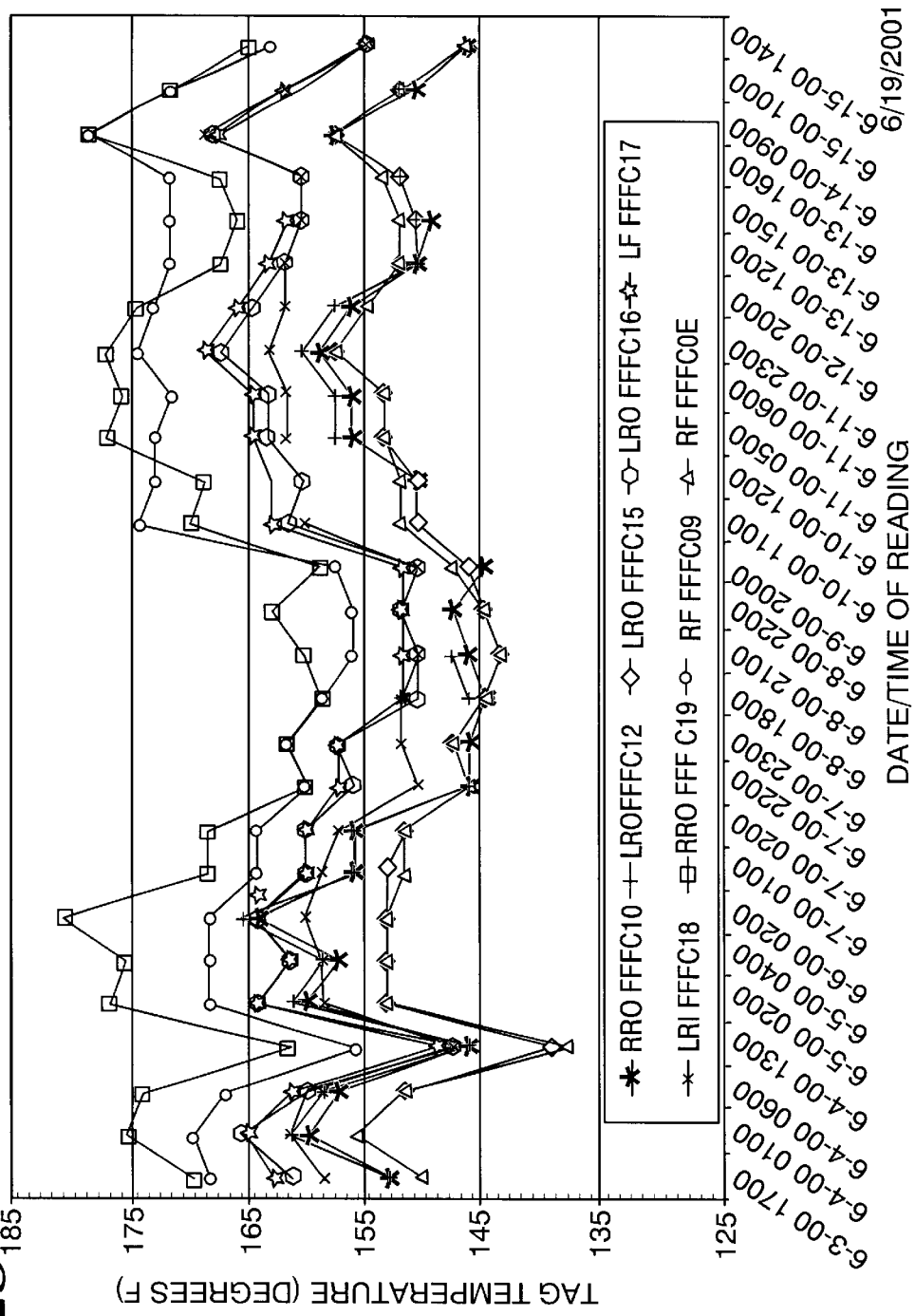
FIG. 23 is a graph of the reported hot temperatures for the same tires in FIG. 22 taken at the same given times and days.
Figure 24:
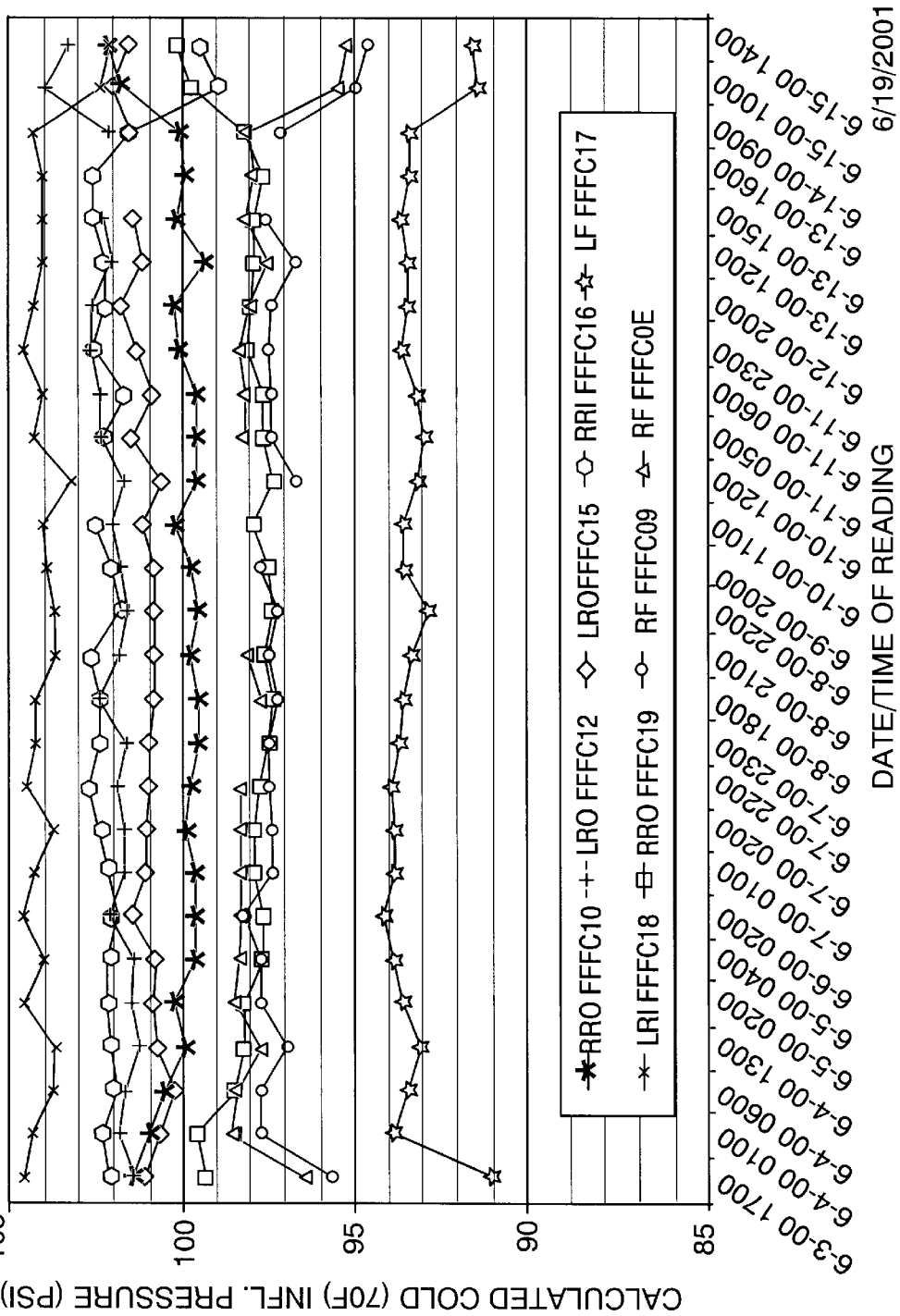
FIG. 24 is a graph of the calculated cold inflation pressures for the same tires in FIG. 22 and FIG. 23 for the same given times and days.

FIGS. 22–24 are graphs illustrating data from actual measurements to illustrate this problem. Consider, for instance, the data representing LFfffc17 tire (left front) on all three graphs. Note that the reported hot pressure in the graph in FIG. 22 is between approximately 111 and 117 psi. This is an acceptable hot pressure. Note however, in the graph in FIG. 23 that the reported hot temperature of the same tire is very high, between about 160° and 180° F. The graph of FIG. 24 shows that the calculated cold inflation pressure of that tire to be between 91 and 94 psi, an unacceptable condition illustrating that a problem has occurred with the tire.

Figure 25:
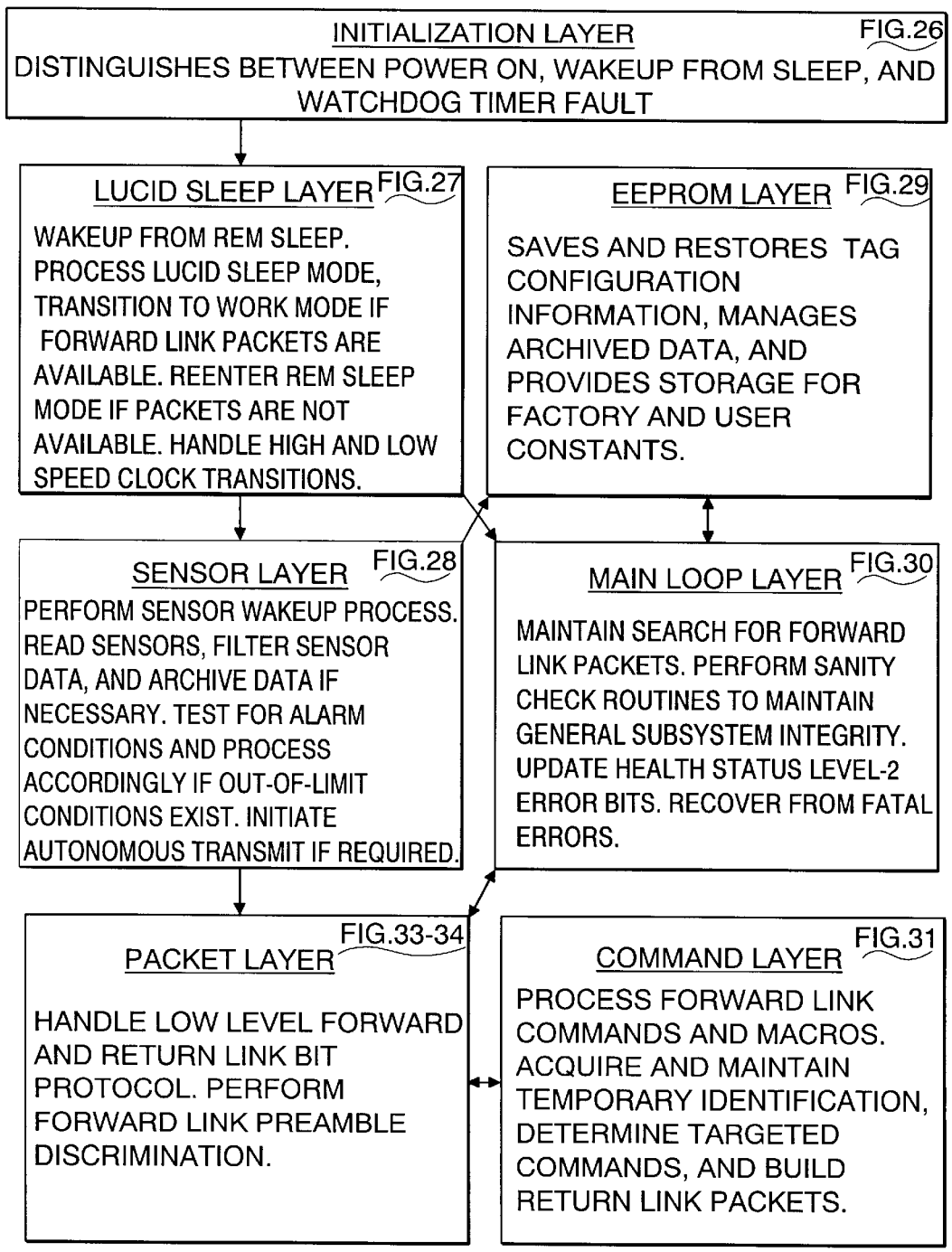
FIG. 25 is a flow chart of the overall tag firmware layers.

FIG. 25 is a flow chart illustrating the tire tag firmware layers and their relationship to each other. They reside at the highest level of firmware hierarchy.

FIGS. 26–31 are detailed flow charts illustrating the interconnectivity of most of the layers illustrated in FIG. 25.

Figure 26:
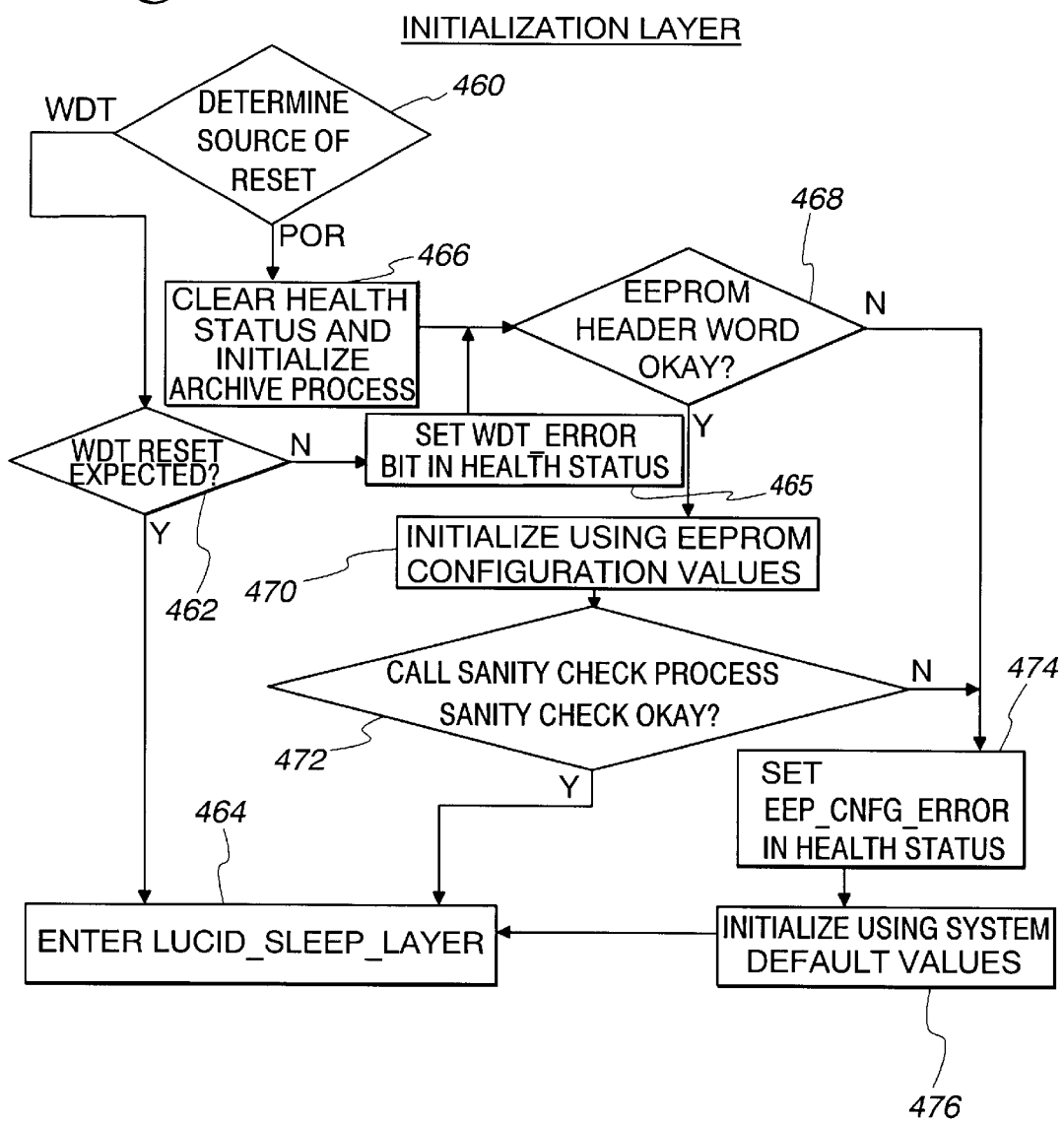
FIGS. 26–31 are flow charts illustrating various tag firmware layers shown in FIG. 25.

FIG. 26 illustrates the Initialization Layer that distinguishes between power on, wake-up from sleep, and Watchdog Timer fault. Each of these initialization processes performs different startup routines, but all of them converge upon a common process that begins the Lucid Sleep mode.

Figure 27:
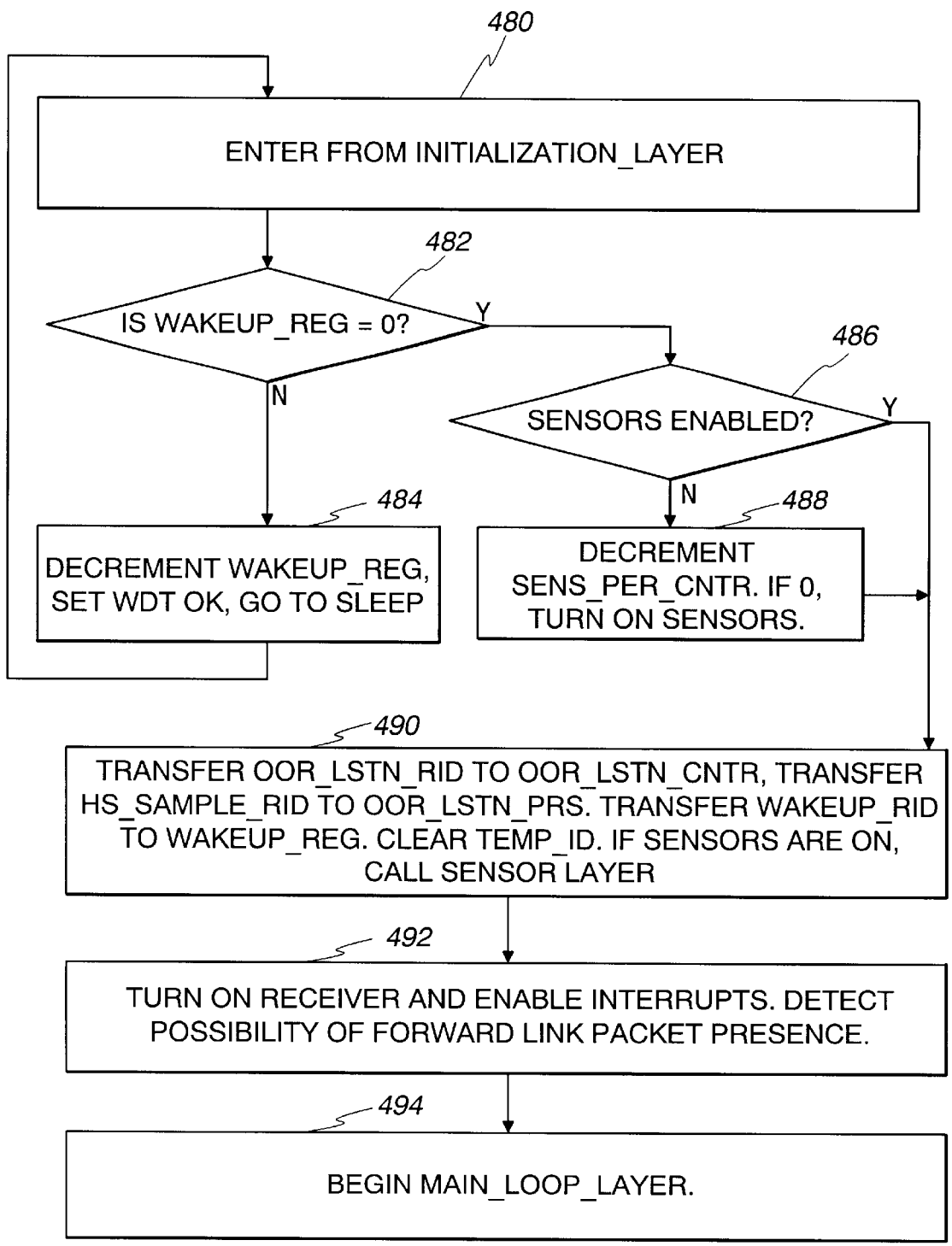

FIG. 27 is a flow chart of the Lucid Sleep Layer. This mode is entered directly from the Initialization Layer. Reload system counter registers, test for scheduled sensor functions, and look for Forward Link Packets are performed. Re-enter REM sleep mode if Forward Link Packets are not available.

Figure 28:
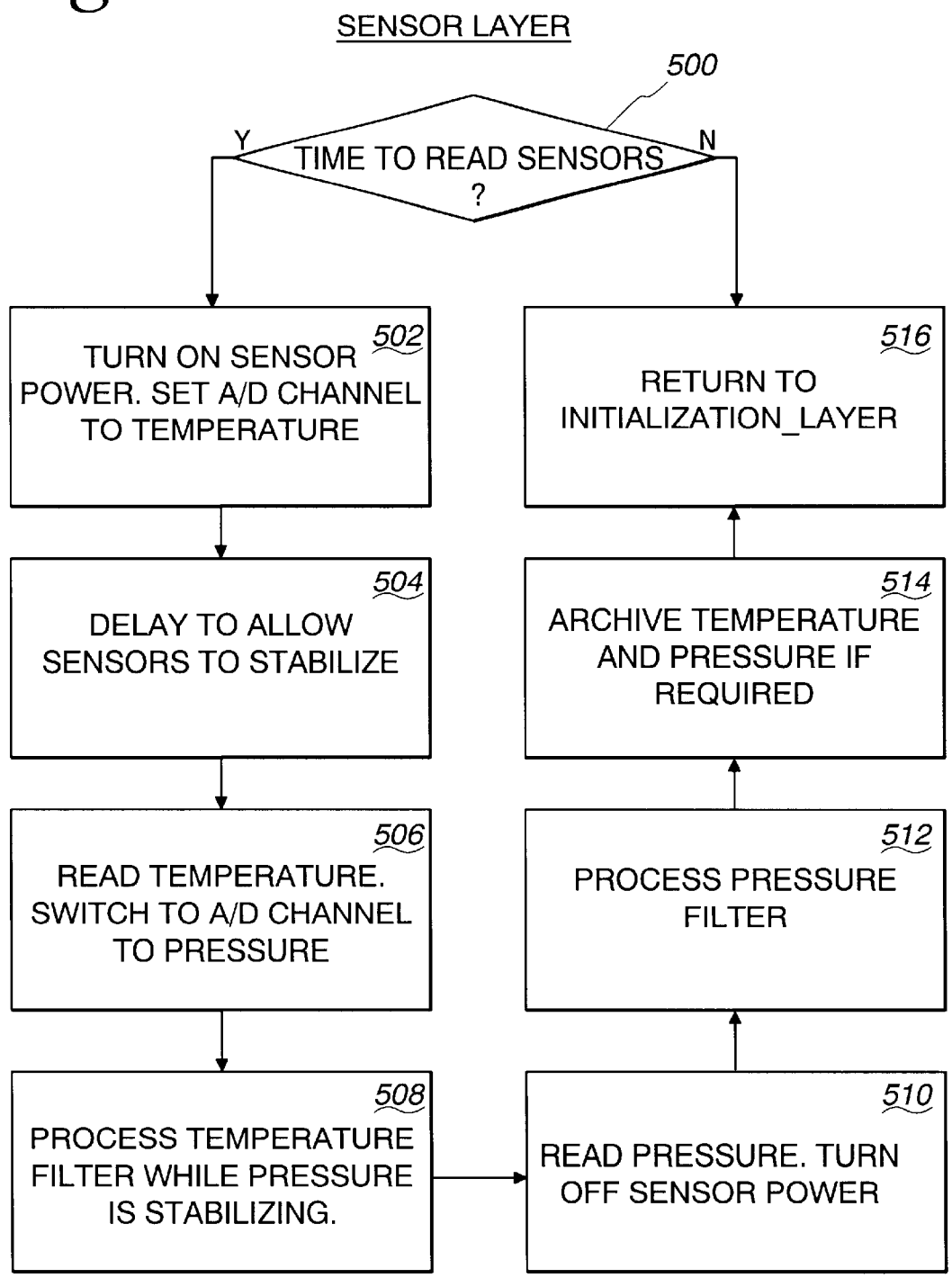

FIG. 28 is a flow chart illustrating the steps utilized in the sensor layer to perform the reading, filtering, and archiving of digitized sensor data. Sensors are turned on, settling delay times are met, and sensors are turned off as soon as possible.

Figure 29:
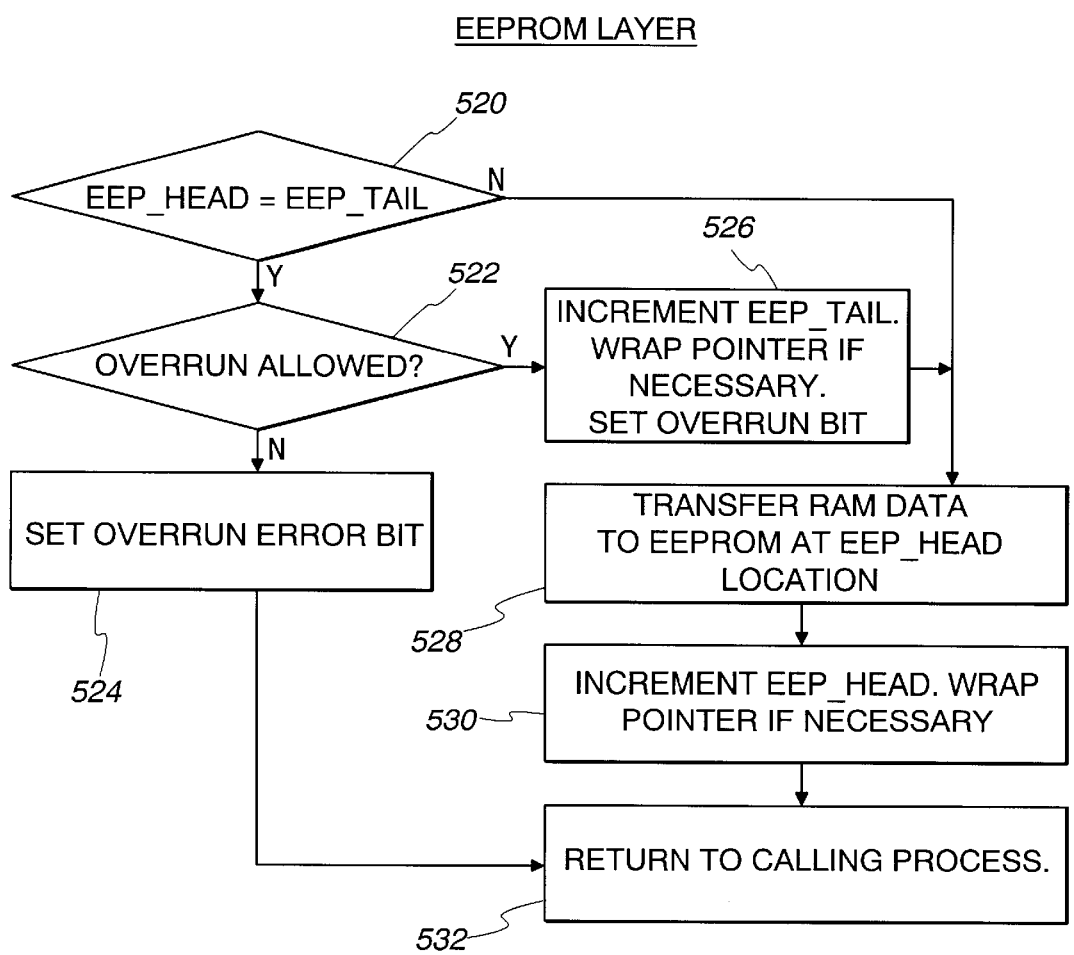

FIG. 29 is a flow chart of the EEPROM layer which is responsible for storing archived history data, secure manufacturer and factory data, configuration constants, and other data that is required to be of a secure nature and infrequently accessed.

Figure 30:
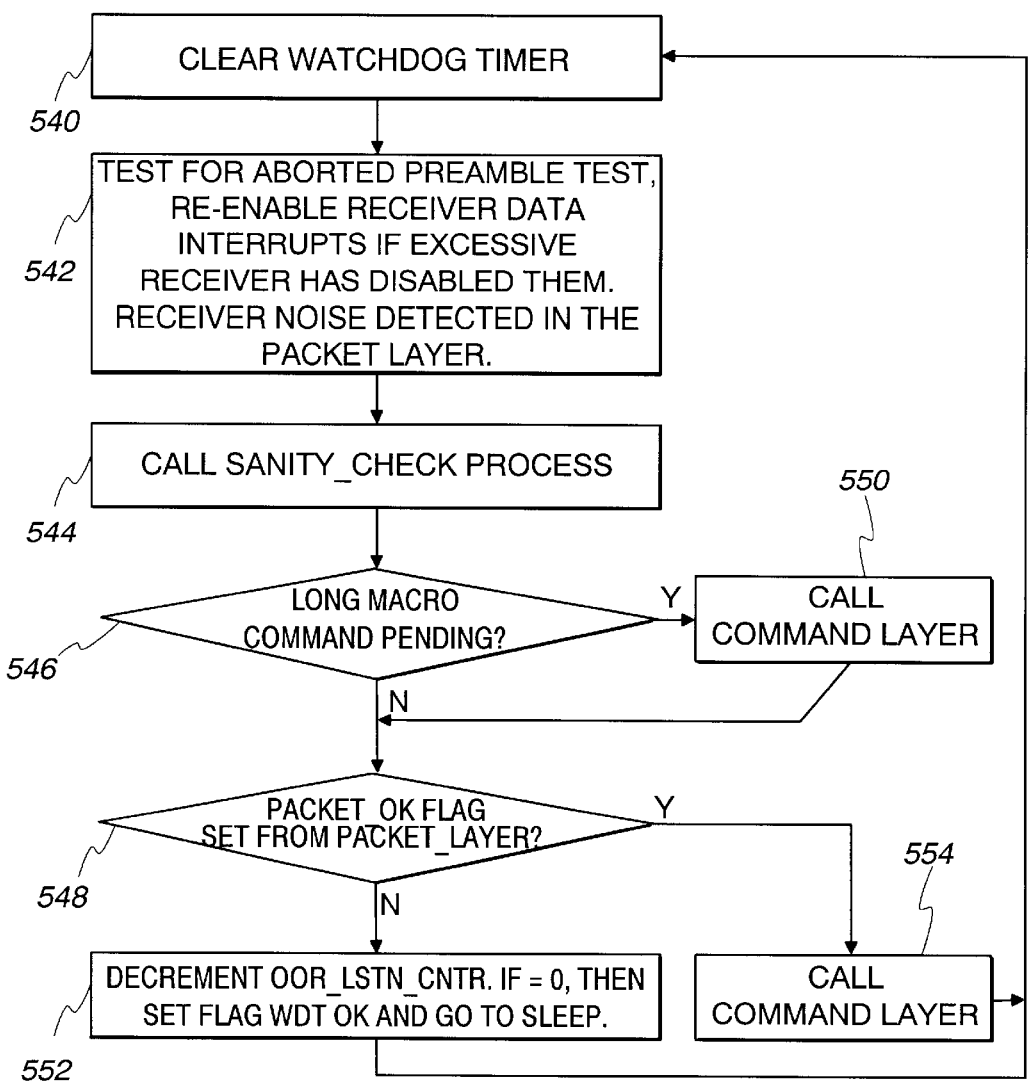

FIG. 30 is a flow chart of the Main Loop Layer. It is the foreground process where the Tag handles excessive receiver noise interrupts, calls the Sanity Check Layer, and keeps track of how long it has been looking for Forward Link Packets. The Main Loop Layer is responsible for putting the Tag back to sleep when an out-of-range condition is detected. The Main Loop Layer also handles the calling of Long Macro Commands that span several packet times.

Figure 31:
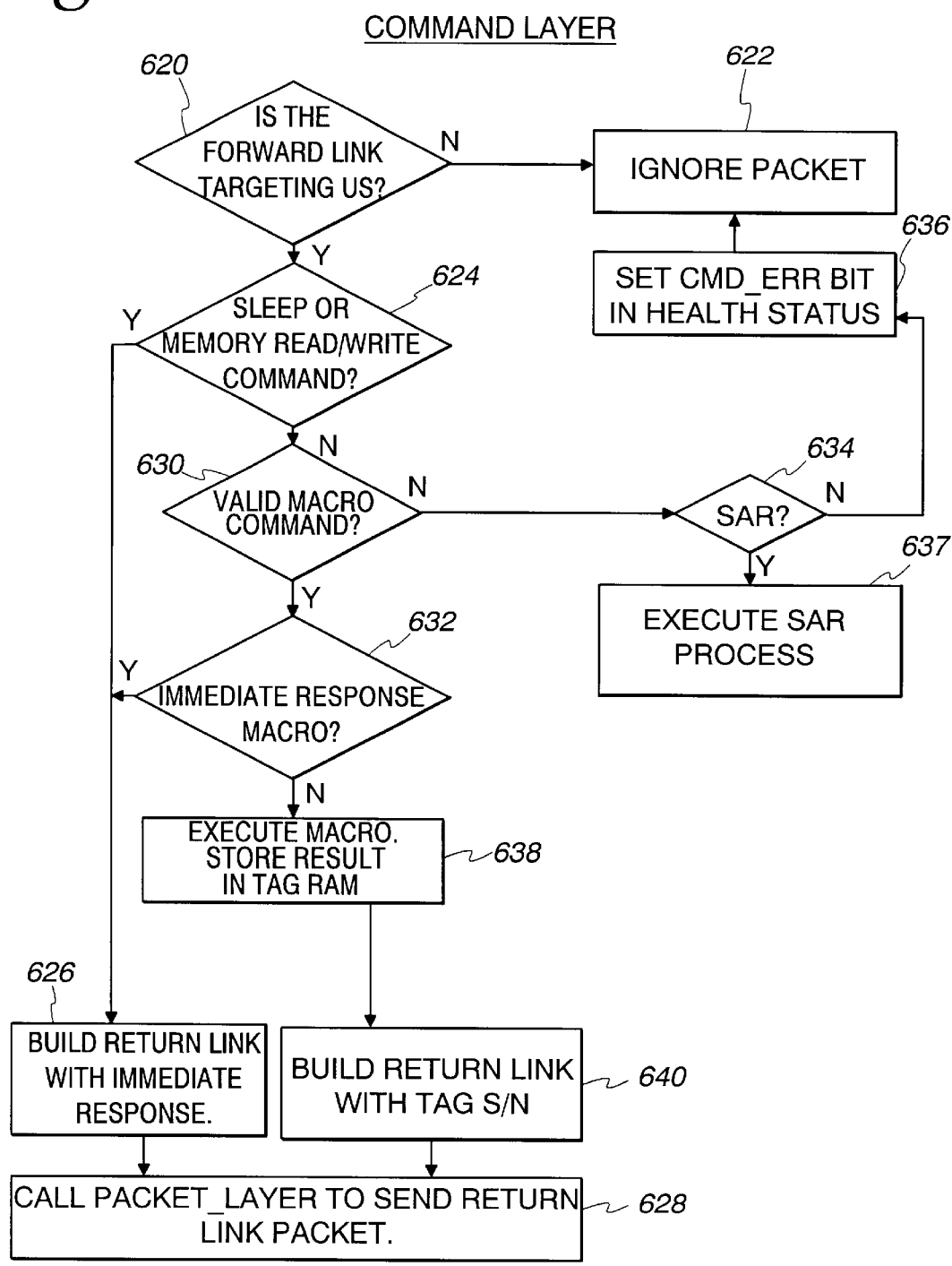

FIG. 31 illustrates the steps utilized by the Command Layer. It responds to process Forward Link Packets that are received and correctly verified. Packets are interrogated for target descriptors (temporary and functional ID) that match the Tag identification. When a match is found, the command field is processed by comparing it to a list of coded entries that describe the process to be executed. The Command Layer is also called by the Main Loop to resolve long macro commands that span more than a single Forward Link Packet.

Figure 32:
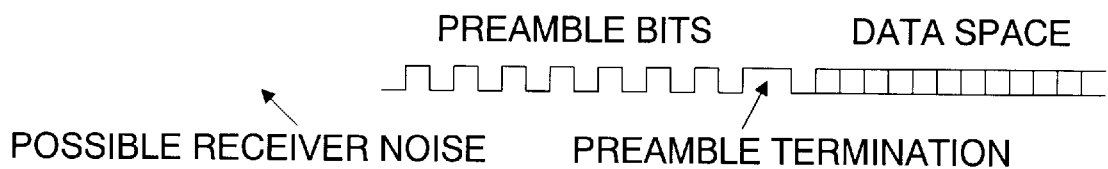
FIG. 32 illustrates a portion of a forward link packet.

FIG. 32 illustrates a portion of a Forward Link Packet (FLP). FLPs are a part of the packet layer illustrated in the flow chart of FIG. 25. Forward Link Packets are read by executing a series of serial events including preamble discrimination and baud rate measurement followed by data detection, data shifting, and packet qualification. All Forward Link Packets are read inside an interrupt service that is initiated by a logic state change of either polarity of the receiver signal.

As shown in FIG. 32, the preamble format is followed by the preamble termination and the start of data. Receiver noise is detected by measuring time between serial stream transitions and comparing that measurement to a window of allowed time. If too many transition times fail the window test by falling too close together, then the search process is terminated by setting a flag bit and disabling serial transition interrupts. The search process will continue once the Main Loop Layer detects the flag bit and re-enables the transition interrupts as illustrated in the flow chart of FIG. 30. If transitions fail the window test by appearing too far apart, then no action is taken other than to continue the preamble search.

Figure 33:
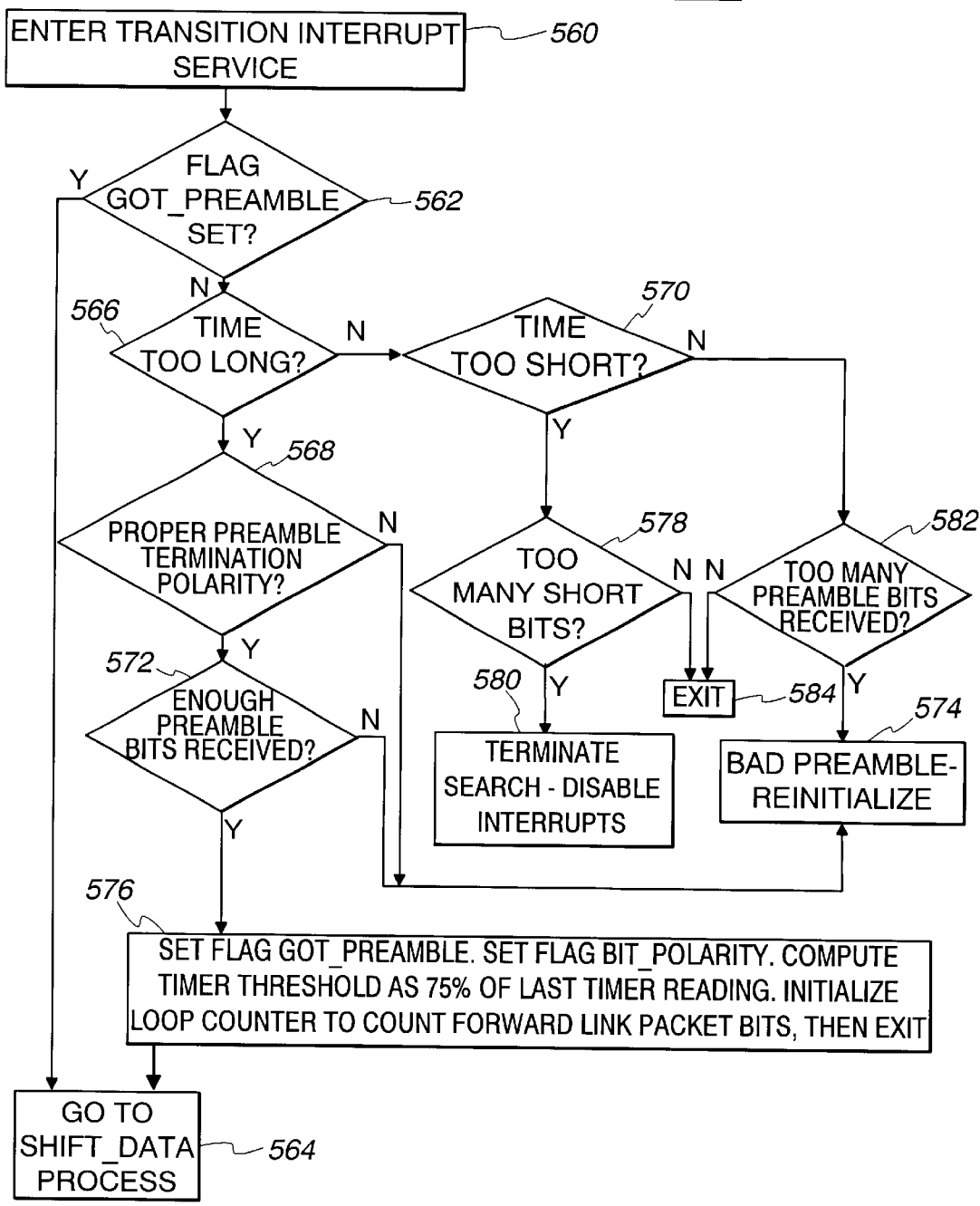
FIG. 33 is a flow chart illustrating preamble discrimination.

FIG. 33 illustrates the preamble discrimination flow chart. Because the preamble can show up at any time, there are several processes required to qualify it. Among these processes is a mechanism for discriminating between receiver noise and a real Forward Link Packet signal. If excessive receiver noise is present, then the preamble search process will terminate further searching until the Main Loop Layer can complete a full cycle and re-enable the search process.

Block 564 representing the shift data process in FIG. 33 is shown in detail in FIG. 34.

Thus, there has been disclosed a novel electronic tire management system utilizing a tire tag mounted on the inside of a tire that is a small microcomputer-based sensing assembly that is capable of measuring, filtering, storing, and reporting temperature and pressure from inside a mounted tire on a variety of vehicle types. Among the system-level tasks performed are included (1) operation to use minimal power to read sensors and to communicate with the reader/transceiver (RT), (2) perform versatile filtering of the reader/transceiver data and have the ability to archive sensor data, and (3) provide programmability to adapt to various environments. A unique antenna arrangement is provided which enhances transmission through opposite tire walls, allowing for opposite tire mounting and/or reading enhancement.

The tag provides read and write access to its internal memory via forward link packets that are received from the RT when the tag is within RF listening range of the RT.

The tag has four active modes. From the deep-sleep mode, the tag awakens periodically long enough to perform only two independent functions. The first function is to enable the sensors to measure parameters and to store the parameter value (lucid sleep), and the second function is to test for the presence of forward link packets (search mode) and then the tag goes back to sleep if none are present. In the lucid sleep mode, the tag is awake sufficient to sample a "wake-up" register for a NULL value. If the wake-up value equals zero, the tag enters the "search" mode. In the search mode, the tag searches for the forward link preamble. As soon as the tag reads a single proper forward link packet in the search mode, it enters the interrogation mode where it continuously reads packets until the response to the interrogation is complete. It then returns to the deep-sleep mode.

The tag has the ability to transmit special return link packets in response to (1) command, as indicated above, or (2) alarm conditions. Autonomous transmission (AT) is a mode whereby the tag transmits packets all by itself based upon preprogrammed configurations (or for alarm conditions). Such alarm conditions can be conditions such as low pressure or high temperature. An alarm is generated whenever the pressure or temperature is outside of predetermined limits. This alarm is transmitted periodically, not randomly. It is possible that the period of transmission could be varied by program.

AT data will not be transmitted any time the tag is within range of valid forward link packets so as to allow tags in the AT mode to hear commands and to allow other tags in the area to respond properly to forward link packets. The tag provides the ability to store pressure and temperature as a function of the lucid sleep cycles. Thus, whenever the tag is in the lucid sleep mode, it measures both temperature and pressure and stores them for transmission when commanded. It is to be noted that the function of measuring and storing pressure and temperature is completely independent from the receive/transmit operation of the tire tag. That is, at periodic intervals the tag awakens and causes the tire parameters such as temperature and pressure to be measured and then stored. Then it goes back to sleep. Operating completely independent of this function is the ability of the tag, when it awakens, to look for a forward link packet and, if none is detected, it simply goes back to sleep. If one is detected, then it responds to the information being received. When the tag receives a valid command, it sends response data in accordance with the command. The remote terminal looks for any tag response. It interrogates the tag for its serial number. The serial number is verified, and a temporary ID is assigned to the tag.

While particular embodiments of the invention have been shown and described in detail, it will be obvious to those skilled in the art that changes and modifications of the present invention, in its various embodiments, may be made without departing from the spirit and scope of the invention.

Other elements, steps, methods and techniques that are insubstantially different from those described herein are also within the scope of the invention. Thus, the scope of the invention should not be limited by the particular embodiments described herein but should be defined by the appended claims and equivalents thereof.

What is claimed is:

1. A system for measuring a parameter of a device at a first location comprising:
    a sensor for measuring the device parameter and generating a data signal representing the measured parameter;
    a microprocessor coupled to the sensor for activating the sensor on a first periodic basis to measure the device parameter;
    a memory in the microprocessor for storing the generated data signal representing the measured parameter;
    a transmitter coupled to the microprocessor; and
    a receiver coupled to the microprocessor, the microprocessor periodically partially awakening to determine, on a second periodic basis, if a received transmission is a valid interrogation signal and, if so, fully awakening and responding to the valid interrogation signal, via the transmitter, by at least transmitting the last stored measured parameter.

2. The system of claim 1, further including a remote computer at a third location for receiving data from the second location via a communication channel.

3. The system of claim 2, wherein the communication channel is selected from the group consisting of a wire link, wireless link, RF link, cable link, microwave link, satellite link, optical link, LAN link, Internet link, and Ethernet link.

4. The system of claim 1, further comprising:
    a reader/transceiver (RT) at the second location for receiving signals from the device and transmitting signals to the device;
    a reader processor (RP) for receiving and interpreting the signals from the device; and
    a computer for communicating with the RP and enabling a user to access data from the device.

5. The system of claim 4, wherein the computer is a field support computer.

6. The system of claim 4, wherein the computer is a remote computer.

7. The system of claim 4, wherein the computer is a personal computer.

8. The system of claim 4, wherein the RP and the RT are both at the second location.

9. The system of claim 4, wherein the RP is remote from the second location.

10. The system of claim 4, wherein the RT is capable of interrogating the device to obtain data including at least temperature and pressure.

11. The system of claim 4, wherein the RT is capable of interrogating the device to obtain data including number of tire rotations.

12. The system of claim 1, wherein the device is a tire tag.

13. The system of claim 12, further including reader/transceiver (RT) units on each side of a vehicle, each RT unit communicating with one or more tire tags on the same side of the vehicle on which the RT unit is located.

14. The system of claim 12, wherein the tire tag is a self-powered unit.

15. The system of claim 1, wherein the device is a tire tag disposed inside of a vehicle tire, and further comprising:
    a printed circuit board (PCB) disposed within the vehicle tire, the PCB including first antenna terminals, the sensor, the microprocessor, the memory, and the transmitter;

an antenna disposed in the vehicle tire and including second antenna terminals, the first and second antenna terminals being configured to electrically connect with each other to thereby electrically connect the antenna to the transmitter, the antenna being spaced from the PCB; and potting material for encapsulating the PCB, the sensor, the microprocessor, the memory, the transmitter, and the antenna.

16. The system of claim 15, wherein the antenna includes first and second elements.

17. The system of claim 15, wherein the antenna is a dipole antenna.

18. The system of claim 1, further comprising:

a reader/transceiver (RT) at the second location for receiving signals from the device and transmitting signals to the device;

a memory in the RT for storing the received data signal; and a microprocessor in the RT for controlling the memory, data reception and data transmission.

19. The system of claim 18, wherein the second location is remote from the device, the RT transmitting forward link signals to the device and receiving return link signals from the device.

20. The system of claim 18, wherein the RT is a portable reader.

21. The system of claim 18, wherein the RT is a fixed gate reader.

22. The system of claim 18, wherein the RT is an on-board vehicle reader.

23. The system of claim 18, wherein the RT is a surveillance reader.

24. The system of claim 1, wherein the microprocessor causes the transmitter to transmit the data signal at predetermined time intervals.

25. The system of claim 1, wherein the device is a tire tag that includes:

a deep sleep mode in which an R/C oscillator is incrementing a sleep register which provides periodic wake-up signals at predetermined intervals;

a lucid sleep mode wherein the microprocessor partially awakens and causes the sensor to measure and store the device parameter; and a search mode wherein the microprocessor periodically partially awakens and further examines the received transmission to determine whether the transmission is a valid interrogation signal and, if so, fully awakens to an interrogation mode to respond to the valid interrogation signal.

26. The system of claim 25, wherein the tire tag remains in the search mode for a first predetermined period of time and then returns to the deep sleep mode for a second predetermined period of time.

27. The system of claim 25, wherein the RT commands the tire tag to transmit the measured parameter and thereafter commands the tire tag to enter the deep sleep mode.

28. The system of claim 1, wherein the microprocessor on a third periodic basis autonomously transmits an alarm signal to at least one remote reader/transceiver (RT) at the second location only when the last stored measured parameter falls outside of a predetermined threshold.

29. The system of claim 1, wherein the device is a tire tag, the system further comprising:

an antenna coupled to the microprocessor;

a remote reader/transceiver (RT) at the second location for transmitting forward link packets to the tag receiver; and a reader processor (RP) at the second location for receiving return link packets from the tag transmitter and identifying the transmitting tire tag from data in the return link packets.

30. The system of claim 29, wherein the RP identifies the transmitting tire tag on the basis of a functional identification number that is transmitted by the tire tag.

31. The system of claim 29, wherein the RP identifies the transmitting tire tag on the basis of a unique tire tag serial number that is transmitted by the tire tag.

32. The system of claim 29, wherein the RP identifies the transmitting tire tag using a successive approximation routine (SAR).

33. The system of claim 32, wherein the SAR includes comparing a masked comparator value to a unique tag serial number.

34. The system of claim 33, wherein the SAR further includes sequentially incrementing the mask value by one until the unique tire tag serial number is found.

35. The system of claim 29, wherein the tire tag transmitter and the RT operate in the frequency range of about 902–928 MHz.

36. The system of claim 1, further including a tire patch mounted to the inner liner of a vehicle tire, wherein the tire tag is encapsulated in an epoxy and attached to tire patch.

37. The system of claim 36, wherein the tire patch is disposed on a sidewall of the vehicle tire.

38. The system of claim 1, wherein the device is a tire tag, the system further comprising:

a remote reader/transceiver (RT) at the second location for receiving data signals from the tire tag transmitter and transmitting command signals to the tire tag receiver; and a frequency hopping circuit for causing the RT to transmit each command signal on a frequency different from the previous command signal to avoid interference with other devices operating in the same bandwidth.

39. A system for measuring a tire parameter comprising:

a tire tag disposed inside of a vehicle tire, the tire tag including:

a sensor for measuring one or more tire parameters;

a microprocessor coupled to the sensor for activating the sensor on a first periodic basis;

a memory in the microprocessor for storing the one or more tire parameters; and a receiver coupled to the microprocessor, the microprocessor periodically partially awakening to examine, on a second periodic basis, a transmission and to at least partially identify the transmission as an interrogation signal from a reader/transceiver (RT) at the second location;

a search mode wherein the microprocessor partially awakens to further examine the partially identified interrogation signal and verify that the partially identified interrogation signal is a valid interrogation signal;

a transmitter coupled to the microprocessor; and an interrogation mode wherein the microprocessor fully awakens and responds to the valid interrogation signal, via the transmitter, by at least transmitting the last stored data signal representing the measured parameter.

40. The system of claim 39, further comprising:

a reader/transmitter (RT) at the remote location for receiving data signals from the tire tag and transmitting command signals to the tire tag;

a reader processor (RP) for interpreting the data signals; and a computer for communicating with the RP and enabling a user to access data from the tire tag.

41. The system of claim 40, wherein the RT is a portable reader that receives the most recently stored sensor data.

42. The system of claim 40, wherein the RT is a fixed gate reader that receives the most recently stored sensor data.

43. The system of claim 40, further comprising a tire database remote from the RT, wherein the RT transmits the most recently stored sensor data to the tire database.

44. The system of claim 40, wherein the RT is a surveillance reader that listens for data signals from the tire tag at locations including major intersections, vehicle-ready lines, shovel sites, crusher sites, dump sites, loading sites, maintenance yards, and tire shops.

45. The system of claim 40, wherein the command signals transmitted by the RT to the tire tag use amplitude shift key (ASK) modulation.

46. The system of claim 45, wherein the command signals are transmitted to the tire tag at a first rate.

47. The system of claim 46, wherein the first rate is about 15 Kbps.

48. The system of claim 40, wherein the tag transmitter includes up to four return link channels and uses frequency shift key (FSK) modulation to transmit the data signals to the RT.

49. The system of claim 48, wherein the data signals are transmitted from the tire tag to the RT at a second rate.

50. The system of claim 49, wherein the second rate is about 60 Kbps.

51. The system of claim 40, wherein the tire tag includes an alarm function that, at preset intervals, awakens the tire tag, examines the last stored tire parameters, determines if an alarm condition exists, and, if an alarm condition exists, transmits an alarm signal to the RT, all without external activation.

52. The system of claim 51, wherein the tire tag terminates the alarm signal transmission upon receipt of an acknowledgement from the RT.

53. The system of claim 51, wherein the tire tag rearms the alarm function when the alarm signal transmission is terminated.

54. The system of claim 51, wherein the alarm condition is determined by comparing the most recently stored tire parameters with stored thresholds.

55. The system of claim 54, wherein the alarm signal is transmitted if one of the tire parameters is outside one of the stored thresholds.

56. The system of claim 40, wherein the tire tag includes an autonomous transmission mode that, at preset intervals, causes the tire tag to awaken and transmit the last stored sensor measurements to the RT, and then returns to a deep sleep mode, all without external activation.

57. The system of claim 56, wherein the autonomous transmission mode only transmits the last stored sensor measurements when a device parameter falls outside of a predetermined threshold.

58. The system of claim 40, wherein the tire tag includes a tire history function that only downloads tire history data stored in the tire tag to the RT if the tire history data has not been previously transmitted to the RT.

59. The system of claim 40, wherein the tire tag includes a tire history function that downloads all of the tire history data stored in the tire tag to the RT.

60. The system of claim 40, wherein the RT requests data from specific memory locations in the tire tag.

61. The system of claim 40, wherein the tag transmitter includes a plurality of return link channels on which to transmit data to the RT.

62. The system of claim 61, wherein the RT sends a command signal to the tire tag designating the frequency of the return link channel on which to respond.

63. The system of claim 61, wherein the RT periodically searches the return link channels, determines which channel has the lowest received signal strength (RSS), and commands the tire tag to transmit on the return link channel having the lowest RSS.

64. The system of claim 40, wherein the RT assigns a temporary ID number to the tire tag.

65. The system of claim 40, wherein the command signals are sent over a spread-spectrum forward link including at least 50 channels.

66. The system of claim 40, wherein the RT transmits a command to the tire tag and then waits a predetermined period of time for a response.

67. The system of claim 40, wherein the tag further includes a first low power internal oscillator for generating a first clock signal.

68. The system of claim 67, wherein the first low power clock signal is used for incrementing a sleep register for determining when to exit a deep sleep mode.

69. The system of claim 67, wherein the first low power clock signal is used for operating the tag in the search mode.

70. The system of claim 40, wherein the tag further includes a second internal oscillator for generating a second clock signal.

71. The system of claim 70, wherein the second clock signal is used for operating the tag in the interrogation mode.

72. The system of claim 40, wherein the computer is a remote computer for storing the tire parameters.

73. The system of claim 72, wherein the remote computer is a personal computer (PC) running appropriate software to maintain a database that includes an archive of tag history data.

74. The system of claim 40, wherein data is communicated between one or more of the RT, the RP, and the computer via a communication channel selected from the group consisting of an RS-232 link, an Ethernet link, a wire link, a wireless link, an RF link, a cable link, a microwave link, a satellite link, and an optical link.

75. The system of claim 40, wherein the tire tag further comprises a kill tag function that allows a command from the RT to erase all data stored in the tag memory such that the tire tag will not respond to any external commands.

76. The system of claim 39, wherein the tire tag further comprises an erase function that erases all stored user level data and returns the tire tag to manufacturer level defaults.

77. The system of claim 39, wherein the tire tag includes an autonomous data collection function that, at preset intervals, cases the tire tag to partially awaken, take sensor measurements, store the sensor measurements, and return to a deep sleep mode, all without any external activation.

78. The system of claim 39, wherein the measured tire parameters include tire pressure and wherein the tire tag further comprises a turn-off function that enables the tag to recognize when the measured tire pressure is below a preselected pressure threshold and, while the pressure is below the preselected threshold, to cease storing and transmitting tag data to conserve power.

79. The system of claim 39, wherein the tire tag memory stores data including one of more of tire pressure data, tire temperature data, a unique tire identification number, a unique tag identification number, and tire history data including tire pressure and tire temperature data stored over a predetermined period of time.

80. The system of claim 39, wherein the data signals received from the tire tag include tag history data stored over a predetermined period of time.

81. The system of claim 39, wherein the tire tag includes a write function that enables a user to write data into the tire tag memory, including the wheel position of the tire tag, the vehicle number, the threshold tire parameter values, and user defined data.

82. The system of claim 39, wherein the tire tag has password protection to prevent unauthorized access thereto.

83. The system of claim 39, wherein the tire tag memory stores data including one or more of tag ID, vehicle ID, tire ID, tire position on a vehicle, number of tire revolutions, and calibration data for the sensor.

84. The system of claim 39, wherein the tire tag further comprises:
a printed circuit board (PCB) disposed within the vehicle tire, the PCB including first terminals, the sensor, the microprocessor, the memory, and the transmitter;
an antenna disposed in the vehicle tire and including second terminals, the first and second terminals being configured to electrically connect with each other to thereby electrically connect the antenna to the transmitter, the antenna being spaced from the PCB; and
potting material for encapsulating the PCB, the sensor, the microprocessor, the memory, the transmitter, and the antenna.

85. The system of claim 84, wherein the antenna is a dipole antenna.

86. The system of claim 85, wherein the dipole antenna includes first and second elements.

87. The system of claim 84, wherein the antenna is attached to the PCB such that the antenna is in a plane parallel to the plane of the PCB.

88. The system of claim 84, wherein the antenna is attached to the PCB such that the antenna is in a plane normal to the plane of the PCB.

89. The system of claim 84, further including at least one inductor placed in series with the first and second elements, respectively.

90. The system of claim 39, further including a tire patch mounted to the inner liner of the vehicle tire, wherein the tire tag is encapsulated in an epoxy and attached to tire patch.

91. The system of claim 90, wherein the tire patch is disposed on a sidewall of the vehicle tire.

92. A tire tag comprising:
a sensor for measuring at least one tire parameter and generating a data signal representing the measured parameter;
a microprocessor for causing the tire tag to enter a deep sleep mode in which a minimum number of electrical components are powered to conserve battery power;
the microprocessor, on a periodic basis, causing the tire tag to enter a lucid sleep mode in which certain of the electrical components are activated to cause the sensor to measure and store the at least one tire parameter; and
the microprocessor periodically partially awakening and looking for a forward link transmission and, if detected, causing the tire tag to determine whether the forward link transmission is a valid interrogation signal and, if so, causing the tire tag to enter an interrogation mode where the microprocessor activates all necessary electrical components to receive, process and respond to the valid interrogation signal.

93. A system for measuring a parameter of a device at a first location comprising:
a sensor for measuring the device parameter and generating a data signal representing the measured parameter;
a memory in the microprocessor for storing the generated data signal representing the measured parameter;
a microprocessor coupled to the sensor for activating the sensor on a first periodic basis to measure the device parameter, the microprocessor comparing the measured parameter with one or more parameter thresholds and generating an alarm signal if the measured parameter is outside of the one or more parameter thresholds; and
a transmitter coupled to the microprocessor for transmitting the alarm signal on a second periodic basis to a remote reader/transceiver (RT) without external activation.

94. The system of claim 93, wherein the microprocessor partially awakens, takes (on the first periodic basis) sensor measurements, stores the sensor measurements, and returns to a deep sleep mode, all without any external activation.

95. The system of claim 93, wherein the device is a tire tag disposed inside of a vehicle tire, and further comprising:
a printed circuit board (PCB) disposed within the vehicle tire, the PCB including first antenna terminals, the sensor, the microprocessor, the memory, and the transmitter;
an antenna disposed in the vehicle tire and including second antenna terminals, the first and second antenna terminals being configured to electrically connect with each other to thereby electrically connect the antenna to the transmitter, the antenna being spaced from the PCB; and
potting material for encapsulating the PCB, the sensor, the microprocessor, the memory, the transmitter, and the antenna.

96. An electronic tire management system (ETMS) comprising:
a sensor for measuring a tire parameter and generating a data signal representing the measured tire parameter;
a memory for storing one or more parameter thresholds;
a tag transmitter for transmitting an RF signal;
a microprocessor coupled to the sensor and the transmitter, the microprocessor activating the sensor at periodic intervals to measure the tire parameter, comparing the measured tire parameter with the one or more stored parameter thresholds, generating an alert signal if the measured parameter is outside of the one or more parameter thresholds, and, in response to the alert signal, causing the transmitter to transmit an alarm signal that indicates that the tire parameter is outside of the one or more parameter thresholds; and
a printed circuit board mounted in the tire and including the sensor, the memory, the tag transmitter, and the microprocessor.

97. A process for electronic tire management comprising:
mounting a tire tag on the inside of a tire;
causing the tire tag to enter a deep sleep mode;
periodically causing the tire tag to partially awaken on a first periodic basis to measure one or more parameters of the tire;
storing the measured parameters;
returning the tire tag to the deep sleep mode; and
periodically causing the tire tag to partially awaken to determine, on a second periodic basis, if a received transmission is a valid interrogation signal and, if so, fully awakening and responding to the valid interrogation signal, via the transmitter, by at least transmitting the measured parameters to a remote reader/transceiver (RT).

98. The process of claim 97, further including transmitting on a third periodic basis at least the last stored measured parameters to the remote reader/transceiver (RT) without external activation.

99. A process for electronically monitoring tire parameters with a tire tag, the process comprising:

sleeping in a deep sleep mode for a predetermined period of time;

awakening to a lucid sleep mode to detect if a transmission is likely a forward link packet from a remote reader/transceiver (RT);

entering a search mode to determine if the transmission is a valid forward link packet;

entering an interrogation mode if a valid forward link packet is detected and responding to the valid forward link packet; and returning to the deep sleep mode.

100. A method for electronically monitoring tire parameters with a tire tag, the method comprising:

causing the tire tag to enter a deep sleep mode to conserve power; and automatically awakening the tire tag from the deep sleep mode on a first periodic basis to measure and store the tire parameters;

automatically awakening the tire tag from the deep sleep mode on a second periodic basis to detect if a transmission is a valid forward link packet from a remote reader/transceiver (RT) and, if so, responding to the valid forward link packet; and returning the tire tag to the deep sleep mode.

101. A tire tag comprising:

a microprocessor programmed to:

store the cold fill temperature of a vehicle tire;

measure the hot inflation pressure and temperature of the vehicle tire during operation of the tire;

calculate an equivalent cold pressure of the tire using the ideal gas equation:

$$PV = nRT$$

where

P=pressure exerted by the gas in the tire (a variable);

V=volume of the chamber containing the gas (essentially a constant);

n=number of moles of gas contained within the tire (a constant);

R=a constant specific to the gas contained within the tire;

T=temperature of the gas contained within the tire (a variable); and $$T1/P1 = T2/P2$$

where

P1=pressure at time t1 (cold fill reference pressure)

P2=pressure at time t2 (current hot pressure)

T1=temperature at time t1 (cold fill reference temperature)

T2=temperature at time t2 (current hot temperature); and compare the calculated equivalent cold pressure with a stored Target Cold Fill Inflation Pressure specified by the manufacturer of the tire to determine if the tire is properly inflated during operation.

* * * * *